US009204251B1

(12) United States Patent
Mendelson

(10) Patent No.: US 9,204,251 B1
(45) Date of Patent: Dec. 1, 2015

(54) INDOOR AND OUTDOOR NAVIGATION AND LOCAL BASE SERVICES APPLICATION UTILIZING RF BLUETOOTH BEACONS

(71) Applicant: Ehud Mendelson, Coral Springs, FL (US)

(72) Inventor: Ehud Mendelson, Coral Springs, FL (US)

(*) Notice: Subject to any disclaimer, the term of this patent is extended or adjusted under 35 U.S.C. 154(b) by 0 days.

(21) Appl. No.: 14/285,209

(22) Filed: May 22, 2014

Related U.S. Application Data

(62) Division of application No. 12/930,735, filed on Jan. 14, 2011, which is a division of application No. 11/396,843, filed on Apr. 3, 2006, now Pat. No. 7,899,583, application No. 14/285,209, filed on May 22, 2014, which is a division of application No. 13/135,421, filed on Jul. 5, 2011, which is a division of application No. 12/932,811, filed on Mar. 7, 2011, now Pat. No. 8,941,485, which is a division of application No. 12/069,899, filed on Feb. 13, 2008, now Pat. No. 7,924,149, which is a division of application No. 11/472,706, filed on Jun. 22, 2006, now Pat. No. 8,896,485, which is a division of application No. 11/429,864, filed on May 8, 2006, now Pat. No. 8,836,580, application No. 14/285,209, filed on May 22, 2014, which is a division of application No. 12/587,042, filed on Oct. 1, 2009, now Pat. No. 8,866,673, which is a division of application No. 11/429,864, filed on May 8, 2006, now Pat. No. 8,836,580.

(60) Provisional application No. 60/670,097, filed on Apr. 12, 2005, provisional application No. 60/678,947, filed on May 9, 2005.

(51) Int. Cl.
*H04W 24/00* (2009.01)
*H04W 4/02* (2009.01)

(52) U.S. Cl.
CPC ..................................... *H04W 4/02* (2013.01)

(58) Field of Classification Search
CPC ... H04W 64/00; H04W 4/02; H04L 29/08657
USPC ..................... 455/456.1, 404.2, 414.1, 456.3
See application file for complete search history.

(56) References Cited

U.S. PATENT DOCUMENTS

| | | | | |
|---|---|---|---|---|
| 5,995,040 A | * | 11/1999 | Issler et al. | 342/352 |
| 2002/0131386 A1 | * | 9/2002 | Gwon | 370/338 |
| 2003/0045280 A1 | * | 3/2003 | Simons | 455/422 |
| 2008/0280624 A1 | * | 11/2008 | Wrappe | 455/456.1 |

* cited by examiner

*Primary Examiner* — Nghi H Ly
(74) *Attorney, Agent, or Firm* — Allen D. Hertz, P.A.; Allen D. Hertz

(57) ABSTRACT

A series of RF beacons deployed about a localized area to create an infrastructure for use with a series of applications. One application provides navigation to the receiving device, wherein the location of the receiving device utilizes information obtained from one or more beacon signals. The location can be determined by signal strength, triangulation, an identity of the RF beacon, etc. Another feature is an initiation of an application based upon receipt of a beacon signal. Another application provides local based services (LBS) to the recipient. Another application is directed towards transportation, including transportation management, parking assistance, traffic telematics, etc. Another application emergency based applications, more specifically a communication process in an area where longer range cellular infrastructure is either non-existent or non-functional. The system can create an infrastructure by networking a series of mobile transceivers to create an ad hoc network.

57 Claims, 13 Drawing Sheets

INDOOR AND OUTDOOR NAVIGATION AND LOCAL BASE SERVICES APPLICATION UTILIZING RF BLUETOOTH BEACONS

RELATED APPLICATIONS

This application is:

a Divisional Application of U.S. patent application Ser. No. 12/930,735 filed on Jan. 14, 2011, which is a Divisional Application of U.S. patent application Ser. No. 11/396,843 filed on Apr. 3, 2006 (now U.S. Pat. No. 7,899,583 on Mar. 1, 2011), which is a Non-Provisional U.S. Patent Application claiming the benefit of U.S. Provisional Patent Application Ser. No. 60/670,097 filed on Apr. 12, 2005; and a Divisional Application of pending U.S. patent application Ser. No. 13/135,421 filed on Jul. 5, 2011, which is a Divisional Application of pending U.S. patent application Ser. No. 12/932,811 filed on Mar. 7, 2011, which is a Divisional Application of pending U.S. patent application Ser. No. 12/587,042 filed on Oct. 1, 2009, which is a Divisional Application of pending U.S. patent application Ser. No. 12/069,899 filed on Feb. 13, 2008 (issued as U.S. Pat. No. 7,924,149 on Apr. 12, 2011), which is a Divisional Application of pending U.S. patent application Ser. No. 11/472,706 filed on Jun. 22, 2006, which is a Divisional Application of pending U.S. patent application Ser. No. 11/429,864 filed on May 8, 2006, which is a Non-Provisional U.S. Patent Application claiming the benefit of U.S. Provisional Patent Application Ser. No. 60/678,947 filed on May 9, 2005, a Divisional Application of pending U.S. patent application Ser. No. 12/587,042 filed on Oct. 1, 2009, which is a Divisional Application of pending U.S. patent application Ser. No. 11/429,864 filed on May 8, 2006, which is a Non-Provisional U.S. Patent Application claiming the benefit of U.S. Provisional Patent Application Ser. No. 60/678,947 filed on May 9, 2005.

FIELD OF THE INVENTION

This invention is directed generally to the field of RF beacons. More specifically, the application of a series of deployed RF beacons creating an infrastructure for use in navigation, marketing, emergency situations, transportation, parking assistance, hospitality applications, and the like.

BACKGROUND OF THE INVENTION

Introduction to Location Based Services:

Location based services are rapidly expanding. Outdoor location technologies are mainly based on GPS technologies. GPS cannot perform properly indoors and is therefore inadequate. As a result, indoor location systems are appearing on the market.

The need for a system arises from various market segments and applications. One example in the market is the GPS based systems that use integrated positioning and navigation systems based on GPS receivers as the primary positioning technology. Subsequent to the events of September 11th' the Federal government mandated that GPS capability be built in to all cellular phones. However, the fact that uninterrupted satellite reception is not possible in many locations is a major limitation of GPS based systems. Densely populated areas and radio-frequency-signal shadowed locations, such as urban centers (a.k.a. "urban canyons"), generally do not allow proper operation of GPS, yet it is in these locations that the need is greatest.

There is a clear need for a cost effective system that maintains performance indoors, in urban canyons and in city centers.

Another important consideration is that GPS itself is susceptible to jamming and other man-made interference.

Description of GPS System:

The Global Positioning System (GPS) is a satellite-based navigation and time transfer system developed by the U.S. Department of Defense. GPS serves marine, airborne and terrestrial users in the military as well as civilians. Specifically, GPS includes the Standard Positioning Service (SPS) that provides civilian users with 100 meter accuracy as to the location or position of the user. For military users GPS provides the Precise Positioning Service that is accurate to within 20 meters. Both of these services are available worldwide with no requirement for any local equipment.

View of GPS Limitations:

First limitation of GPS is that upon activation the GPS receiver scans for signals from the GPS satellites. A unit must locate and receive signals from at least four satellites to be able to determine its location. This process of locating the satellites, receiving the data and achieving a position fix can take several minutes. This delay is problematic for many GPS applications.

Second limitation of GPS is that the receiver needs a clear view of the sky to successfully receive signals from the satellites, again under unfriendly RF conditions such as inside buildings, or in "urban canyons" or in the shadows of high buildings, the GPS suffers from multi-path effects and therefore shows poor performance or none at all.

Third Limitation—limited accuracy: There is a problem of limited accuracy of the civilian GPS signal. While knowing your position to within 50 to 200 feet anywhere on the planet is a major technological feat, it is still not accurate enough, to locate and navigate to an a store in a mall or to empty parking space, where each space measures about 10 feet, and most indoor store/malls are located where the GPS cannot work effectively.

Existing navigation systems, such as the new mandatory GPS equipped cellular phones, are based on GPS and have the aforementioned limitations.

Another significant factor adding to the limitations of the GPS based systems is the important role of map production; normally a user requires a map to be as detailed and as up-to-date as possible. The existing maps used by the GPS based systems provide limited detail and are not able to reflect changes on a real time basis, more over there is no mapping for indoor facilities at all. The recent introduction of imagery services, such as Google Earth and its competitors, that are offered as an enhancement to GPS at a fee, still provide out of date information, with the unsatisfactory result that users encounter road changes and area development not shown on the maps and imagery.

The Proposed Solutions:

In general, the subject invention is based on applying machine-learning techniques to the task of inferring aspects of the user's status from a stream of input from Small RF tags/beacons are installed in local area indoor or outdoor or in places designated as Point Of Interest (POI), be it at a mall, department store, product inside a store, street or garage parking, inside or outside location, public or commercial, The tags/beacons can be RFID (long range type), or a Bluetooth with the option to long range Bluetooth, or a Wi-Fi or any RF type. The tags/beacon broadcast a unique ID by wireless that identifies the location by the unique ID, the address and type of facility/store/product. The tag/beacon broadcasts its information to be picked up by the mobile phone application, via the cellular phone or other Bluetooth device with application.

The focus of the application for the indoor guide navigation and local based services, or navigation in crowded urban areas, where GPS based systems, due to lack of access to satellites or the GPS limitations detailed previously, cannot achieve the required results.

The disclosed applications focus on the task of interactively guiding the user to a desired indoor destination.

Examples of Indoor Applications:

The user may wish to locate an empty available parking space in his vicinity.

The user may wish to locate a specific store in a shopping mall, or a particular aisle in a department store, or a specific item on a shelf.

The user may wish to locate a specific conference room in a convention center, or a Point Of Interest (POI) in an amusement park or a Point Of Interest (POI) in a museum.

The user may be looking for a train location in a station, or stops in a subway or underground train system.

PRIOR ART

At present, however, no prior art device utilizes the capabilities to display a real-time representation of navigating directly from the sensors without a central system; and without using a GPS based system directly to the "user". Also most systems are designed for the old query type search where interface to Internet and or database to a central system is needed.

The navigation system automatically detects a signal directly from the bacon, no communication needed not even cellular communication to do the determination of the location where is other systems must have bandwidth available, over which to send a request to a central system, or to a database, and then must wait for a response. This takes time!

Even if the other systems have bandwidth, they are still based on the existing search concept where the user submits a query, searches and waits for the response. This is impractical. The subject system provides the information automatically, without submitting any query, and the response is according to the user's location, wherein the user's location is determined by proximity to the beacon in the local area.

Again, most of the existing prior arts are based either on a GPS based system or the existing car navigator, that depends on a GPS too. And the existing mapping that these systems use has the same limitations described previously and is impractical.

The present invention bridges the gap between the GPS based navigation and provides a complete solution.

U.S. Pat. No. 7,031,875 Ellenby et al. describe a pointing system for addressing objects, provide a system and method based on GPS and Internet/database communication, it is not exactly a navigation but an information based system that needs the GPS to locate the user location so indoor services is likely out of the questions and the need for communication as well with GPS limits its availability and accuracy.

The system, as provided by the present invention, determines the location using the beacon/tag ID, Proximity Detection (PD), and Received Signal Strength (RSSI), Time of Arrival (TOA)=and Angle of Arrival (AOA).

Proximity Detection (PD)

This method relies upon a dense grid of antennas, each having a well-known position. When a mobile device is detected by a single antenna, it is considered to be collocated with it. When more than one antenna detects the mobile, it is considered to be collocated with the one that receives the strongest signal.

This method is relatively simple to implement. It can be implemented over different types of physical media. In particular, IR and RFID are based on this method.

Triangulation

In case more than one beacon/tag signal a Triangulation takes PD a step further, in the sense that it is based on measuring the signal level measurements from each antenna (possibly by using a triangulation mechanism), with respect to each mobile device. Following that, mobile is located by using a triangulation algorithm.

Like the PD method, triangulation is relatively simple to implement.

Time of Arrival (TOA)

Time of arrival (TOA) is based on triggering the mobile devices to respond, and measuring the time it takes for the response to fly back to the antenna. The elapsed time represents the distance between the two. By using distances from a few antennas, a mobile's position can be triangulated. TOA is considered to be the most accurate method, because multipath effects can be filtered out. Yet, it is considerably more complex to implement, as it requires a modification to the hardware on the mobile side, as well as special modifications on the antenna side.

Angle of Arrival (AOA)

Angle of Arrival (AOA) is based on finding the direction of maximal signal intensity for each antenna-device pair. By finding the intersection of several such direction vectors, a mobile's position can be estimated AOA is considerably less accurate than TOA, due to limited angular resolution and the fact that indoors much of the signal is reflected. Also, AOA antennas are more complex, as they require multi-section, highly directional antennas, and multiple RF circuitries.

Bluetooth is a newer wireless local networking standard that operates in the 2.4 GHz ISM band, and the range is shorter (typically 10-15 m, although there are tags with a range of over 300 feet). On the other hand, Bluetooth is a "lighter" standard, highly ubiquitous (embedded in most phones, PDAs, PC peripherals, etc.) and supports, in addition to IP, several other networking services. Notably, Bluetooth supports serial port emulation, voice, and various types of object exchange. Bluetooth tag/beacons are small, pocketsize transceivers.

Every Bluetooth device's tag/beacon has a unique ID. This ID can be used for locating the tag/beacon and providing location information of the mobile device in the proximity.

The relevant location scenario of the present invention is that of searching for a certain tag. It is the most accurate and the faster response time and it is this method in indoor navigation and locating when and where each tag/beacon ID is a known address position-waypoint.

Why Use Bluetooth for Indoor Location?

Bluetooth has some advantages in the context of indoor location. These include:

Bluetooth uses RF—in the 2.4 GHz ISM band, specifically. In this frequency range, radio waves penetrate obstacles, such as walls and human bodies, albeit with a substantial loss.

This has two implications:

Availability of a "high-there" application is always some signal received from the tags/beacons.

Tags/beacons can be placed relatively far apart (typical range is 10-15 meters, i.e. not necessarily of one in each way point).

Bluetooth is ubiquitous-Bluetooth chipsets are being implanted everywhere nowadays (phones, accessories, computing devices, etc), the tags/beacon can be implements anywhere, inside buildings roads inside cars transportation entities, inside home for home automation triggering, or in any kind of business triggering application or and link to exiting system.

The fact that a Bluetooth location system can locate any Bluetooth enabled device, makes it more cost-effective. This means that an increasing fraction of humans and mobile assets around would become locatable in a Bluetooth covered site, with no additional hardware cost (no tags/beacons attached). The only need is to pre-register these devices. Bluetooth is a low power technology-tags need recharge, approx. once a week (or longer, depends on the usage scenario). Non-tags (e.g. BT enabled phones) are being recharged anyway on a regular basis, so they do not need special recharges. If they are being used for location, the fraction added to their usual (no Bluetooth) power consumption is relatively small.

Bluetooth is a low cost technology, having expected high production volumes (hundreds of millions annually) lead to sub-$5 per chip. It is noted that several IC manufacturers have already met this goal. This would eventually result in a low price for the Bluetooth tags/beacons, if and when Bluetooth location systems would become sufficiently ubiquitous. Bluetooth is a multi-functional communication standard—location is only one of the services that can be supported by a Bluetooth infrastructure. The same infrastructure can be used to provide additional network services, particularly remote monitoring and control or just trigger link to exiting system. In addition, Bluetooth provides voice and IP services (although for the later, WLAN is typically more suitable).

In open spaces, relatively free of obstructions and walls (e.g. a large warehouse or a public hotspot), Bluetooth alone would suffice to provide a –2 meter error range.

Conclusions

The proposed beacon technology offers unique advantages: one is the ability to locate ubiquitous "any tags" (any Bluetooth enabled device can be associate and be use the advantage of the Bluetooth beacons, e.g. most of the newer mobile phones). The other advantage is the multiservice nature of the Bluetooth beacons infrastructure that enables using the tags/beacons for other purposes, such as for locating and navigating, remote monitoring and control, trigger existence and link to existing systems and software and for a variety of local based services and local push messaging services.

SUMMARY OF THE INVENTION

In accordance with the present invention, these are the navigation project's characteristics:

The proposed system is a locating and navigation method based on the following unique characteristics:

In an indoor or outdoor navigation situation the RF beacons tags, replace the satellite in a GPS based system, to provide the user with the information and directions needed to reach the destination.

The proposed system has three major parts:

The detection and navigator, the special method used to display the data and the information from the area trigger as result of being in close proximity to the RF beacons in the area.

It is not a location and tracking system as offered by other systems.

Small RF tags/beacons are installed in each place designated as Point Of Interest (POI), be it at a mall, department store, product inside a store, street or garage parking, inside or outside location, public or commercial. The tags/beacons can be RFID (long range type), or a Bluetooth with the option to long range Bluetooth, or a Wi-Fi or any RF type. The tags/beacon broadcast a unique ID by wireless that identifies the location by the unique ID, the address and type of facility/store/product. The tag/beacon broadcasts its information to be picked up by the mobile phone application navigator, via the cellular phone or other Bluetooth device with application, the beacon ID trigger application and push information to the Bluetooth device or the cellular phone with the Bluetooth.

The system can serve as add on to the mall's/store's guide/mapping to provide extra assistance to user.

The Navigator.

The Navigator, Cellular Phone Application Bluetooth Application

The user device scan the local area for ID broadcast by the tags/beacons in the vicinity via the wireless Bluetooth interface with a cellular telephone utilizing the cellular phone's Bluetooth capability. It is important to note that no cellular communication or Internet or database access is needed to determine the location of the device and that any Bluetooth enabled device will operate the navigation application as a stand-alone device. The beacon system can interface with existing in car system and/or car navigation system.

The Display Method.

The display method is a unique way to bridge existing devices like cellular phones, in-car system and in-car navigation and other Bluetooth devices. The system provides an overlay display method over the existing navigation system mapping or floor map or floor images, as a real-time floating display, or as a waypoint to overcome the limitations of GPS based systems and the existing mapping systems, the indicator placed overlay on the floor plan image, it may further include providing a visual indication a circle on the floor plan image of the path, wherein the visual indication—the circle indicates an area of the indoor map where the location information identifies a particular location and the circle provides the accuracy radius circle.

The mapping: a system and method for mapping an indoor environment is provided, a user device may receive an indication of a starting point on a floor plan.

The user device may prompt the user to travel in a particular direction, or the direction of travel may be determined by the user device in response to the user indicating a second location after the user has traveled to the second location.

As the user travels from the starting point in the designated direction, the user device may gather information about the indoor environment. For example, the user device may gather wireless signal strength data, from proximity RF beacons Wi-Fi or Bluetooth while the user travels in the designated direction.

The user device may associate the gathered information with the path the user traveled from the starting point to the ending point. The operation can be done at the user device—the cellular handheld, the association may also be performed by a remote server using data provided by the user device. As the user travels from point to point, the client device may indicate the area for which valid location information is available based on the path the user traveled and the information the user collected.

The Mapping can be offered as an additional service for the indoor based on area building floor or image mapping.

The navigation system will enable remote planning based on downloaded local floor-plans the floor mapping or floor images—the indoor view images of the local building facility, or local navigation, when the location's floor plan can be triggered to down-loaded at the destination. An example of this would be at the entrance of a shopping mall, a department store, an amusement park, a museum, a parking garage, a downtown area of a city, and the like.

The navigation system is based on a network of tags/beacons that can be deployed anywhere. The system is accurate to within 10 feet, significantly better existing navigation systems and GPS. The system can work inside a building whereas GPS cannot.

Local detection is obtained via popular Bluetooth interface.

The system provides information about each facility/store, including information about the type of the facility, for example: type of store or product etc.

By providing the ability to locate a the user in an area using a Bluetooth enabled device, or a cellular phone with the navigation application and the RF beacons method, the system overcomes the anxiety of "Where am I" and also facilitates finding a parked car later via the RTP (Return to Parking) feature.

The system has the capability to perform all the functions of a search for and can become the "Next generation search out of the box".

The navigation system can be attractive for places that already deploy WI-FI and can be used for the existing WI-FI devices as a tags/beacons.

In case of an emergency or security situation, the system can provide authorities with information.

The system eases and facilitates navigation to indoor locations, without a navigation map or GPS. Indoor Mapping can be provided as part of the navigation system. The system provides "local" navigation as well as "remote" detection.

The system allows easy interface or trigger application with existing networks or existing system.

The system saves gas, time, money and eases global warming by reducing the time spent searching for destination.

The navigation method is unique. The navigation system is based upon RF tags/beacons with interface to Bluetooth enabled devices. This feature allows detection and navigation in locations where GPS cannot work, as well as outside, with the ability to guide the user to within 10 feet of the destination, significantly better than any other navigation and GPS based systems on the market.

The Bluetooth RF tags/beacons are based on a long-range version of the popular short distance communication. This unique feature affords the user the ability to plan ahead from a remote location, by obtaining ID about the destination directly from the tags/beacons and by accessing the indoor floor plan to be navigated at the destination.

A major problem with In-Car navigation and GPS mapping is that they cannot guide the user closer than 50 to 200 feet, and only in open places. The navigation system can provide accurate directions to within 10 feet.

The navigation system will be a challenge to navigation providers and GPS providers as they cannot provide mapping or navigation inside a mall, department store, a parking garage or lot, and anywhere the GPS/Navigation map cannot accurately help navigate.

Utilizing this innovation, the facilities in the vicinity around the "user" car are displayed on a floating overlay using either a cellular phone application, or a stand-alone device, or an existing installed navigation system with or without any mapping.

The recent introduction of imagery services, such as Google Earth and its competitors, that are offered as an enhancement to GPS at a fee, still provide out of date information, with the unsatisfactory result that users encounter road changes and area development not shown on the maps and imagery.

Navigation using the mapping or floor plan of a location can be offered as a part of the system. The option of downloading a floor plan can be exercised either remotely or locally.

The tags/beacons broadcast their signal continuously and any of the navigation devices will detect them and display the ID/data on the user's device in an easy to understand method.

With our innovation you have the information that you want, when you want it, where you want it . . . (and at an affordable price)

Once you are in the vicinity of your destination and you switch on your navigation device, by being in proximity to installed beacons in the area you will automatically receive the facility information along your waking route and in all directions around you.

No further action is required, there is no need to send a request or to access the Internet/web or log on and search a database or central system the access to the Internet is to provide a local based services like push information or messages or offers, deals, advertising to the mobile user.

Other systems are still based on the existing search concept where the user submits a query, searches and awaits for the response. All impractical while the user needs the information immediately. The navigation system provides the information automatically, without submitting any query, and the response takes into account the user's location determined by the proximity RF beacons.

The unique approach to detection of the mobile inside the buildings does not need an Internet bandwidth or cellular communication. The Internet or cellular communication provides local based services and additional information that can be pushed to the user device.

And as a result there is no delay or waiting for communication and access time, the communication is instantaneous, triggered directly between the tags/beacons ID and the user's device.

Additionally, each facility type can be ID coded to identify the type of the store etc., e.g. restaurants, men's wear, women's wear etc.

Each ID-coded display of facility can be trigger accessed to information about the store e.g., providing automatic waypoint information.

The ability to operate the innovation using the disclosed applications on a cellular phone, the navigator, with no need for cellular connection to determine the current location, means the user does not need any GPS system.

Moreover, the navigation system can solve the "RTP" (Return to parking) problem, where many forget where they parked their car. The system has an option to save the location on the "cellular phone-parking detector" application that will make it easy to locate the parked car.

The navigation solution is designed for global use and is not limited to malls, stores, amusement parks, museums, sports stadiums etc. It can be implemented in parking garages or parking spaces metered or not, the tags/beacons can be implemented anywhere and in any place to trigger and initiate existing and local application and even link to exiting system and existing software.

It is envisioned that in the future all new construction will have the tags/beacons included in the design, even place addresses, a building addresses can be replaced or use an add-on with the implementation of a tags/beacon in the area to be recognized or scanned by the mobile device.

The system integrates the navigation as part of the NAV4 concepts where it will provide complete solutions for local navigation in an area where the GPS can't work.

The navigation system consists of the following parts:

An infrastructure of tags/beacons, wherein each tag/beacon is installed in a local and known location.

The navigation system is based on mapping and navigation to and in the location, and its aim is to replace or supplement the mall/store guide/map, by installing the tags/beacons in each store or Point Of Interest (POI).

The mapping: As GPS and GPS mapping is not available indoors, the navigation system is based upon the floor plan mapping or floor images available from each facility. For planning ahead, the floor plan or the floor images can be downloaded as part of user's navigation/cellular phone remotely-via Internet as mobile application before reaching the destination or triggered when the destination is reached.

The Navigation uses the most commonly used device in the world today, the cellular phone with Bluetooth interface.

As a difference from other systems and other local based systems, this solution offers a unique approach that can be described as the "Search out of the box" as neither query nor database search is needed; all needed is to know the proximity tags/beacons ID and the cellular phone, working as a Bluetooth device, that automatically scans and recognizes the local area tags/beacons and determines the "user's" location, and provides instant information to the user and to the business in the area.

A typical application is guide and navigating a pedestrian in an environment like a mall, department store, specialty store, conference, trade show, amusement park, university, hospital, school, municipal building, museum, subway, train station, airport, down town center, a finance facility, cruise ship and any type of parking facility . . . or any place when and where GPS cannot be provided or is not accurate or precise enough. The system will be used for navigation by first responders to emergencies or disasters.

The navigation system is part of the broad suite of applications that include a complete solution to the "user" from the time that he parks, or begins looking for a space to park his car, walking to the store/mall or to any indoor facility to when he wants to return to his parked car, looking for the place that he parked.

The suite may includes:

Parking detector—and navigation to the empty available parking space.

Automatic notification of user existence in the place/store/facility

Nav4 mall/store navigation solution inside mall/store.

RTP-return to parking-locate the place that you parked your car.

For example, a typical application could be:

A pedestrian asks the way in a mall to a specific store.

A pedestrian asks the way inside the store, to a specific aisle or product.

A shopper in a department store asks for a specific department.

A pedestrian asks the way to a Point Of Interest (POI). In an emergency, the first response team has to navigate inside a smoke filled building.

A store owner can use the notification and the knowledge of existence for loyalty and rewards.

The beacons ID can trigger a link to existing software and aware the local system of the user existence—such as:

A traveler is check in into a hotel/resort, the hotel/resort can provides with automatic check-in and interface to the hotel/resort front system.

A traveler is check-in into a flight in the airport, the airline provides the traveler with automatic check in to the flight when the traveler reach close proximity to a RF local beacon.

A customer are check into a restaurant or food service, the business will recognize the customer when he in proximity to the local RF beacon.

The pedestrian reach an advertising area or billboard that can recognize the user by being in a close proximity to the advertising area and provide the user with customize personalize advertising or offer.

A customer is entering a store/bank/facility front would be identified/recognized for additional information or services.

The RF beacons/tags can serve to track employee time, including check-in and checkout times from designate area.

The local RF beacons associate with the user mobile can be part of local dating system.

The local RF beacons with associate with the user mobile can create virtual secure zone for child or elderly or any care monitoring.

The location of the user as associate with the local beacons can be interface with social networking.

The RF beacons can be part of solving the parking problems where each parking location can be user an RF beacon with additional sensor to find if the parking area is empty and provide parking information—nav4parking.

The RF beacon can be installed or be a part of a vehicle to provide car application like payments security car broadcasting car tracking car communication and automatic car counting to provide transportation managements with statistically information automatically.

A system and method to provide a user information which is related to the Point Of Interest (POI), the navigation system provides detection and navigation reference, position determination and information related to the object-Point Of Interest (POI), directly and automatically to the user interface-cellular phone upon arriving to a close proximity to the RF tags/beacons installed in the area.

Special operation mode: Shopping: provides navigation to the special sale item in a department store.

Special operating mode: Museums: provides navigation and interactive information from the museum's exhibition to the "user's" cellular phone device via Bluetooth interface.

Special operating mode: Parking: describe in 2 patent applications, provide empty parking space detection and navigation.

Special operating mode: Nav store provides navigation inside a store/department store to a specific department/aisle or specific product, with an option for advertising method and special promotion it also provides the business owner with ability to know, in a way of automatic notification when the "user" cellular phone device is in proximity to the local area for automatic delivery of information related to the store/business owner such information can be but is not limited to deals, coupons, special and even statistically information about the "user" habit.

Every Bluetooth device's tag/beacon has a unique ID. This ID can be used for locating the tag/beacon and providing location information of the mobile device in the proximity.

A relevant location scenario is that of searching for a certain tag. The relevant location scenario is the most accurate and the faster response time and is one solution for indoor navigation and locating when and where each tag/beacon ID is a known address position-waypoint.

Why Use Bluetooth for Indoor Location?

Bluetooth has some advantages in the context of indoor location. These include:

Bluetooth uses RF—in the 2.4 GHz ISM band, specifically. In this frequency range, radio waves penetrate obstacles, such as walls and human bodies, albeit with a substantial loss.

This has two implications:

Availability of a "high-there" application based upon receipt of a signal from the tags/beacons.

Tags/beacons can be placed relatively far apart (typical range is 10-15 meters, i.e. not necessarily of one in each way point).

Bluetooth is ubiquitous-Bluetooth chipsets are being implanted everywhere nowadays (phones, accessories, computing devices, etc), the tags/beacon can be implements anywhere, inside buildings roads inside cars transportation entities, inside home for home automation triggering, or in any kind of business triggering application or and link to exiting system.

The fact that a Bluetooth location system can locate any Bluetooth enabled device, makes it more cost-effective. This means that an increasing fraction of humans and mobile assets around would become locatable in a Bluetooth covered site, with no additional hardware cost (no tags/beacons attached). The only need is to pre-register these devices. Bluetooth is a low power technology-tags need recharge, approx. once a week (or longer, depends on the usage scenario). Non-tags (e.g. BT enabled phones) are being recharged anyway on a regular basis, so they do not need special recharges. If they are being used for location, the fraction added to their usual (no Bluetooth) power consumption is relatively small.

Bluetooth is a low cost technology anticipating high production volumes (hundreds of millions annually) leading to sub-$5 per chip. Several IC manufactured have already met this goal. This would eventually result in a low price for the Bluetooth tags/beacons, if and when Bluetooth location systems would become sufficiently ubiquitous. Bluetooth is a multi-functional communication standard—location is only one of the services that can be supported by a Bluetooth infrastructure. The same infrastructure can be used to provide additional network services, particularly remote monitoring and control or just trigger link to exiting system. In addition, Bluetooth provides voice and IP services (although for the later, WLAN is typically more suitable).

In open spaces, relatively free of obstructions and walls (e.g. a large warehouse or a public hotspot), Bluetooth alone would suffice to provide a −2 meter error range.

Waypoint Navigation

A waypoint is a fixed location with known address location, longitude and latitude and coordinates. The navigation system is capable of storing a database of waypoints for the following purpose:

Waypoints mark a destination, a point along the way to a destination, or a point of reference. Normally, in navigating, a "route" consists of one or more waypoints. To traverse a route, the user navigates to the nearest waypoint, then to the next one in turn until the destination is reached. The system has the ability to compute a great-circle route towards a waypoint, enabling them to find the shortest route even over long distances. The system enables users to locate a destination on a map or indoor floor plan or indoor image and define it as a waypoint. The system is intended for navigation; it can generate a suggested route between two waypoints, based on the cartographic database. The system indicates the user's current location and gives advance notice of an upcoming point.

Because the system knows the waypoint positions, and the distance between them, it is easy to determine the "user's" exact location.

Map Matching

The navigation solution is further enhanced, although it is not essential, when the system knows that the person or object being located is traveling along known routes on a map; for example, the system can assume that people can only follow certain routes in a mall. This is priority information that can be used to "force" the estimated position to be on the nearest point on the possible routes, note that it is easier to predict indoor than outdoor.

The constraints of indoor construction similarly can be used to refine estimates of the position of a person or object moving within a building-people and objects do not pass through walls, they pass along corridors and through doorways. It is a best solution for a system in case of an emergency or for a system for homeland security or a system to locate and inform the subway location, a good example is the hotel exit floor map.

Configuration and Use

In the indoor application, instead of GPS, the system uses known waypoint positions that are manually detected and identified as a demonstration of the concept of using another sensing method, such as RF tags/beacon, to detect and identify the location and the waypoints. Theoretically, it would be possible to convert the waypoint positions into GPS coordinates and emulate an external GPS data source.

This system can be useful for providing navigation to first responder personnel indoors waypoints have been installed in a particular building in the form of RF tags/beacons whose identities are associated with locations—the meaning of identifier, it may be possible to associate magnetic anomaly information with individual tags as well.

One of the important features of the indoor navigation techniques will enhance the ability of tactical team's first response team to navigate within the buildings in which it has been deployed. RF (Bluetooth) Tag/bacon devices commonly are attached to persons or to moveable objects, so that the objects can be tracked using fixed readers (special-purpose radios) at different locations. This is the most common indoor navigation that exists today.

The navigation method is the "flip side" of this practice and is based on the concept that the detection of an RF (Bluetooth) device, or RF Tags/beacon, in a known, fixed location, by a moving reader, such as a Bluetooth enabled cellular phone or other Bluetooth enabled device, provides a precise location of a person or a moving object, by the carrier of the telephone or device, who can supply indoor navigation without GPS.

The navigation method provides a low-cost, reliable system for firefighters and other first responders, inside buildings, to navigate, where a GPS is not reliable-indeed, the GPS signal may have been disabled temporarily to prevent-exploitation by terrorists, or even more likely no signal can be received at all inside a building.

The navigation system foresees this limitation of GPS based systems, and is intended for an environment that is potentially much less "friendly" to RF signals, the environment inside a building that first responders encounter may contain smoke, dust, or flames, and is intended to leverage advances in RF/Bluetooth tag/beacon technology. The navigation system will exploit the capability of storing critical building information, such as the floor maps and the emergency escape plans, for retrieval and navigational assistance via a Bluetooth enabled cellular phone, when and where it is needed, Moreover the navigation system can serve as a navigator for the emergency exit route when and where needed. Each user can load the emergency exit floor plan and escape with the knowledge of his exact location in that route.

Aspects of the Scenarios to be Included:

Identifies and tracks the user (a first response team member)option to use the cellular phone as a beacon by himself.

Provides the user with navigation information and directions for safely exiting the building.

Provides location information of all team members, via an ad hoc network of radio terminals that combine RF/Bluetooth and allow communication chat and messaging between the team members without need for Internet or cell communication such option is not limit to the first response team but to a user in emergency and non-emergency use.

From the outset, the navigation system was designed with the capability to utilize existing technology so it can be deployed as a stand-alone system, or in tandem a link with existing systems. The system focuses on employing technology that is already in place that simply needs to be expanded.

With the implementation of the navigation system, a FIRST RESPONSE TEAM will be empowered to navigate and find its way in a case of emergency or a disaster. This capability can be a critical life-saving power in modern congested urban living conditions, not available before now.

It is believed that the implementation of the navigation system will assist counter-terrorism activities and more importantly will help the first response teams to save the lives of people trapped inside buildings.

Conclusion

The Bluetooth technology offers few unique advantages: one is the ability to scan and locate a small tag/beacon installed in an local area using the tags/beacon ID a low cost and battery power and low battery use and the use of the newest Bluetooth devices (any Bluetooth enabled device that is not a tag/beacon, e.g. most of the newer mobile phones) can be used as a tag/beacon.

The other advantage is the multiservice nature of the Bluetooth infrastructure that enables using the tags/beacons for other purposes, such as for navigating, remote monitoring and control, a triggering mechanism to application and system even a link to existing systems and for a variety of messaging a push information and local based services.

Location based services are rapidly expanding. Outdoor location technologies are mainly based on GPS technologies. GPS cannot perform properly indoors, and is therefore inadequate. As a result, indoor location systems are appearing on the market.

The need for a system arises from various market segments and applications. One example in the market is the GPS based systems that use integrated positioning and navigation systems based on GPS receivers as the primary positioning technology. Subsequent to the events of September 11th' the Federal government mandated that GPS capability be built in to all cellular phones.

However, the fact that uninterrupted satellite reception is not possible in many locations is a major limitation of GPS based systems. Densely populated areas and radio-frequency-signal shadowed locations, such as urban centers (a.k.a. "urban canyons"), generally do not allow proper operation of GPS, yet it is in these locations that the need is greatest.

There is a clear need for a cost effective system that maintains performance indoors, in urban canyons and in city centers.

The disclosed application includes finding a solution to this task by providing a system and method to generate automatically the waypoint along the user route ether indoor, or outdoor.

The disclosed application addresses the task of interactively guiding the user to a desired indoor and outdoor destination.

The method for mapping an indoor environment is provided. A user device may receive an indication of a starting point on a floor plan. The user device may prompt the user to travel in a particular direction, or the direction of travel may be determined by the user device in response to the user indicating a second location after the user has traveled to the second location.

As the user travels from the starting point in the designated direction, the user device may gather information about the indoor environment. For example, the user device may gather wireless signal strength data, from proximity RF beacons Wi-Fi or Bluetooth while the user travels in the designated direction.

The user device may associate the gathered information with the path the user traveled from the starting point to the ending point. The operation can be done at the user device—the cellular handheld, the association may also be performed by a remote server using data provided by the user device.

As the user travels from point to point, the user's device may indicate the area for which valid location information is available based on the path the user traveled and the information the user collected.

The method may include displaying a floor plan image or floor mapping or the floor indoor view—the floor images corresponding to an indoor location, receiving a first input to indicate a first location on the floor plan image, gathering initial location information at the first location, and generating an indoor map, using a processor, using the initial location information wherein the indoor map includes an association of the initial location information with the first location.

The method may further include repeating the location information gathering process at a new location to associate new location information with the new location in the indoor map.

The method may include gathering additional location information as the user travels from the first location to a second location, receiving a second input to indicate the second location on the floor plan image, determining a path from the first location to the second location, and associating the additional location information with at least one location within the map corresponding to the path.

The method may include prompting the user to walk in a straight line when traveling from the first location to the second location.

The method may include providing instructions to a user to travel in a particular direction. The location information may be wireless signal data associated with one or more RF wireless beacons installed in the local area. The first input may include performing a selection operation with an indicator placed on the floor plan image.

The method may also include providing a visual indication on the floor plan image of the path. The visual indication may indicate an area of the indoor map where the location information identifies a particular location. The building floor plan may be received from a remote via Internet or cellular communication as part of the mapping and navigation application.

The method may also include determining an approximate location determine by proximity to the RF beacons, providing the approximate location to the remote server, receiving a list of floor plans associated with indoor environments proximate to the approximate location, and selecting the building floor plan from the list. The method may include identifying the user's direction of travel by at least one of determining a relative orientation using the first location and the second location, or using at least one of an user device built-in sensors, accelerometer, a gyroscope, or a compass.

The method may include determining a location precision for the data gathering operation, and using the location precision to determine a location resolution for the indoor map. The location precision may be determined using a number of available RF wireless beacons for which signal strength data and the beacons ID are available. The location precision may determine at least one of the size of an indicator for indicating the current location or the accuracy radius circle, or the width of a stripe for indicating an area of the indoor map for which the location information has been gathered and will display overly on the floor map image map building map. The method may include determining a coverage level of the indoor map compared to the floor plan images.

The navigation system and method automatically updates waypoints, when each Point Of Interest (POI) will have an RF tag/beacon that will broadcast an RF ID signal that will provide an instant detection, the navigation system will execute the specified file/program that will trigger automatically, executing a waypoint generation program.

For some years, local governments in cooperation with various FM radio stations and recently a navigation system have been putting together an automated way to get real-time traffic data into cars so drivers can avoid traffic. Real time traffic information includes news such as: congestion, construction, traffic accidents, recommended alternative routes, recent navigation systems depend on fix sensors or camera and some navigation on manual information provided by the users/drivers.

A tag/beacon will be installed at the location or at each Point Of Interest (POI). The tag/sensor will broadcast RF signal contain ID to be recognized by the mobile phone and such information (the RF beacon ID) will transfer automatically via the user mobile phone to the provided location detection of the user as well as statistically information about the possible "traffic" in the area/road, such method can be extremely helpful to manage and control transportation system.

The "user" will no longer need to enter his way—points manually and then wait for the providers of maps or GPS to update their maps with the information (this can take about a year in some cases). This way the "user" will receive the information that he needs when he needs it and where he needs it upon entering an area with tags/beacons, providing an automatic "check-in" to the user and the facility business.

Again, no communication is need to be established between the tags/beacon and the user mobile device and the detection can be done without any communication at all, In the event that more information is required it may be necessary to connect to the Internet website.

It is believed that sooner or later it will be a standard procedure to install a tag/sensor on every location of interest (waypoint) or any place on road indoor and even outdoor or any business will provide waypoint information to the "users". Most stores or POI/waypoints will be willing to pay for a tag/beacon or pay subscription fee to be on the mapping system on the local area that will show their location and information on a map. Or they will pay for an annual listing (similar to the yellow pages).

The System can interface with existing GPS mapping outdoors as well as indoors, it can switch automatically where the user outdoor to receive an outdoor map and information based on GPS and when in the indoor to receive an indoor mapping and indoor navigation based on RF beacons detections.

Presently GPS providers, map providers and search engines provide: City Navigator and Metro Guide Maps that contain many thousands of attractions.

These include: Food and Lodging, Attractions, Entertainment, Shopping, Services, Transportation, Emergency, and Government offices. In most areas, the maps provided are not updated and sometimes provide misleading information. Some of the waypoints listed appear to be very old and the information associated with them is not update. Listed Attractions include theme parks, museums, libraries, schools, parks and such. This feature is very useful in an unfamiliar area.

Waypoints will be located automatically in the local area and plotted on the map screen. The waypoints can be stored on the local map at the handheld phone for future access.

The navigation system will revolutionize the GPS based systems and the mapping industry, from GPS, mapping companies' communication providers, car manufacturers to yellow pages and local guides; for the first time the user of a GPS navigation system will have an easy, reliable way to reach a destination inside buildings facilities—the indoor world.

The most common problem with today's GPS based systems is indoors where the navigation and mapping is not existing. The navigation system provides the solution for this problem. Using the navigation system, the user will know where he is, be able to identify "landmarks" around him accurately, and receive automatic updates directly from the Points Of Interest (POI) in the vicinity that get automatic notifications about his presence in their area.

The navigation system is based on RF tag/beacons, each tag or waypoints has its own ID (identifying the waypoint by type, address, etc.). The beacon will broadcast, via RF the ID to be scan and pickup by the Bluetooth device, provides a detection and trigger a location determination as a floating information display on the indoor map referenced to the user's location. The floating display will provide automatic waypoint updates around the local area and will allow the user to search local providers (waypoints/store), even without any connections, no communication, Internet, or cellular is needed to determine the location as well as accuracy radius circle. The Internet web communication provides more information such as push notification and messaging and local based services such as deals, advertising directly and automatically to the user's mobile phone.

Once you are in the vicinity of your destination and, a notification is sent automatically to the business Internet or web site and you will automatically receive the facility information along your waking route and in all directions around you.

No further action is required, there is no need to send a request or to access and search a database or central system.

Other systems must send a request to a central system, or to a database, and then must wait for a response. This takes time!

The disclosed unique approach results in no delay or waiting for communication or authentication and access time as there is no real communication between the tags/beacons and the user mobile device, the result are instantaneous association, directly between the tags/beacons and the user's mobile or navigation device.

The RF tags/beacons broadcast their ID to be scanned and pickup by the user's mobile phone to identify the location of the user as proximity to the tags/beacon.

Additionally, the ID identifies the type of facility, store etc., e.g. restaurants, men's wear, women's wear etc. and the location in the store, e.g. front, back etc.

Each facility can provide information about the store e.g., automatic waypoint information as the user's presence triggers initiates automatically notifies the business or waypoint in the local area.

Do to the limitation of the mapping system currently used by the GPS navigation system the associated display method is our unique way to bridge existing devices like cellular phones, in-car navigation and other Bluetooth devices. The system provides an associated overlay navigation display method as a real-time floating display, or as a waypoint to overcome the limitations of GPS based systems and the existing mapping systems; especially indoors where each waypoint will be displayed over mapping or floor map images.

The display method is one unique way to bridge existing devices like cellular phones, as a real-time floating overlay on a directional circular display to overcome the limitations of GPS based systems and the existing mapping systems.

The overlay add-up device/display works like a VOR and provides add-up display shows automatically the user location in the immediate area in a circle represent a radius of accuracy and proximity distance from the local detect beacon/tag.

The overlay displays over an existing navigation system, portable device or cellular phone without GPS support providing a circle that shown the location accuracy of the user on the local map.

The fact is: no digital maps are entirely accurate. A user needs to know which map makers are used by the product that they are interested in and check the maps for the area that they are concerned about. In addition some map databases are created from vector data while others are just scanned copies of paper maps. In addition to mapping data these same map makers can often provide Points Of Interest (POI) data. However, a software company might use the maps from one company and the poi data from another. POI data normally takes three forms. One is public buildings, parks, airports, and possibly geographic objects. A second is government locations that include specialized points lists like marker buoys, and airplane markers. Finally, there are commercial establishments that usually include some information about their product and contact data. Note that the location of commercial places is often derived from the street address and is not based on the actual lat/lon location. Moreover there is the sky-high cost of digitizing and updating the poi and the waypoints.

The task is to provide a solution when the "user" will receive real-time Point Of Interest (POI) or waypoints in the area where he is automatically associate with a located proximity beacons/tags in the area, the waypoints information can be information that are real-time information updates in real-time and can be changed according to the waypoints and all according to a proximity detection of the RF tags/beacons ID in the area, the information can be used in these example applications:

The user may wish to locate an empty available parking space in his vicinity. Just think of the empty parking spaces as waypoints the parking space occupied with RF beacon and sensor to find if the parking is empty, and the RF beacon will broadcast ID only when the parking space is available, the user Bluetooth device will scan the area for the broadcast beacons to find the available parking, such method describe in more details with U.S. Pat. No. 7,899,583 (included in the claim of priority and issued to the Applicant and incorporated herein by reference).

The user may wish to see and locate the real estate property available in his area according to his location, where an RF beacon can be installed in each real estate property to trigger more information to the user/possible client when he reach proximity to the property.

The user may wish to locate a specific store in a shopping mall, each store in a mall is a waypoint, or a particular aisle in a department store, or a specific item on a shelf.

The user may wish to locate a specific conference room in a convention center, or a Point Of Interest (POI) in an amusement park or a Point Of Interest (POI) in a museum.

The user may wish to find the emergency exit route in a time of emergency or the first response team needs to navigate in a facility in an emergency situation.

The user may be looking for a train location in a station, or stops in a subway or underground train system. All of that is updated waypoints in real-time.

It is believed that the automatic waypoint updates revolutionize the GPS and Navigation Industry.

For the first time the user will know what he wants and when he wants and according to his location.

The local business owner can introduce his content in real-time to the (navigation) users in his area automatically when the user access or enter to his store the contents can be deals, coupons, specials and provides more information to user about the business, the business in turn can benefit from statistically information about the client/s, such as habits, profile, loyalty and rewards.

The GPS and navigation industry can tap to the huge local advertising market (estimated at 134B in US alone . . . )

Automatic notification of user existence in the place/store/facility.

Mall/store navigation solution inside mall/store.

RTP-return to parking-locate the place that you parked your car.

For example, a typical application could be:

A pedestrian asks the way in a mall to a specific store.

A pedestrian asks the way inside the store, to a specific aisle or product.

A shopper in a department store asks for a specific department.

A pedestrian asks the way to a Point Of Interest (POI). In an emergency, the first response team has to navigate inside a smoke filled building.

A store owner can use the notification and the knowledge of existence for loyalty and rewards.

The beacons ID can trigger a link to exiting software and aware the local system of the user existence—such as:

A traveler is check in into a hotel/resort, the hotel/resort can provides with automatic check-in and interface to the hotel/resort front system.

A traveler is check-in into a flight in the airport, the airline provides the traveler with automatic check in to the flight when the traveler reach close proximity to a RF local beacon.

A customer are check into a restaurant or food service, the business will recognize the customer when he in proximity to the local RF beacon.

The pedestrian reaches an advertising area or billboard that can be recognized by the user by being in a close proximity to the advertising area and provide the user with customize personalize advertising or offer.

A customer is entering a store/bank/facility front to be recognized for additional information or services.

The RF beacons/tags can serve to track employee's work times, including a check-in and checkout time from a designate area.

The infrastructure provided by local RF beacons can be integrated into a local dating system.

The local RF beacons with associate with the user mobile can create virtual secure zone for child or elderly or any care monitoring.

The location of the user as associate with the local beacons can be interface with social networking.

The RF beacons can be part of solving the parking problems where each parking location can be user an RF beacon with additional sensor to find if the parking area is empty and provide parking information—nav4parking, the RF beacon will broadcast ID only when the parking space is available, the user Bluetooth device will scan the area for the broadcast beacons to find the available parking, such method describe in more details in U.S. Pat. No. 7,899,583 issued to the Inventor and claimed as priority herein.

The RF beacon can be installed or be a part of a vehicle to provide car application like payments security car broadcasting car tracking car communication and automatic car counting to provide transportation managements with statistically information automatically.

A system and method to provide a user information which is related to the Point Of Interest (POI), the navigation system provides detection and navigation references, position determination and information related to the object-Point Of Interest (POI) directly and automatically to the user interface-cellular phone upon arriving to a close proximity to the RF tags/beacons installed in the area.

Moreover the application provides more than simply an icon.

At present, no prior art device utilizes the capabilities to display a real-time representation of navigating and get an update directly from the waypoints. Also most systems are designed for the old query type search where interface to Internet and or database central system is needed.

The navigation system automatically detects a signal directly from the RF tags/beacons installed in the waypoints, no communication needs to be established between the mobile phone and the RF tag/beacon not even cellular communication, and no pairing needed. Other systems must have bandwidth available, over which to send a request to a central system or to a database and then must wait for a response, or they need Internet connections. This takes time!

Even if the other systems have bandwidth, they are still based on the existing search concept where the user submits a query, searches and waits for the response. This is impractical. The navigation system provides the information automatically, without submitting any query, and the response is according to the user's location based on RF tags/beacons installed in the local area.

Again, most of the existing prior arts are based either on a GPS based system or the existing car navigator, that depends on a GPS too.

And the existing mapping that these systems use has the same limitations, described previously, and is impractical.

This navigation system bridges the gap between the GPS based navigation and provides a complete solution.

U.S. Pat. No. 7,031,875 Ellenby et al. describes a pointing system for addressing objects, and provides a system and method based on GPS and Internet/database communication, it is not exactly a navigation but an information based system that need the GPS to locate the user location so indoor services is likely out of the questions and the need for communication as well with GPS limits its availability and accuracy. It is not a real-time update of the waypoints and needs Internet and or central database communication.

The most common problem with today's GPS based systems is that the mapping and the waypoints are not updated on a timely basis. In most areas, the maps provided are not updated and sometimes provide misleading information. Some of the waypoints listed appear to be about 2 years old. The new service like Google Earth provides satellite images that are almost 2 years old and for sure can't provide on-line real-time accurate picture of the existing area and the waypoints.

The disclosed technology offers a solution to this task by providing a system and method to generate automatically the waypoint along the user route ether indoor or outdoor the update is based on determine location of the mobile device indoor in proximity to installed RF beacons and the update information triggered by the location determination, such method is not exist in today navigation or mapping especially indoor.

The disclosed technology offers a solution that interactively guides the user to a desired indoor and outdoor destination.

The navigation system and method automatically updates waypoints, by means of an interface to an existing GPS based system, when each Point Of Interest (POI) will have an RF tag/sensor that will broadcast an RF signal that can be converted to a GPS waypoint, In response to the RF signal (from the tags/sensors,) the navigation system will execute the specified file/program that will trigger automatically, executing a waypoint generation program.

For some years, local governments in cooperation with various FM radio stations have been putting together an automated way to get real-time traffic data into cars so drivers can avoid traffic. Real time traffic information includes news such as: congestion, construction, traffic accidents, and recommended alternative routes.

An RF tag/beacon Bluetooth and or Wi-Fi will be installed at each Point Of Interest (POI). When each Point Of Interest (POI) will have an RF tag/beacon that will broadcast an wireless RF signal with ID that will provide an instant detection, the navigation or the application for local based services system will execute the specified file/program that will trigger automatically, executing a waypoint generation program and at the same time provides the business owner a notification of existence of the user in his vicinity to allow the business to provide the user with relevant messages or offers, more information or push message to the user cellular phone just by being in proximity to the RF beacon.

The "user" will no longer need to enter his way—points manually and then wait for the providers of maps or GPS to update their maps with the information (this can take about a year in some cases). This way the "user" will receive the information that he needs when he needs it and where he needs it.

It provides trigger information according to the beacon/tag, directly from the local area business waypoints and to the user's display device, the detection can be done without any communication In the event that more information is required and the business need to provide more information it may be necessary to connect to the Internet, its allow interaction/engagement as proximity to the RF Bluetooth beacon can trigger a specific application functionalities and provides automatic notification "I am here" to the business owner.

It is believed that sooner or later it will be a standard procedure to install a tag/beacon on every location of interest (waypoint) or any business will provide a waypoint information to the to provide "users" with the information. Most stores or POI/waypoints will be willing to pay for a tag/beacons or pay subscription fee to be on the GPS system providers that are able to show their location and information on a map. Or they will pay for an annual listing (similar to the yellow pages).

The System can interface with existing GPS.

Present GPS providers, map providers and search engines providers: City Navigator and Metro Guide Maps contain many thousands of attractions.

These include: Food and Drink, Lodging, Attractions, Entertainment, Shopping, Services, Transportation, Emergency and Government offices.

In most areas, the maps provided are not updated and sometimes provide misleading information. Some of the waypoints listed appear to be about 2 years old. Listed Attractions include theme parks, museums, libraries, schools, parks and such. This feature is very useful in an unfamiliar area. Waypoints will be located automatically in the local area and plotted on the map screen. The waypoints can be stored on the GPS database for future access or store at the user mobile device.

The navigation system will revolutionize the GPS based systems and the mapping industry, from GPS, mapping companies' communication providers, car manufacturers to yellow pages and local guides; for the first time the user of a GPS navigation system will have an easy, reliable way to reach a destination.

The most common problem with today's GPS based systems is that the mapping and the waypoints are not updated on a timely basis. The navigation system provides a solution for this problem. Using the navigation system, the user will know where he is, be able to identify "landmarks" around him accurately, and receive automatic updates directly from the Points Of Interest (POI) in the vicinity.

The navigation system is based on RF tag beacons installed in the local area, each tag or waypoints has its own ID (identifying the waypoint by type, address, etc.). The tag beacon ID and proximity to the RF beacons will allow local detection and interface with existing or indoor application and navigation, GPS based systems, as a floating information display on the GPS map referenced to the user's location. The floating display will provide automatic waypoint updates and will allow the user to search local providers (waypoints/store and more information about the store/business, the detection allows the local business to have an automatic notification about the user whereabouts in proximity to his business and allow him to provide the user with more information about his store/business/deals.

The fact is no digital maps are entirely accurate. A user needs to know which map makers are used by the product that they are interested in and check the maps for the area that they are concerned about. In addition some map databases are created from vector data while others are just scanned copies of paper maps. In addition to mapping data these same map makers can often provide Points Of Interest (POI) data. However, a software company might use the maps from one company and the poi data from another. POI data normally takes three forms. One is public buildings, parks, airports, and possibly geographic objects. A second is government locations that include specialized points lists like marker buoys and airplane marker. Finally, there are commercial establishments that usually include some information about their product and contact data. Note that the location of commercial places is often derived from the street address and is not based on the actual lat/lon location.

Moreover there is the sky-high cost of digitizing and updating the poi and the waypoints.

The task is to provide a solution where the "user" will receive real-time Point Of Interest (POI) or waypoints in the area automatically to his existing navigation system or to his cellular phone, the waypoints information can be a real-time information update in real-time and can be changed according to the waypoints.

A cellular phone application, which the user will scan the area for exiting RF Bluetooth beacons or Wi-Fi beacons will receive data and more information utilizing the cellular phone's Bluetooth capability.

The system can trigger application as well as link to existing systems and software. A notification can be sent to a web, email a cloud application or even social network, The navigation system will interface with existing in-car media system and in car navigation systems.

It is understood that the waypoint or Point of Interest (POI) will be represented by the following suggested ID examples as part of the beacon ID to be recognized by the user Bluetooth mobile device (cellular phone), according to the type of the POI:

| ID Code | POI Type | Waypoint Cat. Type |
| --- | --- | --- |
| 32 | Food/Restaurants | Food |
| 33 | Gas Station | Information |
| 34 | ATM/Banks | Finance |
| 35 | Department Store | |
| 36 | Apparel | Store |
| 37 | Sports | Store/Information |
| 38 | Books video | Store |
| 39 | Jewelry | Store |
| 40 | Toys/Photo/Elect. | Store |
| 41 | Music | Store |
| 42 | Gifts | Store |
| 43 | Furnishing | Store |
| 44 | Service | Service |
| 45 | Computers | Store/Service |
| 46 | Hairstyle/Cosmetics | Store/Service |
| 47 | Office | Office |
| 48 | Security/Police | Service/Emergency |
| 49 | Children's program | Service |
| 50 | Social Affairs | Religious Service |
| 51 | Religion | Religious |
| 52 | Phone | Service |
| 53 | Travel | Transportation Service |
| 54 | Parking | Transportation Service |
| 55 | Guest service | Service |
| 56 | Library | Service |
| 57 | Transportation | Management Service |
| 58 | Municipal | |
| 59 | Post Office | Service |
| 60 | Government | |
| 61 | Market | Store/Service |
| 62 | Alarm | Emergency |
| 63 | Emergency | |
| 64 | Hotel resort and cruise ship | |
| 65 | Education facility, school, university | |
| 66 | Sport facility, sports arena, stadium | |
| 67 | Conference and show | |
| 68 | Amusement park | |
| 69 | Implements as mail and address | |
| 70 | Implements in a road as road sign or transportation entity | |

Be remember that the ID above is only suggested example, the fact is that part of the beacon ID will be to recognize the Facility/store type the location to provide instant detection and location determination by just being in a close proximity to the RF beacon in the area.

The navigation system enables remote and local update of the local floor plans and the information about the local area and waypoints business in the area, when the location's indoor application can be triggered to download at the destination. An example of this would be at the entrance of a shopping mall, department store, amusement park, museum, parking garage or the downtown area of a city where a sign or the shopping mall information sign will provides direct information a trigger to download the local application.

The system can work inside a building whereas GPS cannot. Local detection is obtained via popular Bluetooth interface.

The system provides information about each facility/store, including information about the type of the facility, for example: type of store or product etc., the information trigger to deliver to the user mobile device by being in proximity to the RF beacon ID that installed in the local area.

By providing the ability to locate a the user in an area using a Bluetooth enabled device or a cellular phone with the navigation application, the system overcomes the anxiety of "Where am I" and also facilitates finding a parked car later via the RTP (Return to Parking) feature.

The system has the capability to perform all the functions of a search and can become the "Next generation search out of the box".

The navigation system can be an attractive addition to existing deployments of Wi-Fi and Wi-Fi hotspots and a feature for business and cities that deploy Wi-Fi.

In case of an emergency or security situation, the system can provide authorities with information.

Utilizing the navigation system, the facilities (waypoints) in the vicinity around the "user" car are displayed on a floating overlay using either a cellular phone application, or a standalone device, or an existing installed navigation system with or without any mapping, the information can be pushed to the user's device when he in proximity to the area.

The recent introduction of imagery services, such as Google Earth and its competitors, that are offered as an enhancement to GPS at a fee, still provide out of date information, with the unsatisfactory result that users encounter road changes and area development not shown on the maps and imagery.

The option of downloading a floor plan can be exercised either remotely or locally as part of mapping or navigation application.

With the navigation system, the user will have the information that they want, when they want it, where you they it . . . (and at an affordable price) Once you are in the vicinity of your destination and you switch on your navigation device, you will automatically receive the facility information along your waking route and in all directions around you.

Additionally, each facility type can be ID-coded apart of the beacon ID to identify the type of the store etc., e.g. restaurants, men's wear, women's wear etc. the store type, real estate property, garage sale location, special sale and all up to date real time information that can't be displayed and located in today's navigation system, and tapping to the local business industry is known as local advertising.

Each ID-coded as part of the beacon ID can be trigger accessed to obtain complete information about the store e.g., automatic waypoint information.

The system can be operate on a cellular phone, and navigation system and is not limited to a GPS navigation system.

Moreover, the navigation system can solve the "RTP" (Return to parking) problem, where many forget where they parked their car. The system has an option to save the location on the "cellular phone-parking detector" application, which will make it easy to locate the parked car.

The navigation system is designed for global use and is not limited to malls, stores, amusement parks, museums, sports stadiums etc. It can be implemented in parking garages or parking spaces metered or not, almost anywhere and in any place even in any infrastructure.

It is envisioned that in the future all new construction/infrastructure will have the beacons/tags included in the design or built in the structure.

One feature of the proposed invention integrates the navigation as part of the NAV4 concepts where it will provide complete solutions for local navigation in an area where the GPS and GPS mapping just can't provide accurate and updated information that is so essential to the user.

A typical application is navigating a pedestrian in an environment like a mall, department store, specialty store, conference, trade show, amusement park, university, hospital, school, municipal building, museum, subway, train station, airport, down town center, any type of parking facility . . . or any place when and where GPS cannot be provided or is not accurate or precise enough. The system can be used for navigation by first responders to emergencies or disasters.

The navigation system is part of a broad suite of applications that include a complete solution to the "user" from the time that he parks, or begins looking for a space to park his car, walking to the store/mall to when he wants to return to his parked car, looking for the place that he parked.

The suite may include:
Parking detector—and navigation to the empty available parking space.
Nav4 mall/store navigation solution inside mall or store.
RTP-return to parking-locate the place that you parked your car.
For example, a typical application could be:
A pedestrian asks the way in a mall to a specific store.
A pedestrian asks the way inside the store, to a specific aisle or product.
A shopper in a department store asks for a specific department.
A pedestrian asks the way to a Point Of Interest (POI).
In an emergency, the first response team has to navigate inside a smoke filled building.
A system and method to provide user information which is related to the Point Of Interest (POI).

The navigation system provides detection and navigation reference, position determination and information related to the object-Point Of Interest (POI) directly and automatically to the user interface-cellular phone without any communication help of Internet/web or cellular needed . . . .

Special operation mode:-Shopping— NAV4SALE-provides navigation to the special sale item in a department store. A new unique tool for the business owner as well to the customers—to navigate and locate an item in a store/mall that's on a special sale, will provide the "user" a way to navigate in/out door for the "waypoint" represents the special sale, coupon, special event, promo etc. . . . an add-on to local advertising.

The local advertising market is estimated to be $134 Billion in the US alone . . . , the mapping is at the "forefront" of a local strategy. Due to the lack of availability of the GPS indoors as well with the limitation of its accuracy outdoors and the non-updated mapping that is provided today by the mapping and GPS industry, there is no real tapping to this huge market.

The navigation system can bring a new life to the navigation and mapping industry by providing a unique innovation that combines the GPS and the existing navigation as well as the cellular phone users with an indoor navigation based on the local map/mall that will provide the user a navigation to his desire location in the mall/store to the right store/product even isle inside the store as well a new marketing tool to the store/mall owner to get the customer with a new service. A new unique way to bring the customers to the product in sale . . . , direct the customer directly to the isle and to the product that you want to move. The store will also have an option to deliver more content (advertising, sale, coupons, promo etc. . . . ) to the user when he approaches the store or is already inside via push technology to the user's Bluetooth enabled cellular phone.

Special operating mode:-Museums— NAY4Museums NAV SHOW and NAY CONFERENCE provides navigation and interactive information from the museum's show or conference exhibition to the "user's" cellular phone device via Bluetooth interface.

Explore museum or conference show exhibits in a new unique and easy way, find your way around when navigating on the floor map of the museum or conference, indoor navigation, navigate to exhibits, restaurants, cafes, lavatories etc., all to the "user's" navigation or cellular phone.

Any museum, conference, or show provides the attended a map to the exhibits, some also provide additional audio device (headset) to get more information on the exhibits.

The navigation system will provide a unique indoor tool that will allow the attended to navigate the museum, conference or show in an easy way directly to his Bluetooth enabled cellular phone, when he reaches his desired exhibit he will allow to download directly to his cellular or Bluetooth headset information about the exhibits. An indoor navigation to the exhibits as well to the restaurants, cafes, lavatories etc., all to the "user" navigation or cellular phone and based on the facility map.

Special operating Mode: Navtrain— For all the users of mass transportation system, the navigation system will allow, locate and point the "user" to the exact station or location on a route, an easy way to navigate in the train, subway, underground system, a new way of "subway" or bus mapping in/out door and directly to the user navigation or his cellular phone. Every day millions of people are using the mass transportation system, trains, subways, buses, each of the passengers depend on the transportation map for the route information as well as schedules and additional services provided by the transportation system. Most of the passengers today carry with them a cellular phone.

The navigation system will provide the passenger with the navigation inside the transportation system directly to the passenger's Bluetooth enabled phone, the passenger will know the exact location/station on the route as well with additional option information like schedules. A new add-on service to the transportation providers as well to the passengers, utilizes the indoor navigation method and the ability of the transportation entity to use the RF beacon installed in a transportation facilities to have add-on to transportation management control system.

Special operating mode:-Parking— NAY4PARKING describe in 2 patent applications, provides empty parking space detection and navigation, where is the RF beacons can be part of solving the parking problems where each parking location can be user an RF beacon with additional sensor to find if the parking area is empty and provide parking information—nav4parking. the RF beacon will broadcast ID only when the parking space is available, the user Bluetooth device will scan the area for the broadcast beacons to find the available parking, such method describe in more details in U.S. Pat. No. 7,899,583 issued to the Inventor and claimed as priority herewith.

A new generation of urban parking innovation that answers the most demanding need of any driver knowing where to park . . . , or more precisely, find and navigate to the empty parking spaces in and around the driver. It will also provide the answer to "where did I park my car?" syndrome, when returning to the parked car. In our society where time, convenience and comfort are precious commodities parking is a major headache.

Parking Detection System is the next generation of urban parking and the answer to the most demanding need of any driver—Where to park?

The navigation system provides a method of self organizing parking system will enable municipalities and other parking authorities to easily identify, exploit and manage revenue opportunities while at the same time providing better service at a lower operating cost. With the implementation of the navigation system, navigating and detecting available parking spaces will become part of the information revolution.

With the navigation system, drivers will save time and reduce the frustration of hunting for parking spaces, and will also save money on gas use and car maintenance costs.

By using and modifying existing technology, our system will integrate easily with other transportation and communication systems. The RF beacon can be attached to existing parking meters, and in the future will interface with them and eventually will replace them.

Municipalities will have better control and centralized monitoring of their parking space inventory, resulting from the new generation of urban parking.

Special operating mode: NAYRealty—A new unique tool to accommodate the real estate industry by providing the seller/the real estate agent as well as the real-estate customer to locate and navigate to the available real estate property in the "user" area, according to his location and directly to his GPS navigator and/or cellular phone. The user may wish to see and locate the real estate property available in his area according to his location, where an RF beacon can be installed in each real estate property to trigger more information about the available property to the user/possible client when he reach proximity to the property.

According to the Newspaper Association of America, the real estate advertising market is estimated at $11.5 Billion. Recently Mynewplace.com joined apartments.com and rent-.com in the $3 Billion on-line apartment listing. ZILLOW, a new startup company just raised $32M in founding with the basic idea to put your house on Google Earth-satellite mapping. Google, Yahoo, AOL, ASK and Microsoft are looking to develop real estate products.

The navigation system brings the listing to the user's hand, by combining the GPS navigation and or cellular phone the user will be allowed to get the real estate property in his area updated according to his location in real time.

The user even will have the option to "search out of the box" of property in his area. The navigation system will serve as a new tool for the real estate industry as well to the search engine for the benefit of the seller/the real estate agent as well as the real-estate customer.

Special operating mode:-NAV4STORE and NAVMALL provides navigation inside a store/department store to a specific department/aisle or specific product, with the option for advertising methods and special promotions. Explore the indoor mall or inside a department store, navigate to the right place or the store or the department that you need.

Navigate on the mall map/store mapping to find your way around using your cellular phone or navigation system without a GPS. It will be a new kind of service and a new marketing strategy for the malls/store business owners. An add-on to local advertising.

The local advertising market is estimated to be $134 Billion in the US alone . . . , the mapping is at the "forefront" of local strategy. Due to the lack of availability of the GPS indoors as well as the limitation of its accuracy outdoors and the non-updated mapping that is provided today by the mapping and GPS industry there is no real tapping to this huge market.

The navigation system can bring a new life to the Navigation and mapping industry by providing a unique innovation that combines the GPS and the existing navigation as well as the cellular phone users with an indoor navigation based on the local map/mall that will provide the user a navigation to his desired location in the mall/store to the right store/product even isle inside the store as well a new marketing tool to the store/mall owner to get the customer with a new service. The store will also have an option to deliver more content (advertising, sale, coupons, promo etc.) to the user when he approach the store or is already inside via push or Internet to the user's Bluetooth enabled cellular phone.

Special operating mode:-NAV Amusement Parks—Theme and amusements Park navigation, navigate to your desired attraction as well as a new way to register a "fast pass" kind off lane . . . all in an easy way to the "user" cellular phone without the need for GPS. Provides a new media and-on service.

Ever wonder what it will be like to navigate inside the amusements park to the desired attraction, to know the schedules of the show events at the attractions and even to get your "fast pass" from a remote instead of standing in line . . . . With the navigation system, all this can become a reality and go directly to your cellular phone without the need for a GPS. It is understood that the present invention can provide a new tool and service to the benefit of the amusements parks as well to the user.

Special operating mode:-NAVSIGN—will provide the user with automatic generating waypoint of the road sign to be displayed on the user navigation and or cellular phone or the car navigation or on the dash board as a way for secure driving, the information can interface to the car computer for example automatically slowing down when it enters a school zone-NAVSIGN.

Special operating mode:-NAV EMERGENCY: One of the important features of our indoor navigation techniques will enhance the ability of the first response team to navigate within the buildings in which it has been deployed.

The navigation system provides a method that is a low-cost, reliable solution for firefighters and other first responders, inside buildings, to navigate where a GPS is not reliable-indeed, the GPS signal may have been disabled temporarily to prevent exploitation by terrorists, or even more likely no signal can be received at all inside a building.

The navigation system envisioned this limitation of GPS based systems, and is intended for an environment that is potentially much less "friendly", the environment inside a building that first responders encounter may contain smoke, dust, or flames, and is intended to leverage advances in ubiquitous RF/Bluetooth tag technology.

The navigation system will exploit the capability of storing critical building information, such as the floor maps and the emergency escape plans, for retrieval and navigational assistance via a Bluetooth enabled cellular phone, when and where it is needed. Moreover the navigation system can serve as a navigator for the emergency exit route when and where it is needed. Each user can download the emergency exit floor plan and escape with the knowledge of his exact location in that route.

Aspects of the scenarios to be included:

Identifies and tracks the user (a first response team member).

Provides the user with navigation information and directions for safely exiting the building.

Provides location information of all team members, via an ad hoc network of radio terminals that combine RF/Bluetooth and allow communication chat and messaging between the team members without need for Internet or cell communication such option is not limit to the first response team but to a user in emergency and non-emergency use.

From the outset, the navigation system was been designed with the capability to utilize existing technology so it can be deployed as a stand-alone system, or in tandem with existing systems.

With the implementation of the navigation system, a FIRST RESPONSE TEAM will be empowered to navigate and find its way in a case of emergency or a disaster. This capability can be a critical life saving power in modern congested urban living conditions that was not available before now.

It is believed that implementation of the navigation system will assist counter-terrorism activities and more importantly will help the first response teams to save the lives of people trapped inside buildings.

Waypoint Navigation

A waypoint is a fixed location with known address location, longitude and latitude and coordinates. The navigation system is capable of storing a database of waypoints for the following purpose:

Waypoints mark a destination, a point along the way to a destination, or a point of reference. Normally, navigating, a "route" consists of one or more waypoints. To traverse a route, the user navigates to the nearest waypoint, then to the next one in turn until the destination is reached. The system has the ability to compute a great-circle route towards a waypoint, enabling them to find the shortest route even over long distances. The system enables users to locate a destination on a map and define it as a waypoint. The system is intended for navigation; it can generate a suggested route between two waypoints, based on the cartographic database. The system indicates the user's current location and gives advance notice of an upcoming point.

Because the system knows the waypoint positions, and the distance between them it, it is easy to determine the "user's" exact location.

Map Matching

The navigation solution is further enhanced, although it is not essential, when the system knows that the person or object being located is traveling along known routes on a map; for example, the system can assume that people can only follow certain routes in a mall. This is priori information that can be used to "force" the estimated position to be on the nearest point on the possible routes. The constraints of indoor construction similarly can be used to refine estimates of the position of a person or object moving within a building-people and objects do not pass through walls, they pass along corridors and through doorways. It is the best solution for a system in case of an emergency or for a system for homeland security or a system to locate and inform the subway location, a good example is the hotel exit floor map.

In all, the unique method can be summarized as follows:

Direct communication between the area (way-points) and the user (navigation/GPS)

Automatic waypoint generation in real-time according to the user area

Indoor/outdoor even without GPS

Business model when the business/store owner will be subscribe to the listing in the navigation/GPS mapping Provide overlay floating model to be work even without mapping No Internet or cellular communication is needed to detect and determine a user's location for additional location based services (LBS) information and push and or data Internet service needed.

Can interface to the existing system and link to existing software and hardware system.

The option of search is done locally on the user device, no central database or Internet search needed.

Bluetooth interface to cellular phone, will run as application on the Bluetooth enabled device, such as a cellular phone.

Provides indoor navigation and indoor facility map and or floor images—guide and navigation.

All global positioning system (GPS) navigation systems lack of real-time displays of the waypoints around the driver/user route, most likely, the information of GPS maps may be old and therefore inaccurate.

The navigation system provides a system and method for generating and updating in real time a navigation's waypoints automatically along the route according to the user associated with local detection of RF beacons installed in the area and will for the first time trigger an a delivery of real time waypoint information along the user route directly to the user's navigation and/or his cellular phone.

The navigation system will enable a circular omni-directional display on the map or floor images floating overlay on existing navigation map or floor mapping or indoor floor images.

The waypoint data trigger generates directly from the waypoints beacons ID, no Internet or cellular communication is needed to determine the location.

The navigation system will bridge the existing navigation system and GPS mapping to new real time information according to the user's location.

The navigation system will allow for the first time the navigation and GPS industry to tap to the local advertising market estimated to be $134 Billion in the US alone . . . , the mapping is at the "forefront" of local strategy. Due to the lack of availability of the GPS indoors as well as the limitation of its accuracy outdoors and the non-updated mapping that is provided today by the mapping and GPS industry there is no real tapping to this huge market.

It is believed that the navigation system can bring a new life to the Navigation and mapping industry as well to the cellular providers by providing a unique innovation that combine the GPS and the existing navigation to the real time information directly from the waypoints, which can be referred to as a COOLSPOT.

This invention is directed generally to the field of navigation and, more particularly, to such a method to be used indoors or outdoors in a mall, store, buildings, department stores, and to provide local based services directly to the user's navigation or cellular phone.

The proposed applications have identified and resolved a great deficiency in the technology available for local businesses. LBS represent a huge advertising and mapping market-estimated at over $150 billion a year. It represents a big opportunity in the navigation market that has not been explored yet.

Existing System and Industry Trends:

Local mapping today is mostly paper: Mall maps, store maps, mapping of department stores, commercial buildings, hospitals, schools, campuses, municipalities, shopping centers, downtown districts, indoor facilities, building maps, parking areas, parking garages, amusements parks, subway systems, transit maps, museum maps, area attractions maps, hotel and resort maps and even more importantly the emergency maps and procedures posted in buildings.

Factors in Local Mapping

Local maps can be of either indoor or outdoor locations.

Local maps are available on paper, on the web, and in some cases on a kiosk in the facility.

A high degree of accuracy is needed in order to provide usable maps for navigation indoors-less than 10 m—to a store or even a parking space.

GPS cannot provide acceptably accurate mapping as it is only accurate to within 100-200 feet. This is the reason that the GPS industry does not provide this type of mapping. The same is true for cellular network providers, as the accuracy is also 100-300 feet, and then only when the signal is available. Signal availability is often a problem indoors and also when it is most needed—in an emergency situation when most of the cellular network fails due to high demand. Again, this is the reason that there is no local mapping available for cellular users. (Local mapping equates to accuracy in finding a store, room, or parking level within 5 m.)

At this time there is no indoor navigation solution. The most recent technology provides access to a user's location through a combination of group "social networking" and a "buddy list".

Most technology available today attempts to "locate" a moving "user" in an area, the present invention reverses that idea and lets the "user" navigate the local area on the local maps, indoor navigation compared to outdoor navigation, pedestrian navigation is more than locating and navigating, most likely they are at or near their destination already. There are two possibilities, either they are in unknown surroundings and their task will be to explore the surrounding or they are looking for a specific product-their defined goal is like buying a new pair of shoes or getting a book or just going to shop around, exploring a new location, new deals, specials sales, or simply sightseeing.

The theory is based on the belief that "you are what you do" meaning, the services, specials, sales, coupons, discounts, and the like are one key element.

The main task of indoor navigation is to show the user where the specials, sales, and coupons are and direct-navigate the user to them and at the same time provides the business owner with a marketing tool that as of now is not exiting. The integration of multimodal journey planning and guidance to dynamic waypoints, sales, specials etc. . . . and complex public interchange facilities are not adequately addressed by existing systems.

In some aspects, indoor navigation looks simpler than outdoor navigation. For instance, the geographical area covered is much smaller and the expected speed of travel—walking—is much lower. However, other aspects make indoor navigation much more challenging. First among these is the unsuitability of GPS and related technologies. Second is that in a complex indoor environment the requirements are more stringent. For example, vertical positioning of the topology and the need for accuracy less than 10 m—to the store, the product, and even to the aisle or the parking space—cannot be achieved with today's existing system.

The indoor market represents much greater potential than outdoor navigation, as on average people spend more than 90% of the time indoors . . . .

The Objectives and Goals Behind This Concept: The technology behind the navigation system is quite simple-a direct communication between the user's device/cellular phone, Bluetooth enabled device, and a Bluetooth tags/sensors/beacons installed in a known location in an area/building/store/facility without relying on GPS, centralized servers, Internet bandwidth or even cellular communication-they can be supportive but are not essential.

The main concept is to use existing off-the-shelf technology (Bluetooth) with small modification and devices with a minimal cost of deployment and to provide a simple indoor/pedestrian technology which can delivers accuracy with an integrated suite of applications especially designed for the user/shopper indoors, the system is based upon RF beacons Bluetooth or Wi-Fi installed in the local area to be scan by the user device—cellular phone and use the proximity scan beacon ID and signal strength to provides an instant detection a notification of existence to the business owner and trigger delivery of update local based information all without even exchanging a real communication (no paring etc., needed) with the proximity beacons.

The System Includes:

Local mapping or local floor images—the indoor view of the facility as part of the application, the facility can offer a download or participating from a proximity information sign or the store/mall/building information to trigger download the application or ability to pre load the maps as part of navigation or mapping application before reaching the area or download from the web according to location determine by the RF beacons.

Ability to have special navigation software either as an add-on to existing navigation on the user's cellular phone or existing navigation system (car, mobile) using the Bluetooth beacons to determine the exact location and trigger applications.

Ability to deploy Bluetooth beacons in the local area where the beacon will broadcast ID to be known the location-way-points and trigger additional information and or local based applications and to provide the infrastructure needed to guide navigate in the area. A very low cost and fast deployment beacon system.

The ability to use the log of the "user" Bluetooth ID or the Bluetooth ID as a key (NOT THE CELLULAR NUMBER) for future marketing purposes or for emergency use. This aggregation of data with association to proximity Bluetooth beacons ID will be in valuable to retailers, business etc. Bluetooth enabled cellular phones can be used as beacons.

The beacons-parts of the navigation system are Bluetooth tags/beacons installed in known locations in the area/facility and represent "waypoints" where is the beacon ID can represent the facility type, store/special sales, places etc. and the location in the facility location . . . .

The scanner detection part of the application —whenever a mobile phone or mobile device with a Bluetooth switched the Bluetooth on and loaded with the application, it will periodically scan the area for Bluetooth beacons; proximity to a tag/beacon and the tags/beacons ID as well with signal strength will determine the "user" location on the area/facility map and will trigger an automatic notification automatic check-in to the business owner to trigger application with possible a link to existing system to provide the user and the business owner additional information just by being there an use the method above.

The navigation—can be plotted between way-points/store/places on the map.

In regards to the sale sense-marketing tools, the system works by passively observing the initial part of the scanning of movement. The proposed system does not monitor or listen to conversations or text messages. Nor does the proposed applications transmit or intercept any information or interfere with the mobile network operators in any way. The navigation system is a scanning detector (not a receiver or transmitter) which can observe the unique Bluetooth ID/key set of the device (not a telephone number or name . . . ) with association to the beacons ID which the device was near and aggregate resultant data to be server for habit and/or preference for triggering content delivery.

Sales sense represents a method to use dynamic user input profiling with proximity beacon ID installed in the known location indoors and outdoors for empowered presence and trigger content delivery for a real life interaction and all under the user's complete control and without compromising his privacy. The paradigm of proximity-based discovery and communication enabled by Bluetooth technology can be very relevant in Ambient Intelligence as an enabler for a situated interaction.

The navigation system explores the use of predefine user input (user profile or preference) as a key driver for situated interaction and trigger content delivery according to the user profile/preference. The approach is to use of RF Bluetooth beacons installed in a known location in a local area to trigger action witch associates the user cellular phone ID and or profile/preferences beyond self-exposure and introduces a method that can trigger actions.

The approach to the use of Bluetooth ID of the beacon beyond self-exposure and introduces as a technique in which the system can recognize the Bluetooth ID as explicit instructions to trigger actions/process.

Firstly, because it has an extremely Low entry barrier, Bluetooth is a widely available technology. Most of all phones include the Bluetooth, and setting new Bluetooth device ID is normally a relatively simple task that can be accomplished with the base functionality of any mobile phone. This easy availability is of huge importance in enabling social practices around the technology and represents a major difference to other sensing and interaction approaches that, albeit more sophisticated, may require specific hardware or software in personal devices. Secondly, the use of Bluetooth presence for situated interaction combines very well implicit and explicit forms of interaction, in fact blurring the distinction between them. Simply by scanning the proximity Bluetooth device, people are already part of the situation and implicitly engaging with the system.

This continuous, flow of presence information can be fundamental in the aggregation of situated content and may act as an important catalyst for more explicit forms of interaction. This is what mainly differentiates interactions based on Bluetooth presence from other interactions.

The chosen methodology combines a user define profile encode into the Bluetooth device by setting up a user like VIN number, with user privacy as a priority, the profile is encoded into the user Bluetooth device with an algorithm sequence protecting the user's privacy.

It provides important practical implementation of the Technique and on its usability within the complex set of social phenomena that characterize situated interaction in a public places without compromising the user privacy. Its effectiveness and simplicity can make it easily adoptable for applications like local social networking interactions, near field communication like secure transactions, payment methods, secure recognized methods and trigger secure processes and delivery of direct content according to the user profile or preference, all again without compromised user privacy and provides the user with complete control all the time. The method can be integrated and provide privacy and secure transaction to empower application that may otherwise exploit user ID, his profile and privacy as such the method can provides a secure payments transactions.

Every day millions of people access the Internet and enter their profile, personal information, or answer questions about their preferences in order to access a service/site, to get incentives, coupons, specials, etc. . . . . The sites use the information for marketing and in some cases share or sell the information. Recent research has found that most people are willing to give information for incentives.

Using the profile and records, the surfing habits of the user (IP) is the way that all the search engine companies make money on the Internet. At the same time they try to direct the content to the user according to their profile/habits.

But what about real life? People spend more and more time indoors (according to recent research, people spend more than 90% of their time indoors).

A scenario of searching for stores, items, special sales, and coupons according to our desire is repeated again and again . . . . The question is how can the system transfer the success of the Internet marketing tool and the easy search for real life?

That is the main idea behind the navigation system—what if a system can take a profile/user statistics or even user input with them anywhere and provide one or more intelligence marketing tools. Moreover, the user is in complete control over their privacy, they can just shut the application off.

In the disclosed navigation system, the user has their profile sales preference and they are encoded into the user's cellular phone to be associated with the proximity beacon ID installed in the local area. (There is 3 ways: A. set segment—the segment keys are not unique and help to setup the user segment only. In that case the key is not unique. B. To generate a unique key—to be used like the Internet IP. C. Create a dynamic key and multiplies profile according to location/user preferences.

The profile can include: Gender, age, and sales preference (interest), and does not include any personal profile. It may be the same as seeing the user and recognizing their gender, age, and other preferences just by looking at the user. The user is not revealing any kind of information that most sites ask for in a registration process and no personal information like name, address, or telephone number is exposed.

As part of the suite of LBS application, the user's phone will scan the area for the tags/beacons. For example—by being proximity close to the directory stand in a mall a decoding of the user key will be processed in order to allow the user preference segments and trigger delivery to the user with ads, specials, and incentives according to their profile as well as providing again the business owner with the best marketing tool—knowing his customers they profile and habit all using a very low cost RF Bluetooth beacons installed in the area and associate them with the user Bluetooth device—the cellular phone.

"Your customer is telling you what they want, are you listening?"

The main idea behind this is to provide the user with pin-point content according to their desired preference at the location trigger by the proximity beacons ID and also direct/navigate them to the desired location where they can find the store/sales/special/coupons or the information that they are looking for able to get meaningful data around shopper habits and store layouts statistics, as well as to help them partner up to offer better loyalty incentives to their customers through programs that extend beyond single storefronts, its sensing second-by-second a shoppers interest about specific product, place and can provides the business owner with a complete marketing tools not available until now and at the same time provides the user with offers directly from the business according to his habit preference profile.

The sales sense, user preference module is an add-on to the sales sense marketing where it joins the user behaviors module to create a very unique LBS business and marketing model. Imagine a potential customer standing in a crowded store aisle, feeling overwhelmed by all the choices. What if you could just reach out and give him or her something to help with the decision—a coupon, product information, discounts—right at that moment? Content marketers will soon have the ability to do this and a whole lot more just by implementing our method.

Sales sense-Shopping Behavior: How consumers decide what to buy and when is going to drastically change. Winning marketing need to provides and will require getting exactly the right content in the right place at the right time with even more precision. Shoppers will have the ability to collect real-time information, comparison pricing, discounts and other helpful, highly tailored data as they walk through a store or browse near particular items. It will be imperative to produce well-timed, compelling content that is useful in those crucial moments before a choice is made. Sales sense—next generation marketing tools, from coupons and giveaways in stores to tours of museums to airports that provide real-time flight information, the possibilities are endless.

Consumers will start engaging with content in a whole host of new ways. Rather than just providing information suitable for a web browser or even a mobile user, marketers will need to think about ways to provide content that will be of value to users as they live their lives. From businesses to city parks to, the system provides a user tools to access helpful, real-time data like never before. As recently published research showed that on average people spend 90% of our time indoors. The proposed invention allows an effective integration of on-line and off-line shopping.

Moreover, according to research, indoor navigation may be more important than outdoor navigation and may represent a huge new market.

Our technology allows shopping centers, malls, department stores, buildings, airports, train stations, exhibition centers, museums, and amusement parks to understand the way that their customers or passengers flow through their premises. At the same time it provides the user/shopper with unique indoor navigation capability without compromising user privacy.

Our innovation will allow, for the first time, the navigation and GPS industry to tap into the local advertising market, estimated to be $134 Billion in the US alone.

Our technology provides a reliable method for identifying the path habits and the behavior that people take through an area. There are a number of advantages to our technology including:

Extremely large sample size as mobile penetration is above 90%,

Shoppers remain anonymous,

Accurate to within 2 m, and

Based on a Bluetooth technology.

For retail areas, malls in particular, the advantages of understanding shopper behavior are significant. Such information can assist the mall to:

Evaluate and improve their retail tenancy mix by identifying which stores shoppers consider complementary, Identify underutilized areas in the mall,
Understand the impact of anchor stores on the mall,
Measure the implications of particular promotions or center events,
Assist with planning day-to-day mall operations,
Provide add-ons for the shoppers,
Provide shoppers with a "web" like shopping experience,
Provide shoppers with incentives/advertising,
Increase security,
And in an emergency provide the shoppers with alarm and notification, and
Allow shopper engagement with the store, the RF beacons can become the small neighborhood store by recognize the shopper, what is missing from the on-shopping.

Our technology is the only system on the market today that can gather information on shopper paths continuously and accurately based on locally installed RF beacons without any need to establish any communication relationship between the user cellular phone and the beacon (no paring or any communication needed to determine the location) and all without compromising the shopper ID or their privacy.

The various methods disclosed can also provide a way of surveying the behavior and preferences of the "user" shopper simply by observing the signals (encoding Bluetooth naming key) given off by their mobile phones and associate it with the proximity beacon ID which they are near and at the same time provide the shopper with a unique special application for indoor navigation triggering a local based services applications.

The present invention provides a next generation approach to the location based services (LBS) market, especially to indoor applications and to areas where a GPS cannot provide accurate navigation.

The data collect using the disclosed technology can be used to provide trend reports showing which shops are most visited and at what times, whether there are sufficient public facilities to serve the visiting shoppers or whether more security staff are needed to name only a few of the potential benefits. Ultimately, the collected data can provide assistance to shopping centers to become more in-tune with their customers so that they can create better, more pleasant places to visit.

The proposed analytics can turn shopping center/department store/store into finely tuned sites, enabling mall/store owners to direct the flow of traffic efficiently around the information coming from the user to the benefit of the user and the business owner to provide services such as VIP personalize services, and the like.

In contrast to alternative techniques, there is no device that tracks the user cellular phone. In the disclosed methods the user device/cellular phone is the one that scans and tracks tags/beacons along the route, each scan includes the beacons ID and the user device mobile phone ID, and while these keys help track the movement of the signal and its owner, they don't reveal the identity of the user. This is a more precise method than what Google maps uses to detect a general location on a mobile phone by cell towers which are accurate between 300-1000 m compared to our accuracy which is below 10 m. its allow the business owner to be notify about the user existence in his vicinity and allow sending the user offers/deals more information and at the same time collect very important information to the business owner such as habits, profile, preference of the user to provide precise contents directly to the user cellular phone.

Example of Scenarios

A user in a mall can use a local guide and navigation application suggest to him to download at the mall/building/facility or have the application already as a cellular phone mapping application.

As part of the application the Bluetooth on the user's mobile phone will scan signals from known locations-Bluetooth beacons and will determine the "user's" location on the local mall map (the same way as a GPS) with accuracy of less than 5 m. (More beacons with LESS signal range=more accuracy)

For example, the Bluetooth beacon can broadcast an RF signal that includes its position coordinates (e.g., latitude, longitude), which can be detected by a mobile device. The position coordinates can provide a third location accuracy for the current location of the mobile device by virtue of the mobile device adopting the position coordinates of the beacon as its own position coordinates.

The known locations of a number of beacons in a geographic region (hereafter a "beacon infrastructure") can define a geofence that encompasses the geographic region.

In some implementations, the beacon can also advertise location based services provided by the beacon infrastructure. Upon determining that the mobile device crossed the geofence defined by the beacon infrastructure. The application can monitor for beacon signals and continuously update its location to be the location of the beacon currently in proximity with the mobile device.

When the mobile device loses contact with the beacon for a defined period of time (e.g., 5, 10 minutes) or when the mobile device exits the geofence defined by the beacon infrastructure, the application can transfer the monitoring back to the application subsystem, so that the location of the mobile device can be determined using Wi-Fi and or Cellular ID.

In some implementations, the application can distinguish between beacons in the beacon infrastructure and mobile beacons that may be detected in a scan, such as other Bluetooth enabled mobile phones operating within the beacon infrastructure.

For example, each beacon in the beacon infrastructure can provide data in its broadcast signal that indicates that the beacon is part of a beacon infrastructure.

Alternatively, or in addition, when a mobile device makes first contact with a beacon in the beacon infrastructure, that beacon can transmit to the mobile device a list of unique identifiers (e.g. beacons ID) of other beacons in the beacon close infrastructure and other information about the beacon infrastructure, such as a name, geofence data, one or more websites associated with the beacon infrastructure.

Beacon infrastructure can be located in any geographic region, including businesses (e.g., shopping malls, retail stores, restaurants), landmarks (e.g., museums, airports, parks, entertainment venues) and any other environments where location based services are desired.

The available local advertising marketing is huge with over $150 billion in revenue in the US alone.

Indoor LBS Applications

This is a concept that offers a complete suite of application from finding parking to navigation of indoor malls\stores and with a capacity to navigate to emergency exits with a low cost to implement and with a business model that can be used to attract customers.

The application represents a big opportunity in the navigation market and will open up new avenues for companies from telephone operators to mall/store/department storeowners to navigation and mapping companies.

The disclosed technology presents a low cost and easily deployed infrastructure for local based navigation outdoors and indoors without the need for GPS and or cellular networks. Moreover, the concept is especially suitable for local area (indoor and outdoor) services when and where the GPS and the cellular network can't provide the solution and the accuracy needed to provide such navigation (1 OM or less).

The disclosed technology provides a system is based on existing Bluetooth, a technology that is proven to be stable, simple, inexpensive and mature in market use. Moreover, it is a common communication tool and is available on more than 85% of all new mobile phones.

System Architecture:

The infrastructure consists of RF Bluetooth beacons installed in known locations in a local area. The beacons will respond to Bluetooth device scanning inquiries made by "user's" Bluetooth enabled cellular phone or other Bluetooth device with a the special application.

Each of the RF beacon are ID that represent the Location ID as well as represent the facility/product type. A mobile device as well as any Bluetooth device (desktop, laptop, tablet and cars etc.) can become also a beacon providing a new echo system where an infrastructure can include static and dynamic deployments of beacons interact with each other's.

The local area map (mall map, store, building map, area map etc. . . . ) will be available to be downloaded as part of a mapping system that can be triggered to download at the entrance of the building/mall/area or the directory to provide the mapping for the navigation or as part of a mapping and navigation application.

A "user's" Bluetooth cellular phone will scan the local area for the location beacons. When a "user" is within 5/10 meters, the location beacons respond, providing room—level navigation accuracy. The beacon ID as well with signal strength will provides instant localization determination, with multiple beacons installed and possibly receiving more than one beacon's signal, a simple triangulation calculation and options for signal strength will determine the exact location of the "user" on the downloaded map of the local area. Note that there is no communication establish between the beacons and the mobile phone (no pairing), and that no connections to the Internet are necessary (even so to be provide with more information you may need Internet).

Other signals not on the list will be ignored, There is a mixed use of beacons and delivery option depending on the application (for example in a mall application, the stores can have a WAP or use the Internet to automatically deliver more content push to a "user's" mobile device where the beacons serve as navigation "antennae" as well as trigger mechanism to provides application exploit and waypoints contents to help the "user" navigate in the area. Application can be: Sales Sense-Next Generation Marketing Tools: the Behavioral Module, Nav4Parking, Nav4Realty, Nav4Mall, Nav4Sale, Nav4Museum, Nav4Show, Nav4Train, Nav4Sign, Nav4Emergency, Return2Parking, Nav4Store, Nav4Conference, Nav4Disney, Nav4Events, Moreover, according to research, indoor navigation may be more important than outdoor navigation and may represent a huge new market.

The technology disclosed herein enables shopping centers, malls, department stores, buildings, airports, train stations, exhibition centers, museums, and amusement parks to understand the way that their customers or passengers flow through their premises. At the same time it provides the user/shopper with unique indoor navigation capability without compromising user privacy.

The innovation disclosed herein enables, for the first time, the navigation and GPS industry to tap into the local advertising market, estimated to be $150 Billion in the US alone.

The technology disclosed herein provides a reliable method for identifying the path habits and the behavior that people take through an area.

There are a number of advantages to the technology disclosed herein, including:

Extremely large sample size as mobile penetration is above 90%

Shoppers remain anonymous accurate to within 5 m

Based on a Bluetooth technology

For retail areas, malls in particular, the advantages of understanding shopper behavior are significant. Such information can assist the mall to:

Evaluate and improve their retail tenancy mix by identifying which stores shoppers consider complementary. The device/cellular phone is the one that scans and tracks tags/beacons along the route, each scan includes the cell's unique Bluetooth ID, and while these ID'S help track the movement of the signal and its owner, they don't reveal the identity of the user. This is a more precise method than what Google maps uses to detect a general location on a mobile phone by cell towers which are accurate between 300-1000 meters compared to accuracy of the disclosed technology which is below 10 meters.

Some reports about shoppers show how valuable behavioral information actually is and the profit opportunities that come along with this:

Where they go, Where they go next, Where they do what, When they do what, who does what?

Understand behavioral patterns across demographics. Similarities, differences and much more.

Sales Sense User Preference Module

Every day millions of people access the Internet and enter their profile, personal information, or answer questions about their preferences in order to access a service/site, to get to a mall, identify underutilized areas in the mall, understand the impact of anchor stores on the incentives, coupons, specials, etc. . . . . The sites use the information for marketing and in some cases, share or sell the information. Recent research has found that most people:

Measure the implications of particular promotions or center events

Assist with planning day-to-day mall operations

Provide add-ons for the shoppers

Provide shoppers with a "web" like shopping experience

Provide shoppers with incentive/advertising and automatic check-in method

Increase security

And in an emergency provide the shoppers with alarm and notification

The disclosed technology is the only system known today that can gather information on shopper paths continuously and accurately using a RF Bluetooth or Wi-Fi beacon technology and all without compromising the shopper ID or his privacy.

The disclosed unique and innovative system and method which can also provide a way of surveying the behavior and preferences of the "user" shopper simply by observing the signals (Bluetooth beacon ID) associate with their mobile phones and at the same time provide the shopper with a unique special application for indoor navigation and local based service for the benefit of the shopper and the business owner.

The data collected using the technology can be used to provide trend reports showing which shops are most visited and at what times, whether there are sufficient public facilities to serve the visiting shoppers or whether more security staff are needed to name only a few of the potential benefits. Ultimately, the data made available by the disclosed invention helps shopping centers to become more in-tune with their customers so that they can create better, more pleasant places to visit by providing a loyalty and reward program.

Analytics provided by the disclosed applications can turn shopping center/department store/store into finely tuned sites, enabling mall/store owners to direct the flow of traffic efficiently around.

In contrast to alternative techniques, there is no device that tracks the user's cellular phone. In the disclosed method the user is willing to give information for incentives.

Using the profile and records, the surfing habits of the user (IP) is the way that all the search engine companies make money on the Internet. At the same time they try to direct the content to the user according to their profile/habits. But what about real life? People spend more and more time indoors (according to recent research, people spend more than 90% of their time indoors).

As part of the blue umbrella suite of location based services (LBS) application, the user's cellular phone will scan the area for the tags/beacons. For example—by being proximity close to the directory stand in a mall a decoding of the user key will be processed in order to allow the user ID and/or preference profile and provide the user with ads, specials, and incentives according to their profile "Your customer is telling you what they want, are you listening?"

The main idea behind this is to provide the user with pin-point content according to their desired preference at the location and also direct/navigate them to the desired location where they can find the store/sales/special/coupons or the information that they are looking for. At the same time there is also a benefit to the mall/store owner by getting the next generation's sales tools, getting costumers' habits and their sales profile, and able to serve better and accordingly the costumers.

The sales sense, user preference module is an add-on to the sales sense marketing where it joins the user behaviors module to create a very unique LBS business and marketing model the analysis of these spatiotemporal data can supply high level human behavior information valuable to urban planners, local businesses, and the Local Based Services (LBS) marketing.

Mall/department store/store indoor applications are part of nav4mall/store

The indoor applications and navigation takes a further step to give the user/shopper next generation shopping tools by providing them with the following indoor applications that are part of nav4mall/store.

Map and indoor Navigation-brings the local mall/store map to the digital age, allowing the user to navigate from waypoints to waypoints on the map Directory—It brings the store/mall directory to the cellular phone. Search and Find-store/place/item products that are on the directory represent waypoints/tags/beacons on the loading maps.

Sales/specials-discounts, sales, and coupons, that can be added-on or a replacement for the mall/store flyer that provides the shoppers at points in the mall/store, it can even direct the user/shopper to the aisle with the products and to coupons and directs the shoppers to what they looking for.

Parking and return2parking—although not directly the same beacons (for the parking the infrastructure employs long range beacons where in a store/mall the beacons can be a shorter range). The disclosed service allows the user to find parking spaces and location of parked cars.

Info—the information part can provide information about events, restrooms, ATM locations, seating area, kids playground, fountain, public phones etc. . . . .

Emergency—A very important part of the disclosed innovation is the ability to provide the user with a unique alarm and notification to the user without depending on other communication links like cellular phones that are prone to failure in emergencies. The present invention provides the user with the building/mall/store/place emergency procedure and in emergency will help navigate the user to safety.

Panic—part of nav4emergency allows the user to request being located in an emergency.

Privacy: The system does not collect personal information such as name or phone number. It does, however, record the phone's Bluetooth identification number to build a profile of the user or the use of the phone in the area. It is like surfing the web where a "user's" IP address is recorded for future marketing statistics and surfing habits (with permission from the user). Also as part of the encoding key into the Bluetooth device (user profile) as described in the sale sense part the privacy and security increases to the level where viewing the key broadcast by the Bluetooth device can't reveal any user identity unless the user requests to be registered to get incentive, specials, sales, etc., even then his name or other personal information is secure and only the Bluetooth device key/ID are recorded.

By directly targeting the consumer standing right outside or inside a business, an event, or walking toward a kiosk or restaurant, merchants can maximize their marketing budget while incorporating a new, inexpensive and effective form of advertising.

The "user" is in complete control. They can disable their Bluetooth application any time or just reject content, there is no "spam" effect and the "user" is attracted by incentives rather than generic promotions. In a mall-like environment a "user's" incentive to use the disclosed technology can be further enhanced with the use of the associated key advantages and packages.

Isn't this all a bit like "big brother"? Not at all, and it isn't even "little brother"! The system simply logs the movement of a cellular phone around an area and aggregates this to provide trend data for businesses. It's much less intrusive or invasive than existing methods that are already in widespread use—for instance CCTV cameras and number plate monitoring as they do collect personal information such as your image or car number plate. The disclosed technology represents the next generation shopping experience in shopping centers, malls or stores and fits very well with today's business model. Such a service can be offered for free to the "users" and backed by advertising and the use of the data by the stores. Such service and application and the ability to include the full "suite" of applications especially designed for shopping malls/stores and including the emergency part of it will also ease the fear of "locating" or any other privacy issue.

Who benefits from the disclosed technology? Everyone benefits from the trend data collected. The process enables a way to collect instant feedback from shoppers without having to bother them for information. In the old days centers would have used researchers to survey consumers but this information takes time to collate and response rates are very low these days as shoppers have increasingly become reluctant to stop and share their feedback. Hence the disclosed innovation provides a very effective method in the same way that TV networks know how many people watched particular programs and use that information to discern what programs to make and how to calculate the costs advertisers must pay to promote their products during different timeslots, the system provides the equivalent for shopping center owners and their resident retailers. It is believed that introducing the proposed system and marketing tools above can help users and merchants upgrade the real shopping experience of today with the advantage of the web like tools.

The disclosed innovation represents the next generation shopping experience in shopping centers and malls and fits very well within today's business model. Such a service can be offered for free to the "users" and backed by advertising and the use of the data by the stores. Such service and application and the ability to include, the emergency part of it will also ease the fear of "locating" or any privacy issue.

For the first time the shopper will experience Internet type marketing in the traditional sales and advertising venue.

Here are the benefits consumers could see from shopping center using the disclosed technology:

Better in-mall events—the system can monitor how successful they were by monitoring the sheer volumes of people attending and for how long.

Provide shoppers with next generation sales tools: navigation in your mall store facility directly to the sales or specials that you want them to go to . . . .

Add-on to the store/mall directory and the in-store mall flyer.

Take the guessing from the customer's next want . . . and then send them directly to the products, coupons, or specials they might want.

Improved public transport links—by monitoring how people traveled to a center. With the government's current emphasis on helping people to use public transport more effectively, having this kind of information can have a very positive, local environmental impact. Busy shopping centers can otherwise create large volumes of extra road traffic, also with the search4parking and return2parking application improves traffic, saving time and gas.

Eliminates congestion within the shopping center—the disclosed innovation can help center management understand whether opening hours need to be extended or whether the center layout needs to be improved to avoid congestion.

Improves shopping center and public facilities efficiently—the disclosed innovation's data helps managers to understand which parts of their facility are very busy which means they know when to deploy extra employee/cleaners/security to ensure proper service.

Better security—over-crowding also leaves shoppers vulnerable to pickpockets and other security risks. The disclosed system can identify congested areas and ensure security personnel are deployed appropriately. And in an emergency the disclosed system can provide instant alarm and notification even if the cellular communication or other system is not available.

Improved mix of stores and center layout—the system helps identify which stores are popular and which are not—making sure that the best possible layout and mix of shops is provided for visiting shoppers. If some shops are unpopular they can be switched for brands that customers actually want.

It is believed that shopping should be an enjoyable pastime. Who wants to go to shopping center that are congested, poorly laid out, have dirty toilets, are badly positioned for transport links and which pose a security threat to visitors? Altogether this makes for a much better shopping experience.

How do shopping center owners and retailers benefit? The benefits for shopping center owners of using the disclosed technology are huge and there are many possible uses for the information gathered. The disclosed applications can help shopping center owners get a better understanding of how people use their center such as the order of stores they visit and the time they spend in different areas of the center.

These days, visits to shopping malls are falling with increased competition from supermarkets, retail parks, and the Internet. With visit frequency going down it is critical that the shopper experience at the mall is exceptional and that is where the disclosed applications come in. The information can assists malls at all levels, from the very mundane to the more strategic questions that they face-such as whether or not they have the right mix of retailers across the mall.

Similarly it could help museums identify their most popular exhibits and help exhibition companies plan their venues more carefully around visitor traffic flows.

The disclosed technology is able to provide a solution with quantitative feedback on whether the changes they make in the mall are successful. One of the ways to do this is by looking simply at how long shoppers tend to stay within a mall.

Don't retailers already measure shopper numbers? Yes they have infrared cameras and counting machines, which monitor and count the numbers of visitors to their stores. This measure is known as "footfall" and has been used by retailers for many years. The disclosed system provides another level of data by looking at the aggregate paths that mobile phone carrying visitors take and the length of time they spend-known as "dwell time".

In the past malls have focused solely on looking at the numbers of shoppers that they are drawing through the doors (footfall) but when combined with dwell time they can get a much more accurate predictor of their performance.

The system has no idea who the user is an individual. The system only looks at the path the user's phone takes. Essentially, it's like looking at a dot moving around a screen. In isolation this information isn't too interesting until you look at the wider patterns and trends and see lots of dots taking the same route or visiting the same areas of the mall.

What is the Bluetooth ID number? A Bluetooth ID is like the IP number in a computer network or the Internet which does not contain or reveal your phone number that the network operator uses to identify your phone. The system utilized the ID information as a key to find and detect the user.

The linkage between this identifier and your personal information is very critical to the business owner as it can provides a user habit preference profile and provides a new breed of tools to the business owner just by getting to know where the user is, and at the same time to provide the user with the best "VIP" like personalize shopping services.

The disclosed applications do not detect any personal information and have absolutely no idea who you are as an individual. Although the applications include an option for users to register as mall/store customers to provide more details about you (still no real ID), like a membership cards that will be provide the user with incentives, coupons, or special discounts if they participate. Moreover recent emergency events prove the need for emergency and notification to the "right people" at the "right time", by keeping the key/ID of the Bluetooth devices that are in the area/facility the disclosed nav4emergency can provide instant alarming and notification and navigation to the exit route and to safety all without revealing user ID or breaching privacy of the users.

The business model-Next Generation Marketing: The web advertising and the main focus of search engine success is based on technology that tracks the web user's habits and provides him with related ads according to his interests.

Using the disclosed infrastructure of a Bluetooth beacons, wherein the beacons are deployed about in a mall, store or shopping center environment. The disclosed invention represents a very unique ability to bring a web like shopping experience by its ability to keep up on the "user's" "surfing"

or shopping habits in the shopping center, mall, or store. It will provide a better shopping experience (coupons, specials sales, according to the user's shopping habits) and service to the shopper.

Even though it may look like a privacy issue, the add-on services, the application, and the idea that it may save the user's life (nav4emergency application) combined with the fact that it does not reveal the person's name or telephone number, it is the same as the everyday use of surfing the Internet when the user's IP is recorded by the web sites and provides the basis for the "ad sense" or the web marketing tools, referred to as a "sale-sense".

It is believed that introducing the disclosed system and the associated marketing tools above can help the users and the sellers to upgrade the real shopping experience of today with the advantage of the web like tools.

The disclosed innovation represents the next generation shopping experience in shopping centers, malls and fits very well with today's business model. Such a service can be offered for free to the "users" and backed by advertising and the use of the data by the stores. Such service and application and the ability to include the emergency part of it will also ease the fear of "locating" or any privacy issue.

For the first time the shopper will experience Internet type marketing in the traditional sales and advertising venue.

The disclosed innovation provides valuable solutions that enhance the effectiveness of ad campaigns. The ability to optimize performance in real time has a positive effect on advertiser satisfaction. The fact that this service is well integrated into the disclosed system is a tremendous advantage.

The disclosed innovation is a performance-enhancing technology, providing great data and allowing improved customer service.

It can be an extremely effective way to optimize the performance of offline/online advertising campaigns in the mall/store environment. For excellence in client services the idea is a clear win-win for everyone.

Helping to understand where users are going in the mall/store in real life and their buying behavior patterns will allow the merchants to continually adjust offers, placements and creative content to improve buy-through and maximize sales.

The disclosed technology will evolve mobile content into a bonfire revenue center that will benefit the shopping mall operator and merchants alike.

The "user" is in complete control. He can disable his Bluetooth application—any time or just reject content, there is no "spam" effect and the "user" is attracted by incentives rather than generic promotions. Probably the best technical analogy would be to compare the disclosed technology with existing web-based systems that measure viewers of web sites, for example Google Analytics.

For example, the Bluetooth beacon can broadcast an RF signal that includes its position coordinates (e.g., latitude, longitude), which can be detected by a mobile device. The position coordinates can provide a third location accuracy for the current location of the mobile device by virtue of the mobile device adopting the position coordinates of the beacon as its own position coordinates.

The known locations of a number of beacons in a geographic region (hereafter a "beacon infrastructure") can define a geofence that encompasses the geographic region. In some implementations, the beacon can also advertise location based services provided by the beacon infrastructure. Upon determining that the mobile device crossed the geofence defined by the beacon infrastructure. The application can monitor for beacon signals and continuously update its location to be the location of the beacon currently in proximity with the mobile device.

When the mobile device loses contact with the beacon for a defined period of time (e.g., 5, 10 minutes) or when the mobile device exits the geofence defined by the beacon infrastructure, the application can transfer the monitoring back to the application subsystem, so that the location of the mobile device can be determined using Wi-Fi and or Cellular ID.

In some implementations, the application can distinguish between beacons in the beacon infrastructure and mobile beacons that may be detected in a scan, such as other Bluetooth enabled mobile phones operating within the beacon infrastructure.

For example, each beacon in the beacon infrastructure can provide data in its broadcast signal that indicates that the beacon is part of a beacon infrastructure. Alternatively, or in addition, when a mobile device makes first contact with a beacon in the beacon infrastructure, that beacon can transmit to the mobile device a list of unique identifiers (e.g. beacons ID) of other beacons in the beacon close infrastructure and other information about the beacon infrastructure, such as a name, geofence data, one or more URLs to websites associated with the beacon infrastructure. Beacon infrastructure can be located in any geographic region, including businesses (e.g., shopping malls, retail stores, restaurants), landmarks (e.g., museums, airports, parks, entertainment venues) and any other environments where location based services are desired.

The system use and costs should scale well with its ability for multi-use in an emergency and in a non-emergency to provide local navigation on malls/store campuses, buildings, hospitals, hotels, malls etc. . . . using the Bluetooth beacon for navigation. Some of the key applications are:

NAV4Mall NAV4Store NAV4Sale or just University or Building Navigator, explore the indoor mall or inside a department store, navigate to the right place or the store or the department that you need. Navigate on the mall map/store mapping to find your way around all using your cellular phone or navigation system without a GPS. A new kind of service and new marketing way for the malls/store business owners, an add-on to local advertising.

With an indoor navigation based on the local map/mall that will provide the user a navigation to his desired location in the mall/store and receives content according to his preferences or habits the user can be directed to a store/product even isle inside the store as well a new marketing tool to the store/mall owner to get the customer with a new service. The store will have also an option to deliver more content (advertising, sale, coupons, promo etc. . . . ) to the user when he approaches the store or already is inside via Bluetooth or Internet push to the user cellular Bluetooth enable. And in emergency—the nav4emergency will kick in, the nav4store mall module is the one that is described in more details in the patent application.

NAV4Museum NAV4Conference NAV4Show, explore museums or conference show exhibits in a new unique and easy way, find your way around when navigating on the floor map of the museum conference or the show, indoor navigation, navigate to exhibits restaurants, cafes, lavatories etc. . . . all to the "user" navigation or cellular phone. Any Museum Conference or show provided to the attended a mapping to the exhibits, some provide also additional audio device (headset) to get more information on the exhibits. The disclosed innovation will provide a unique indoor tools that will allow the attended to navigate the museum, conference or show in an easy way directly to his Bluetooth enabled cellular phone, when he reaches his desired exhibit he will be allowed to download directly to his cellular and or Bluetooth headset information about the exhibits. An indoor navigation to the exhibits as well to the restaurants, cafes, lavatories etc..... All to the "user" navigation or cellular phone and based on the facility map. And in emergency—the nav4emergency will kick in.

For all the users of mass transportation system the disclosed innovation will allow, locate, and point the "user" to the exact station or location on a route, an easy way to navigate in the train, subway, underground kind of system, a new way of "subway" or bus mapping in/out door and directly to the user's navigation or his cellular phone. Every day millions of people are using the mass transportation system, trains, sub-ways, buses, each of the passengers depend on the transportation map for the route information as well as schedules and additional services provided by the transportation system. Most of the passengers of today carry with them a cellular phone.

Such method can be used by the management of the transportation system, train, buses, taxi and road management where the RF beacons can be installed in any transportation facility or entity to provides traffic and even on-demand transportation request as well as on-line real time traffic and transportation "head count" of the mobile device exiting in the local area according to associate with a proximity beacons installed in the transportation entity of transportation infrastructure ether parking, traffic, sign, schedules and time to station and traffic—how many people at the station or bus stop or at area to create a need to taxi or public services as on-demand service.

Aside from such data gathering and the important of such statistically information to manage the flow of transportation in a local area where the beacon serve as "sensor" to detect the traffic in specific area to be monitored by collecting how many device are in that location and in event of emergency can provide emergency notification and alarming the local devices.

The method explained can be used to manage the transportation and provides automatic awareness into transportation managements and operators as well as the user on the road where he can automatically get information about traffic in his area generated from associates, his cellular id and/or the car Vin broadcasting method (a method where the car himself become an a long range RF beacon) and an RF beacon installed on the road—automatic traffic information that tracks the existence of the user in the area and proximity to a beacons installed in the road/transportation facility (even the traffic at intersection), infrastructure of wireless beacons to the benefit of transportation industry managements by providing automatic crowd sourcing data from the users along the road. By delivering the beacons id they proximity to and have it statistically view as data guttering for events like traffic on the road automatically, adding such technology and infrastructure into the roads may take time so the use of the driver and passenger or the pedestrian cellular phone as a beacon and as automatic traffic notification can provide instant infrastructure—dynamic immediate deployment for the benefit of the transportation as well as the drivers in view of the driver and or the passenger and even the car can be set as a beacon and part of the automatic transportation system to alert for traffic and road safety and even for a car to car automatic notification of traffic and road information.

The disclosed innovation provides the passenger with the navigation inside the transportation system directly to the passenger's Bluetooth enabled phone; the passenger will know the exact location/station on the route as well as additional information on options like schedules. A new add-on service to the transportation providers as well to the passengers utilizes the disclosed indoor navigation method, and in an emergency—the nav4emergency will kick in.

The disclosed idea of implementing RF beacons alone the roads and in transportation facilities is designed to reduce the growing congestion on the roads and by providing a tools to provides intelligent transportation system, the implements of beacons can be part of a car, installed in red lights or in the road or in transportation facility, such system that installed in bus or subway or transportation entity n provides real time on line report if they empty or filled with travelers but just provide the automatic response from the user/car device associate with the RF beacons that will be installed in the bus/train the information will allow transportation control that can be done today only with installed high cost camera or sensors or depend on manually collect information from the users or GPS, and the GPS is not available indoor or provides an accurate information, in a simple way the user mobile phone automatically inform his "proximity" beacon ID, more of the same beacon ID reported meaning traffic or head count of cars/travelers etc. in the transportation facility/entity area, in a way the method provides an "automatic waze" system, such system can even replace exiting sensors and provides the user as well of the transportation management with ability to know exactly where the bus/train/subway at a time, the data can be serve for schedule or on-demand public transportation, like sending bus/taxi to an area according to demand in the area. Such method can provide the user as add-on traffic and transportation information where he—the user play big part of it and it is not depend on manual transfer of information that some time proven to be not accurate enough. One application creates an echo system where the drivers of cars and the transportation entity are all integrated for an intelligent transportation system of tomorrow and all based on the same concept of infrastructure on RF beacons statics or dynamic in location where the user mobile phone as well as the car are integrated part of such system. Note that a mobile device as well as any Bluetooth device (desktop, laptop, tablet and cars etc.) can become also a beacon providing a new echo system where an infrastructure can be including static and dynamic deployments of beacons interact with each other's. Again, adding such technology and infrastructure into the roads may take time so the use of the driver and passenger or the pedestrian cellular phone as a beacon and as automatic traffic notification can provide instant infrastructure—dynamic immediate deployment for the benefit of the transportation as well as the drivers.

NAV4Theme Park—Theme and amusements Park navigation, navigate to your desire attractions as well with a new way for register to a "fast pass" kind off lane all in an easy way to the "user" cellular phone without the need for GPS Provides a new media and-on service. Ever wonder what it will be like to navigate inside the amusements park to the desired attraction, to know the schedules of the shows at the attractions and even to get your "fast pass" from a remote location instead of standing in line. All based on RF beacons that installed in the local attraction points and provides the triggering mechanism for guide navigation and the additional information about the ride/attraction. With the disclosed unique innovation, all can be become reality and directly to your cellular phone without the need for a GPS. It is understood that this technology can provide a new tool and service to the benefit of the amusements parks as well to the user.

Cellular next "Killer Application": Emerging technology markets are always on the lookout for that elusive "killer app"—the precious, irrefutable application that makes adopters stand up, take notice, and open their wallets. Once it's found, and as soon as adopters realize firsthand the value to be achieved, that killer application eventually expands into other, more advanced areas of adoption and innovation.

Hotel resort and cruise ship: A good example of use will be Nav4 Hotel Resort Cruise ship. The benefit of the proposed system and infrastructure of installed RF beacons in such places as cruise ships, hotels, resorts, and hospitality facilities to the business and to the guest.

The subject invention creates infrastructure of RF beacons in the facility, hotel, resort, and cruise ship areas to be integrated with the existing hospitality system and provide a trigger mechanism when the existence of the traveler/guest is detected.

The association between the guest mobile phone or the hospitality employee mobile phone and the RF beacons ID will allow the example option below, as such there is two parts for the system to work, the infrastructure of the RF beacons installed in the local hotel, resort or cruise ship and the guest or employee mobile phone with the Bluetooth and or Wi-Fi and the application, note that the system can be work even without Internet and/or cellular communication and can utilize existing Wi-Fi system and local servers.

Example of some of the benefits and functionality to the hospitality system are:
- Automatic check-in and interface to the front office system and billing folio
- Link to key system or even replace the room key.
- Recognize guest in-room, turn on Air condition and light—and turn off when the guest leaves the room to save electricity can be setup to automatic or manual.
- Hotel resort cruise ship navigation.
- Allow local messaging without Internet and or cellular communication based on local chat (especially fit to the cruise ships).
- Allow push messaging to the guest by local services or by remote (when Internet is available).
- Replace and ad-on to the guest in—room package of the area guide and deals and coupons.
- Option of VIP services where the guest can be recognized automatically around the hotel, resort, and cruise ship for his profile preferences just by being in the area—providing personal treatment and services.
- Room can be set to be open or close to clean according to guest or housekeeping existence.
- Housekeeping management room status attended worksheet and productivity report.
- Increase security to the guest and to the hotel resort.
- Allow the creation of profile preference of the guest companies group.
- Provide check-in to a restaurant interface to a POS system bar system and menu selections.
- Provide automatic ticketing and seat selection.
- Guest loyalty, membership program incentive.
- Increase security and provide add on to the security plan of the hotel, resort, and cruise ship to be part of the emergency evacuation and emergency procedure.

It is believed that the disclosed invention will meet the desire of hospitality service providers to increase their average revenue per user.

The main object of the present invention is to provide the indoor guide navigation and a special application for indoor use without the need for GPS communication.

It another object of the present invention to provide a method of providing special indoor application using an RF beacons Bluetooth and/or Wi-Fi and Bluetooth-enabled devices especially the cellular phone.

It is another object of the present invention to provide a method of special application for local business, mall/departments store or regular store, buildings, downtown centers and other facility area especially but not limited to indoors with a use of triggering application that uses the proximity ID of the detected beacons in the area.

It is another object of the present invention to provide a marketing model method especially but not limited for the LBS market.

It is another object of the present invention to provide a business model method especially but not limited for the LBS market.

The foregoing and other objects of the present invention are achieved by providing an infrastructure of a Bluetooth beacons/tags installed in a known location in the area/facility, each tag/beacon has his own unique ID to ID the location in the area, the tags/beacons broadcast the ID to be pickup by the cellular Bluetooth mobile device.

An indoor mapping or mapping images of the area/facility will be part of the application and can be download before arriving to the area/facility or trigger download at the area.

The application on the cellular phone/Bluetooth enabled device will scan the area/facility for the tags/beacons ID/name when a Bluetooth tag that matches the list responds to proximity detection and establishes a signal strength that may be calculated and when more than one beacon signal receives a simple triangulation can be done to find the current location. Other Bluetooth device not on the list will be filtered out.

The locating is established and will be displayed on the map. And because the location of the other tags/beacons is known navigation between the current location and a desired tag/beacons that represent waypoints are easy to achieve. In reality no communication is established at all between the tags/beacons and the cellular phone.

The disclosed innovation reverses the current idea of "locating" the user by letting the user navigate utilizing to the beacons of Bluetooth beacons (whose signal is sent by way points) directly to the user's mobile device. This will allow LBS (Local Base System) navigation, even indoors without GPS or Cellular network as well as triggering application and even link to existing system and software.

The RF beacons can reach from long distance depending on the application and the antenna used by the RF beacon (to get more accuracy less range and more beacons may needed so the 10 m is more than needed in building/room environment) getting more range to the "box" is as simple as attaching a bigger antenna or power buster to increase the signal.

The user is in a complete control, they have the choice to turn it on or off at any time.

User can choose to be registered: membership privilege, student in a university, school, and business especially for receiving direct incentive specials coupons etc. . . . and for a full nav4emergency protection.

The disclosed applications let the user choose between participating and receiving incentives, specials, sales, coupons and local content tailor to the user preference, all for free, or they can choose not to participate and pay a small fee for the service and the software. In any case the user's privacy is still protected to the highest level compared to any normal daily use of the Internet . . . !

There is also a great benefit to the user participating-they can have full emergency notification directly to their phone and in an emergency they can be directed by the emergency procedure in the area/building/mall/store and navigate to the exit route, even if the cellular network fails due to the high volume of traffic occurring in an emergency situation.

In the disclosed method, there is no detector or tracking for the user, the user themselves engage the scanning and detecting method to find the beacons in the area the user device with the proximity scan beacon providing the triggering mechanism.

Other than that, the proposed solutions create a full suite of applications for the benefit of the user, from parking to sales specials to indoor navigation, to be informed and notified in case of an emergency and directed to the exit route to safety.

The disclosed method can be attractive not only for shopping malls, department stores, or downtown strips but also to high-rise buildings, commercial buildings, universities, schools, museums, amusements parks, trains, subways, and hotels. It can also be attractive to search engines, advertising companies, cellular phone operators, manufactures, GPS companies, mapping, local businesses, local advertising, location based services (LBS), and the like. The disclosed method can give the LBS a new meaning—the business model that's made easy.

A facet of behavioral targeting has been around for a while but mostly on-line but it's been gaining traction among ad agencies retargeting program is now a key planning consideration for its advertisers.

Why? The primary reason is because retargeting is a powerful means to bring lift to ad campaign results, generating higher conversion rates and lowering acquisition costs. You can't get much more effective than targeting a person who has shown interest in a product but didn't buy with a related ad that then gets him to buy, right? It generally fails to tap the unique opportunities of local advertising market estimates to be over $150 Billion in US alone . . . , Although people are spending more than 90% of their time indoor, there is no clear technology to provide indoor navigation and not clear business model, the advertisers, the business are disillusioned with the promise of location base services (LBS) but are still longing for a solution that properly addresses the significant audience represented by the explosion of cellular phones use and the availability of content.

It is understood that the disclosed innovation technology and business model can provide the next generation method for the LBS market to tap into the huge market opportunities.

The disclosed methods represent a very unique way of locating the exact location, in the method the user scans the area for a known list of beacons/tags, the user controls the scanning of the area for the known tags ID type, in reality there is no communication to be established at all between the user and the beacons (no pairing needed!), the user device scans the area for a known tags and the determination of the location done by beacon ID and signal strength to the proximity to the tag/beacon provides accuracy less than 5 m.

Added to the navigation feature is the special indoor application design especially for indoor/store/mall shoppers from finding where the user parked his car to find/search of directory to an emergency alarming and notification.

Moreover this innovation is not depended on cell communication or Internet for the detection method as there is no need for central system nor expensive infrastructure, in fact the user device-cellular phone as well with the infrastructure tags/beacons have battery built in and can work even if the electricity is out, very important in emergency situations.

Moreover the sale sense marketing method comprising a unique way of delivering local content, advertising, coupons, special sales etc. pin point according to user ID and or profile preference that can be a record of behavioral activity and will provide simple and secure method for targeting user for LBS services and other services replacing like near field communication for marketing and even payments transactions.

The disclosed innovation provides a full line of indoor navigation application especially to places/area.

An indoor navigation system may include a navigation computer, an arrival detection system. The navigation computer may be configured to receive a destination to which a user of the mobile navigation system wishes to travel and to provide guidance to the user about how to navigate to the destination. The arrival detection system may be configured to automatically detect when the mobile navigation system has arrived at the destination by being in a proximity to an RF beacon ID in the local area. The detection system is based on sense or scan of the existence of RF beacons installed in the local and be configured to wirelessly transmit automatically an arrival notice indicating when the user detects the existence of a proximity of a RF beacon and detects that the user has arrived at the destination in response to detection by the detection system of the arrival of the mobile navigation system at the destination.

The mobile navigation system may be part of a cellular telephone or any navigation device using a Bluetooth, part of the detection is a notification system is configured to wirelessly transmit the RF beacon ID of the proximity beacon and to associate the mobile ID of the user to determine the exact location of the user to provide for example: arrival notice to a representative of an airline. The arrival notice may be configured to cause the user to be checked into a flight of the airline.

The system may be configured to wirelessly transmit the arrival notice to a representative of a hotel. The arrival notice may be configured to cause the user to be checked into the hotel.

The system may be configured to wirelessly transmit the arrival notice to a representative of a food service.

The arrival notice may be configured to trigger the delivery of merchandise or a service to a vehicle in which the user is traveling. The arrival notice may include information about the location of the vehicle.

The arrival notice may be configured to trigger promotional items to be delivered to the user relating to an establishment at or near the destination.

The system may be configured to wirelessly transmit the arrival notice to a representative of a conference that has been scheduled to take place at the destination.

The system may be configured to wirelessly transmit the arrival notice to multiple recipients. The multiple recipients may include attendees of a conference that has been scheduled to take place at the destination.

The system may be configured to wirelessly transmit the arrival notice to a social networking site in a fashion that causes notice of the arrival of the user to be published by the social networking site.

The system may be configured to ask the user for permission to transmit the arrival notice.

The system may be configured to automatically transmit the arrival notice upon detection by the arrival detection system of the arrival of the mobile navigation system at the destination.

At the time the navigation computer receives the destination to which the user wishes to travel, the system may be configured to ask the user whether the user wants the arrival notice to be transmitted in response to detection by the arrival detection system of the arrival of the mobile navigation system at the destination.

The system may include a global user setting which a user may set to automatically transmit or not transmit arrival notices in response to detection by the arrival detection system of the arrival of the mobile navigation system at destinations.

The system may be configured to ask the user to where it should transmit the arrival notice, to receive information indicative of this requested location from the user, and to transmit the arrival notice to this location.

The system can create and utilize a network, which is referred to as dynamic deployment. The system will use the built-in Bluetooth protocol stack module that is able to simultaneously interconnect with other local devices, such as portable cellular phones in a "piconet", over the local area. The simultaneous connectivity limit of eight (8) devices at a time is overturned by the ability of creating a plurality of piconets which operate in a close proximity. It is understood that the Bluetooth enabled devices, such as portable cell phones, can rapidly move from one piconet to another. In fact, the Bluetooth devices need only remain a member of a piconet for the period of time required to complete one communication transaction. So the Bluetooth enabled devices can join and leave a local piconet frequently, effectively overcoming the eight (8) device limit. It is noted, even without the option to use a long range Bluetooth antenna, the configuration can effectively reach an unlimited distance.

The proposed invention provides an ability to form a wireless as hoc Bluetooth network or networks based on a collection of Bluetooth mobile devices that dynamically form a temporary network as long as these device are within a sufficient range (inside a room or a building, road store or a mall). The flexibility of the ad hoc network is what makes it a suitable choice for emergency deployment scenarios, where multiple devices would be deploy in a proximity area that is designated as an emergency to provide a new way of distributing emergency and alert information directly to those in the needed area.

Moreover, based upon normal human behavior, there is no need to inform everyone in a full room, or requiring all of the proximity devices participating in the network to be informed (for example in emergency). If only a few people within the occupied room are informed or receive the emergency information on their portable cell phone, they will convey the information to others located in the area.

The same method and idea is mimicked by the concept of dynamic deployment. The concept can be paralleled as a new way to deliver critical emergency alarming and notification without infrastructure in the localized area.

Moreover, the limitation of Bluetooth coverage can be overcome by utilizing the capabilities of the Bluetooth protocol in the methods described above. For example, in a very large conference location, the localized Bluetooth network (piconet) can join each other and form a larger network that covers the entire facility, which is much larger than the limited coverage of a single Bluetooth device. Portable cell phones located at one end of the facility can communicate with a second Bluetooth enabled device located at the opposite end, where the communication traffic is relayed by one or more intermediary, bridge devices. Any Bluetooth device, in our example Bluetooth enabled cellular phones, can become the bridge. The cellular phone owner does not need to know whether his/her device is a bridge, as the process is established and functions automatically as part of the Bluetooth protocol stack routine; in effect not changing any internal behavior of the Bluetooth.

And again, there is no need to reach all the people with an emergency or other message, as if the message were conveyed to only a few in a room, at least a portion of those would inform the remaining people of the emergency message.

Moreover, the present innovation will allow the user to use a "local instant emergency messaging system". The dynamic deployment configuration provides the ability for people to communicate with one another in the same local proximity using Bluetooth, where the people can chat and exchange important messaging for free exclusive of a need for a cellular network. Just think what it can be done in emergency or even in army deployment as other communication method.

From the old days in history, humans used messengers to deliver news and information. The disclosed invention uses applies these older concepts to a device that will make it easy to distribute and broadcast the information around, using the messengers as the mobile (emergency) notification, as referred to as dynamic deployment.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION OF THE PRESENT INVENTION

Figure 1:
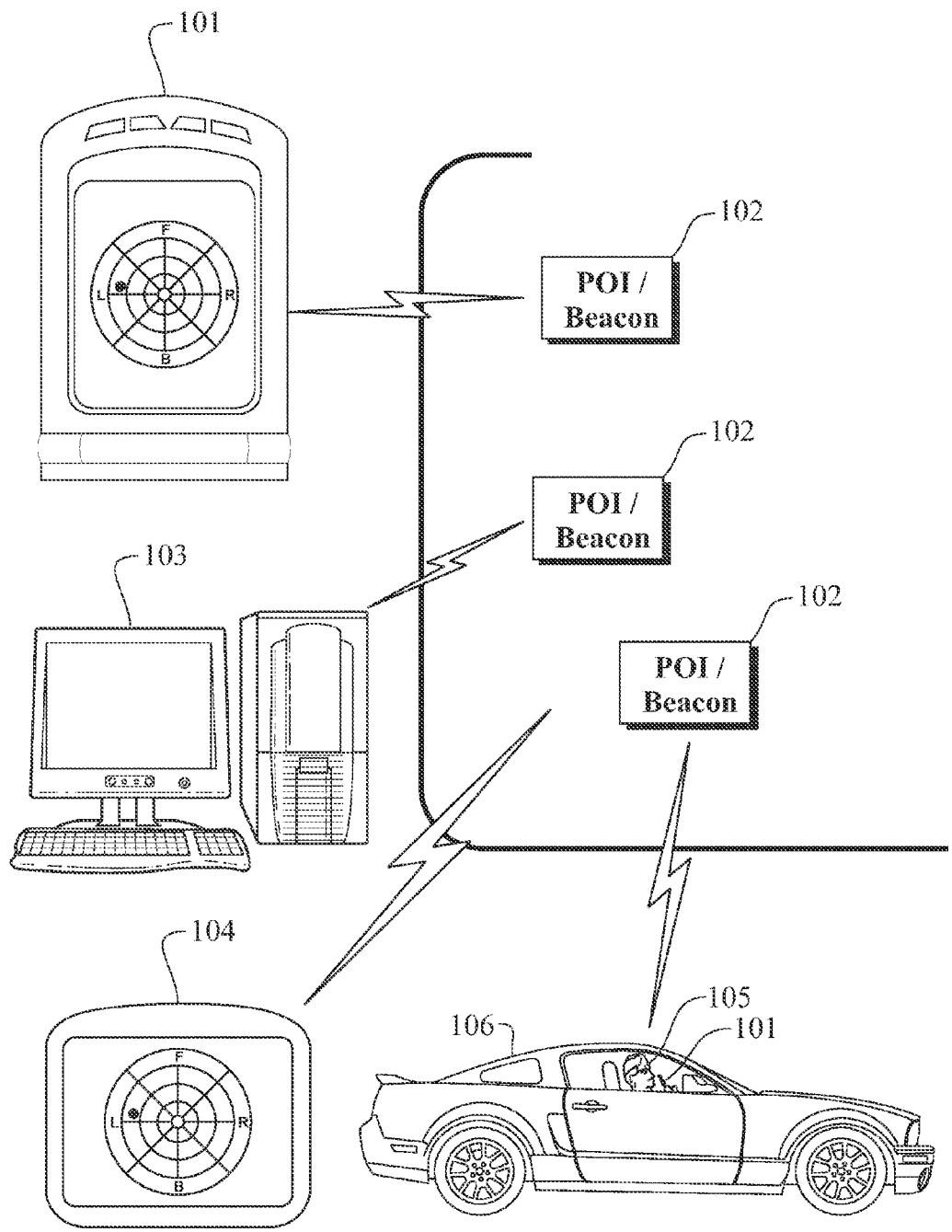
FIG. 1 presents a schematic diagram representative of an infrastructure deploying a series of radio frequency (RF) wireless beacons.

In all the figures of the drawings, sub-features and integral parts that correspond to one another bear the same reference symbol.

Referring now to the drawings in detail and first particularly to FIGS. 1-13 thereof.

FIG. 1 presents an exemplary flowchart illustrating a use of RF beacons (102). The RF beacons can utilize at least one of Bluetooth and Wi-Fi signal protocols. The exemplary system utilizes a mobile cellular phone (101) to scan and detect a proximity of an installed beacon (102) in the most part for determining an indoor or outdoor location in a proximity to a known location of the installed beacon (102) and for initiating or triggering a notification of an existence to indoor and/or outdoor navigation and delivery of local content according to the determined location. The same method can be used by fix computers or portable computers (103), portable devices (104), pedestrians carrying a portable device (105)(such as a cellular phone), or a vehicle/car (106) that can be equipped with RF Bluetooth or Wi-Fi technology. It is noted that the static beacons (102) can be assisted by including other portable RF Bluetooth or Wi-Fi enabled devices within the network, thus creating a dynamic network. It is understood that a number of applications can be provided utilizing the infrastructure created by the series of deployed beacons. Additionally, the applications can utilize a precise location of the user, wherein the location is determined by information provided by beacons signals emitted from each of the deployed RF beacons (102).

Figure 2:
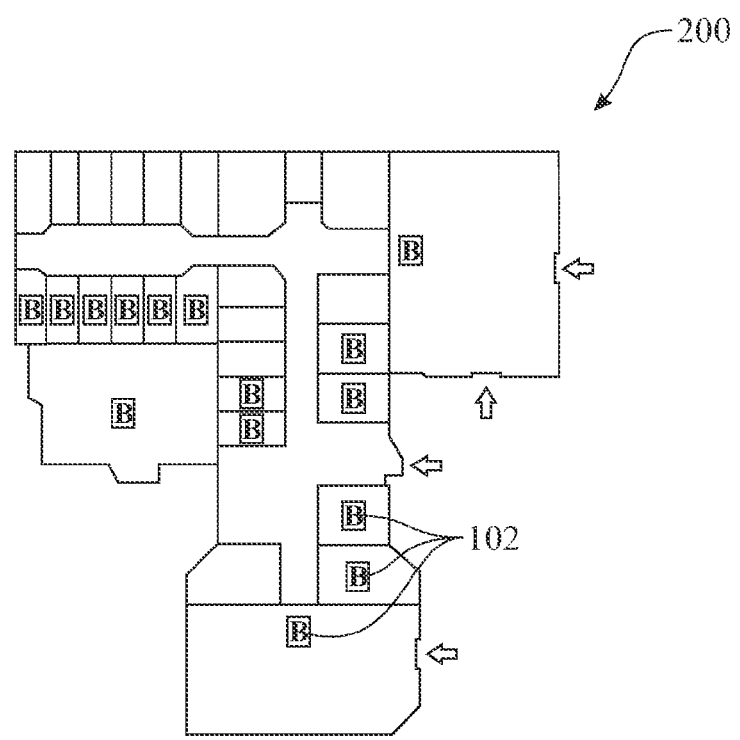
FIG. 2 presents a schematic diagram representative of an indoor mapping system utilizing RF wireless beacons, wherein the diagram depicts an exemplary application within a shopping mall environment.
Figure 2:
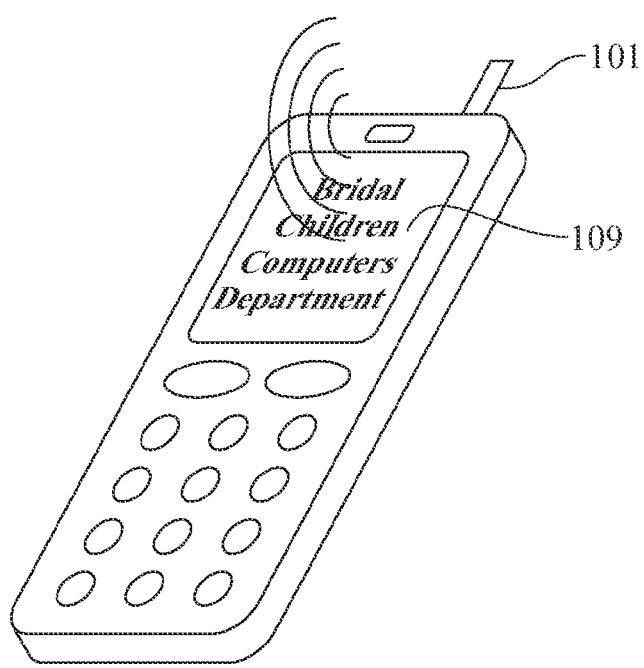
Figure 9:
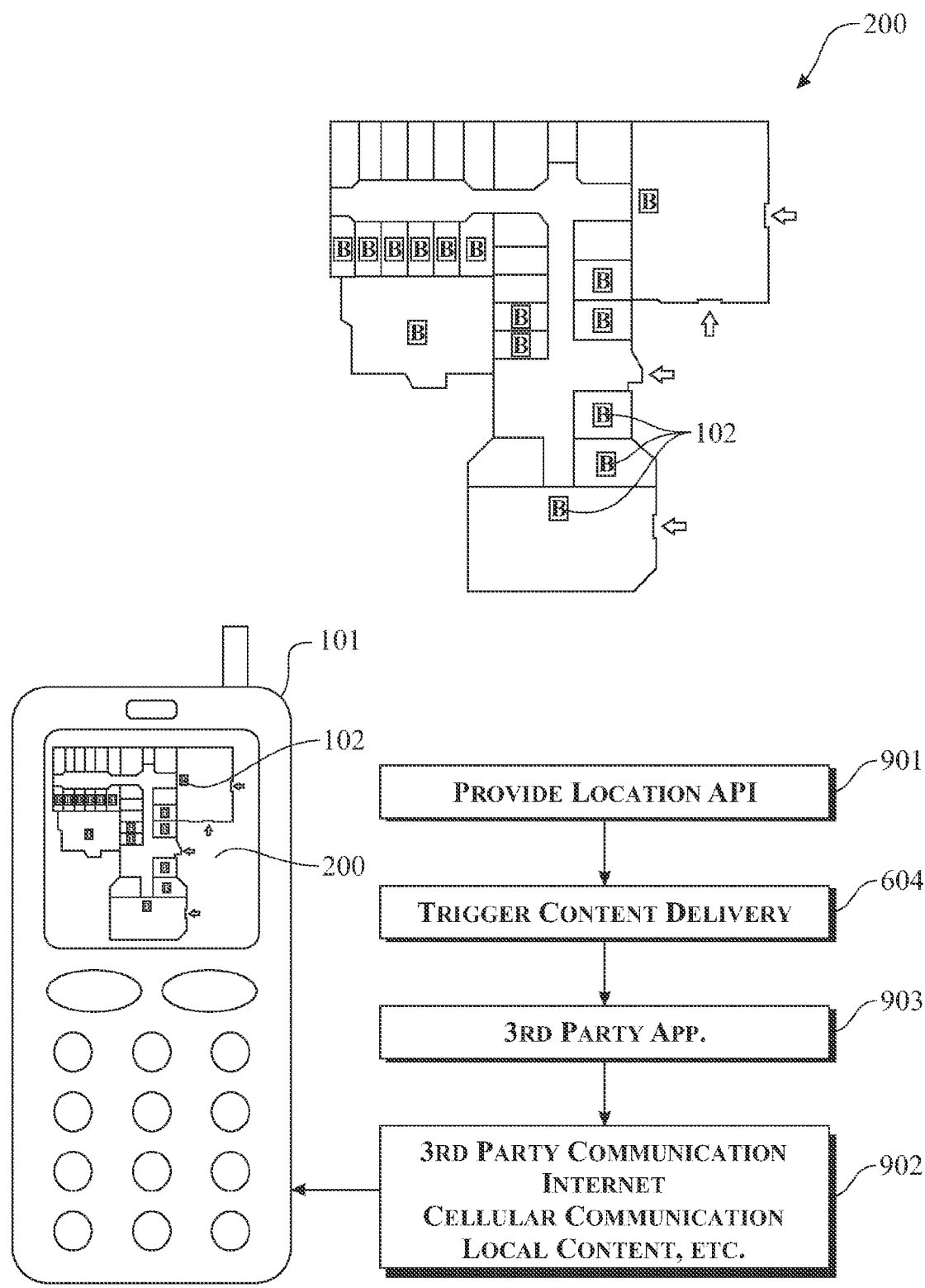
FIG. 9 presents an exemplary schematic diagram illustrating an infrastructure employing RF beacons deployed in the indoor environment.

FIG. 2 presents an exemplary use of the RF Bluetooth and/or Wi-Fi beacon infrastructure deployed in a mall environment. An indoor map (200) of the mall interior is downloaded and saved or installed on the cellular phone (101). The indoor map (200) includes building structure layout, business locations and descriptions, and known RF beacon (102) locations throughout the associated mall, building, or other facility. The RF beacons (102) can be deployed inside stores or at as any other Points of Interest (POI) located throughout or around the mall. Information associated with an RF beacon (102) located proximate the cellular phone (101) can be forwarded to the cellular phone (101) by the beacon signal. The associated information (109) can be displayed upon the cellular phone (101) as illustrated. A location of the beacon signal receiving device (such as a cellular phone (101)), can be determined based upon a close proximity to one or more of the RF beacons (102) of the series of deployed beacons, which create the infrastructure. The precise location of the receiving device (101) can be determined based upon an identified beacon ID and a signal strength from the detect beacon (102) or beacons (102). The precise location can then be displayed upon an indoor map (200), as shown in FIG. 9.

Figure 3:
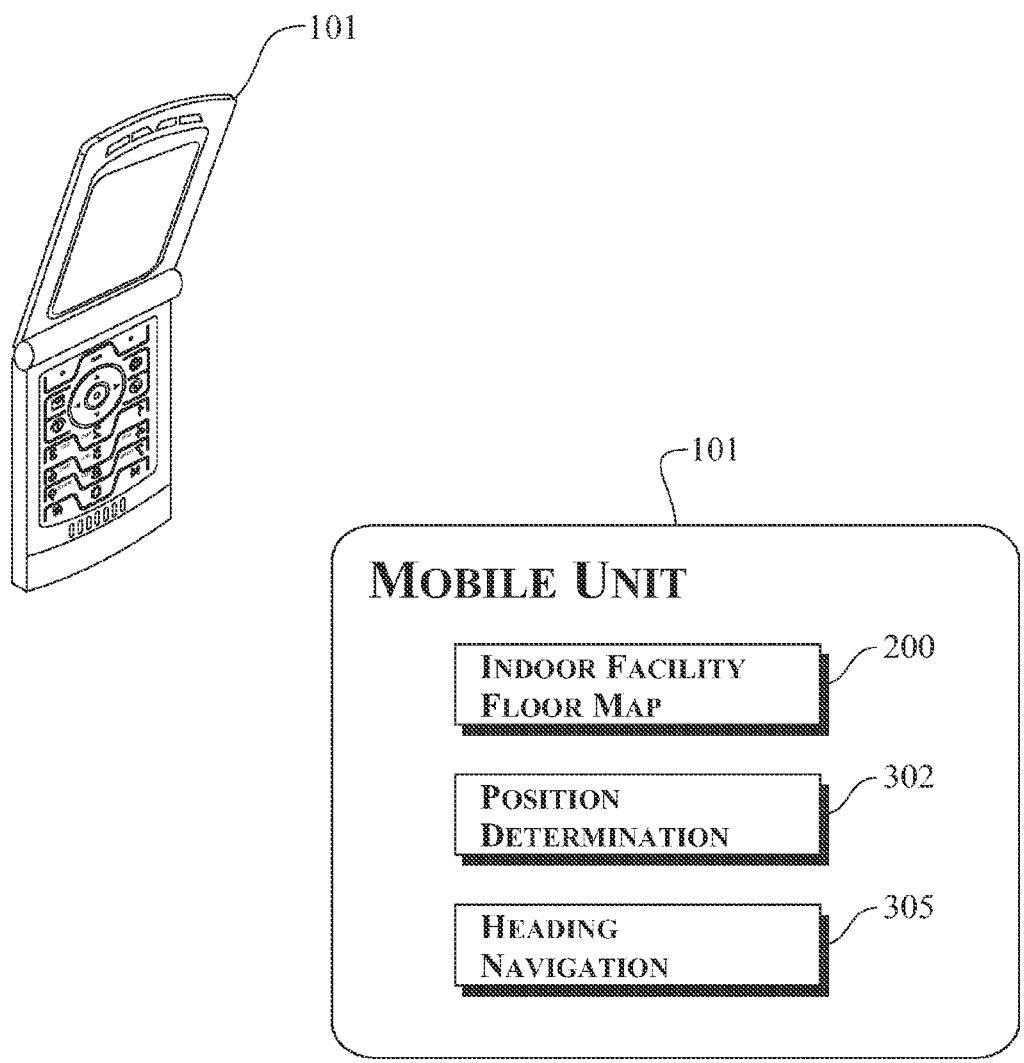
FIG. 3 presents a schematic diagram illustrating basic exemplary functions of an indoor mapping application as used on a mobile or cellular phone.

FIG. 3 presents an exemplary operational process completed by the cellular phone (101). The mobile device (101) activates an application program for indoor mapping of the facility, building, structure, and the like (200) and scans a local area for RF beacons (102) to determine the precise location (302) of the mobile phone (101). The location of the mobile phone (101) is determined done by scanning the infrastructure of RF beacons (102), wherein each beacon is installed in a known location within the structure, wherein the structure can be a mall, a building, any facility, or any other enclosed structure. The RF beacons (102) can be installed inside stores or at any specific Point of Information (POI), around the mall. The location of the cellular phone (101) can be determined by using information from any RF beacon (102) located in a close proximity to the cellular phone (101). The application would recognize the beacon ID embedded within a beacon signal emitted by the proximate beacon (102). The application would calculate the location of the cellular phone (101) by utilizing a signal strength of the emitted and received beacon signal. This process provides a solution for a user to determine their location exclusive of a global positioning system (GPS), access to the Internet, or any other bi-directional communication. The location of the cellular phone (101) is then displayed upon an indoor map (200) on a display on the cellular phone (101). Should the cellular phone (101) be located in a suitable area and comprise the ability to establish bi-directional communication, the cellular phone (101) can transmit a notification signal or message indicating that the cellular phone (101) is in a region proximate the RF beacon (102), such as by transmitting an "I am here" message to a predetermined recipient. This can provide an automatic check-in process, where the user "notifies" others of his local existence to the local area business to establish his local location, in turn, the system can forward local contents to the cellular phone (101), wherein the local contents would be information associated with the current position of the cellular device (101). The system can be enhanced to utilize a direction of travel of the cellular phone (101) and anticipate approaching beacons. The system would then determine and transmit information associated with RF beacons located along the current projected path of travel of the cellular phone (101).

Figure 4:
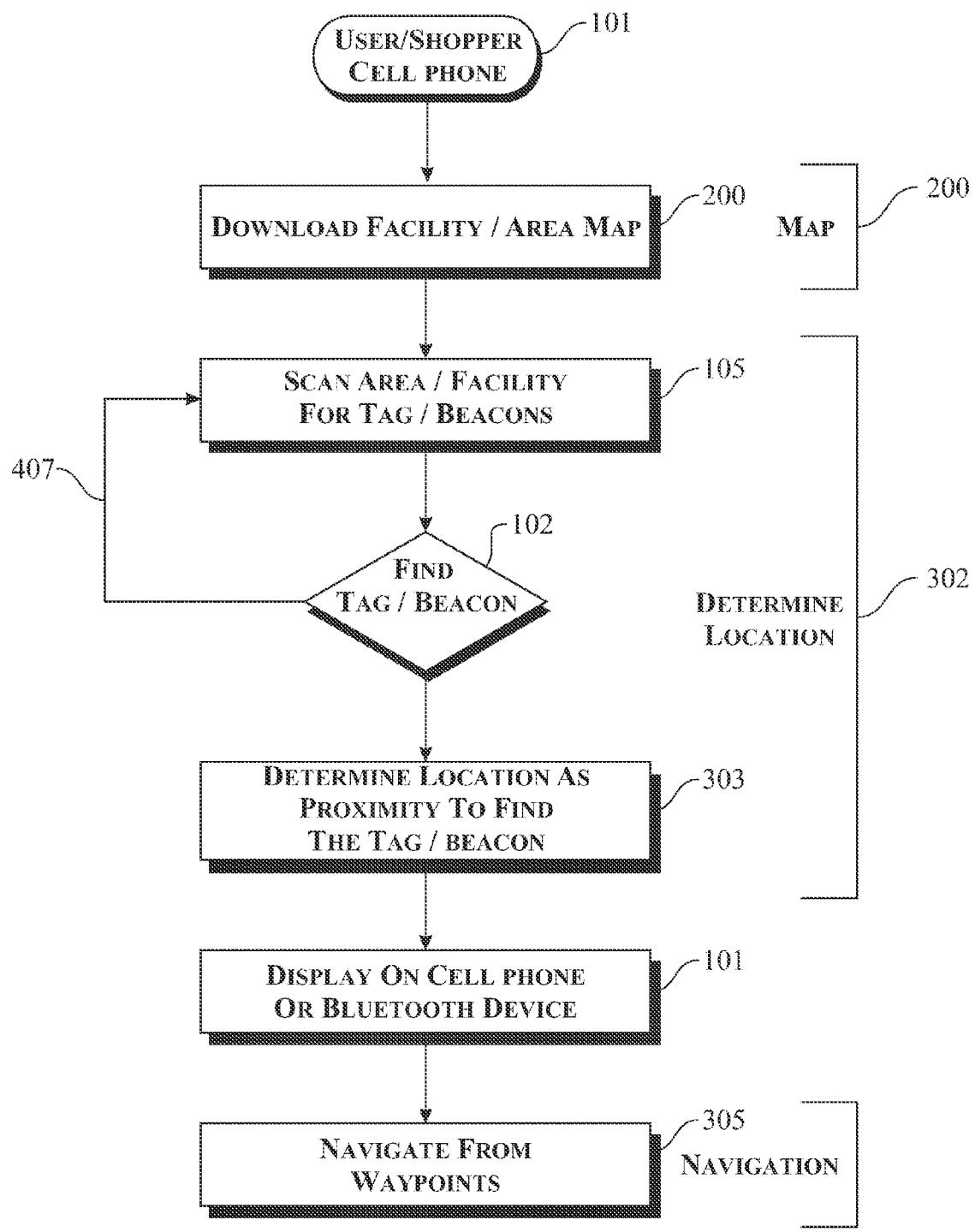
FIG. 4 presents an exemplary flow diagram representative of an indoor detection and navigation process.

FIG. 4 presents an exemplary flowchart illustrating an indoor detection and navigation procedure. A user of the mobile cellular phone (101) approaches a facility/area where the user can download the facility/area map (200) having a series of RF Bluetooth and/or Wi-Fi beacons (102) installed in known locations throughout the facility/area. The application installed on the cellular phone (101) will scan the area/facility for broadcasted beacon signals. Upon receiving a broadcast beacon signal, the application will determine if the received beacon signal is associated with any beacons included in the list of known beacons (102). If the signal is determined to be associated with any beacons included in the list of known beacons (102), then the application proceeds with a location determination process (303). The location of the user (cellular phone (101)) is determined to be in a proximity of the identified beacon (102) transmitting the received beacon signal. The location is refined by using a signal strength of the beacon signal of the identified beacon (102) enabling determination of a more precise indoor location of the cellular phone (101). The location is then identified and displayed on an associated indoor map (200). In a condition where the cellular phone (101) fails to receive a beacon signal, the cellular phone (101) continues to scan the area (107). An optional feature includes a step of transmitting a notification of existence upon identification of a location; essentially having the cellular phone (101) transmit a message stating "I am here" (304) to the local area as a way of automatically check-in and/or a method of notifying a system that the user is within a local region. For example, the system can notify a local area business that a user is within the vicinity. In another example, the system can convey local contents to the cellular phone (101) based upon receipt of the notification that the user is within the area. The system can provide the user with a navigation heading (305) to waypoints based upon the current location of the cellular phone (101). In yet another example, the system can transmit Points Of Interest (POI) to the cellular phone (101) as illustrated in FIG. 2.

FIG. 4 is a flowchart illustrating of the indoor detection and navigation procedure according to an embodiment of the present invention. Referring to FIG. 4, the user with mobile cellular phone (101) approach a facility/area where he can download the facility/area map (200) with RF wireless Bluetooth and or Wi-Fi beacons (102) installed in the facility area in a known place. The user mobile cellular phone (101) application will scan the area/facility for the known list of the beacons (102), if beacons was found then a location determination process (303) where is location of the user is determine as proximity to the find and match beacon ID, being in a close proximity to a beacon and recognize the beacon ID as well as calculating the Signal strength from the detect beacons (102) allow determination of the precise location indoor and ability to show the location over the indoor mapping (200), scanning is continue if no beacons (407) was found, when found the location is display on the loaded map over the mobile cellular phone (101) or Bluetooth device (103-106), part of the detection is to notify of existence "I am her" (304) to the local area as a way of automatic check-in method where the user "notify" his local existence to the local area business to establish his local location (303) and receive local contents, according to his location a heading navigation (305) between Points Of Interest (POI) can be establish.

Figure 5:
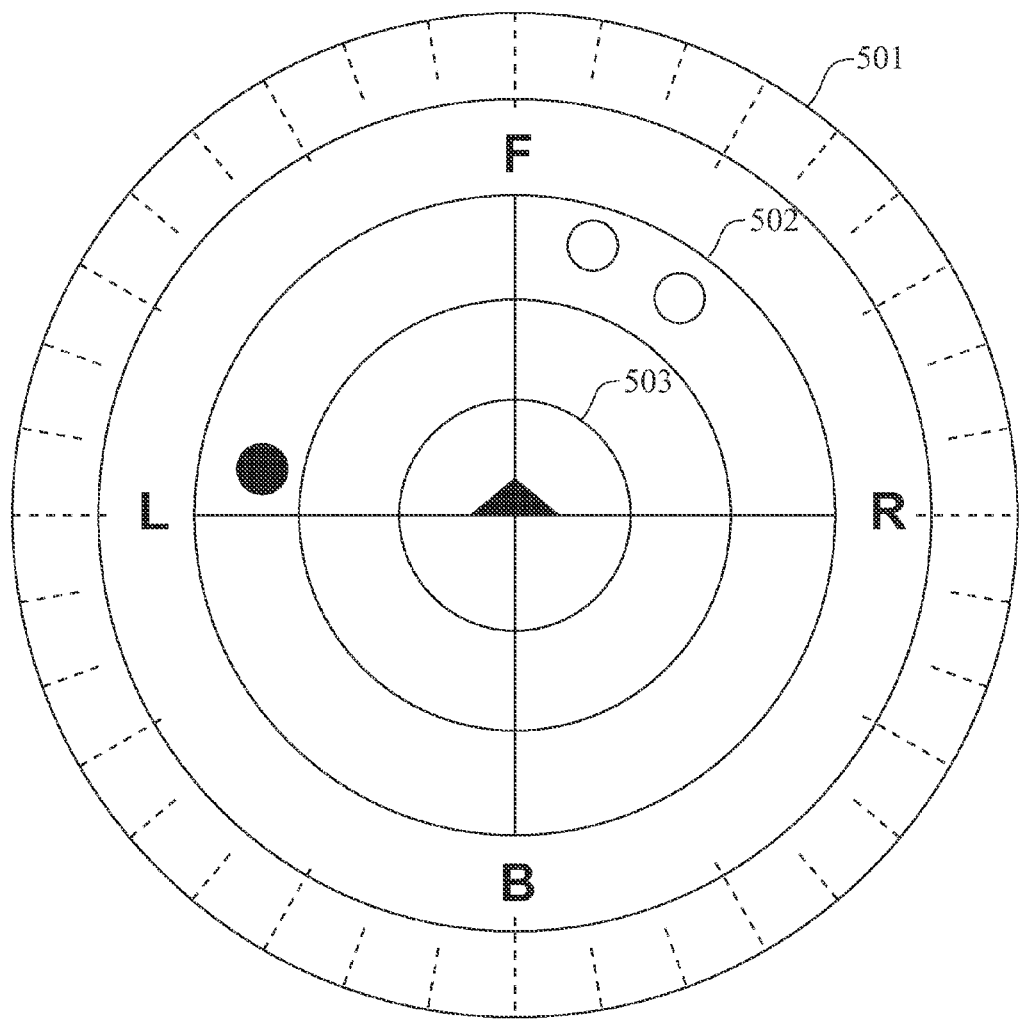
FIG. 5 presents an exemplary series a gradient concentric circles indicative of a location.

FIG. 5 presents an exemplary RF beacon accuracy radius circle (501) that is utilized in at least two distinct manners: one manner is used for the application, and a second manner is used to identify when the user's cellular phone (101) enters and/or exits the area around and in a proximity to a beacon (102) of the series of beacons (102). The central circle (502) and inner circle (503) illustrate different radii from the respective beacon presenting an accuracy of the location of the cellular phone (101). The radius circle (501) would be placed as an overlay circle over a portion of the local indoor map (200). This displayed configuration would identify an accurate location of the cellular phone (101) respective to the proximity of the beacon signal received from the Bluetooth and or Wi-Fi RF beacon (102) installed in the vicinity of the cellular phone (101).

Figure 6:
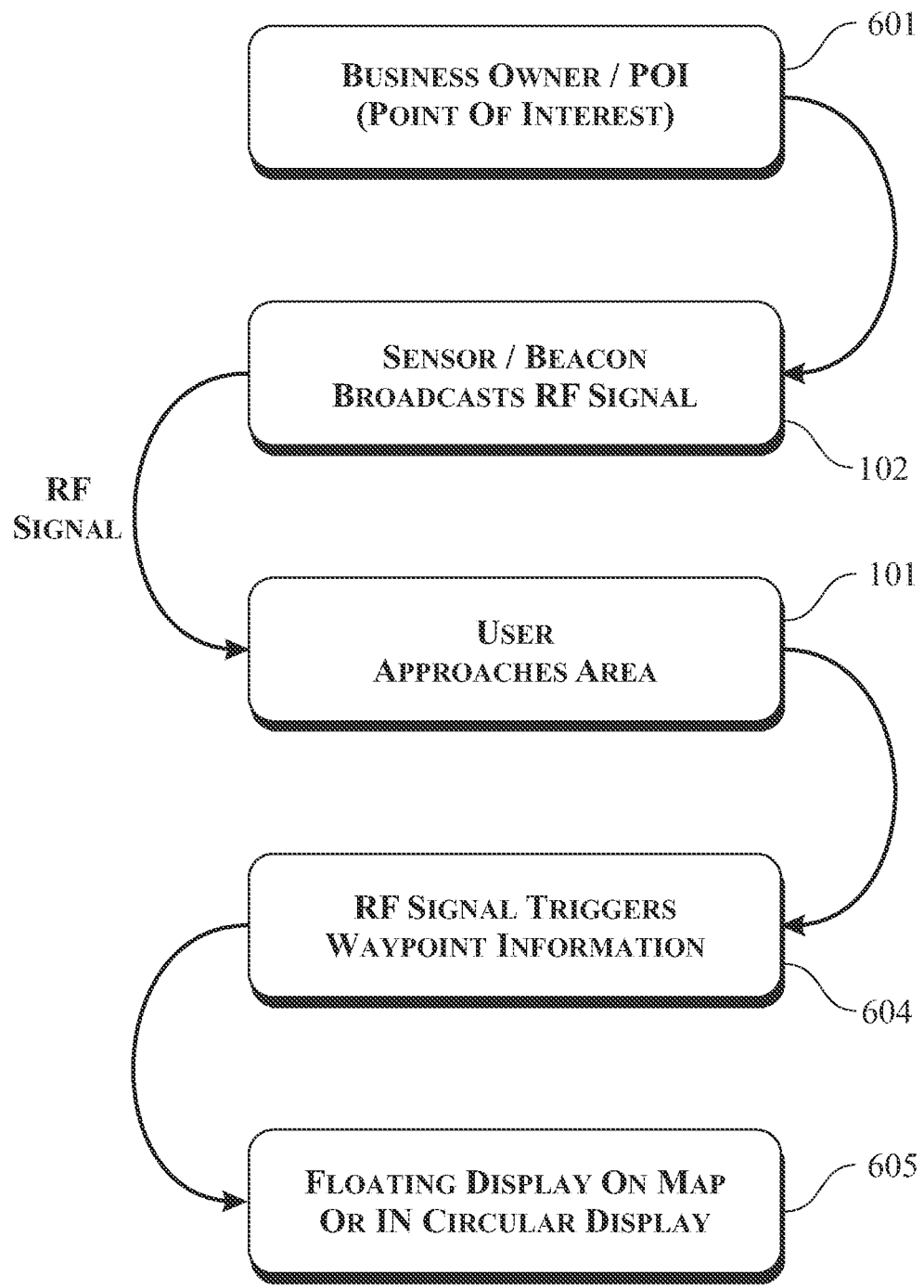
FIG. 6 presents an exemplary flow diagram representative of a business based application utilizing a series of deployed RF beacons.

FIG. 6 presents an exemplary flow diagram of a business application utilizing the series of RF beacons (102) deployed throughout a facility, one or more buildings, a mall, a store, and the like. Each RF beacon (102) can be installed by the facility owner, a business owner (601), an advertising company, and the like. In one application, a business owner (601) would install an RF beacon (102) in their business. When the user of the cellular phone (101) approaches the RF beacon, the cellular phone (101) detects the beacon signal transmitted by beacon (102) in the proximity thereof. The cellular phone (101) receives the beacon signal and determines the identification of the beacon (102) associated with the received signal. Once the location and/or identity of beacon is known, the application initiates a procedure to obtain local content delivery (604) from the business and/or business owner. In one option, the system can provide business or local content (605) to the cellular phone (101). In a second option, the cellular phone (101) can transmit a signal that will directly or indirectly notify the business owner that the cellular phone (101) is located proximate a specific beacon (102), wherein the specific beacon (102) is associated with the business owner's store, located either proximate to or within the business owners store, and the like. In turn, the business owner can provide local content (605) to the cellular phone (101).

Figure 7:
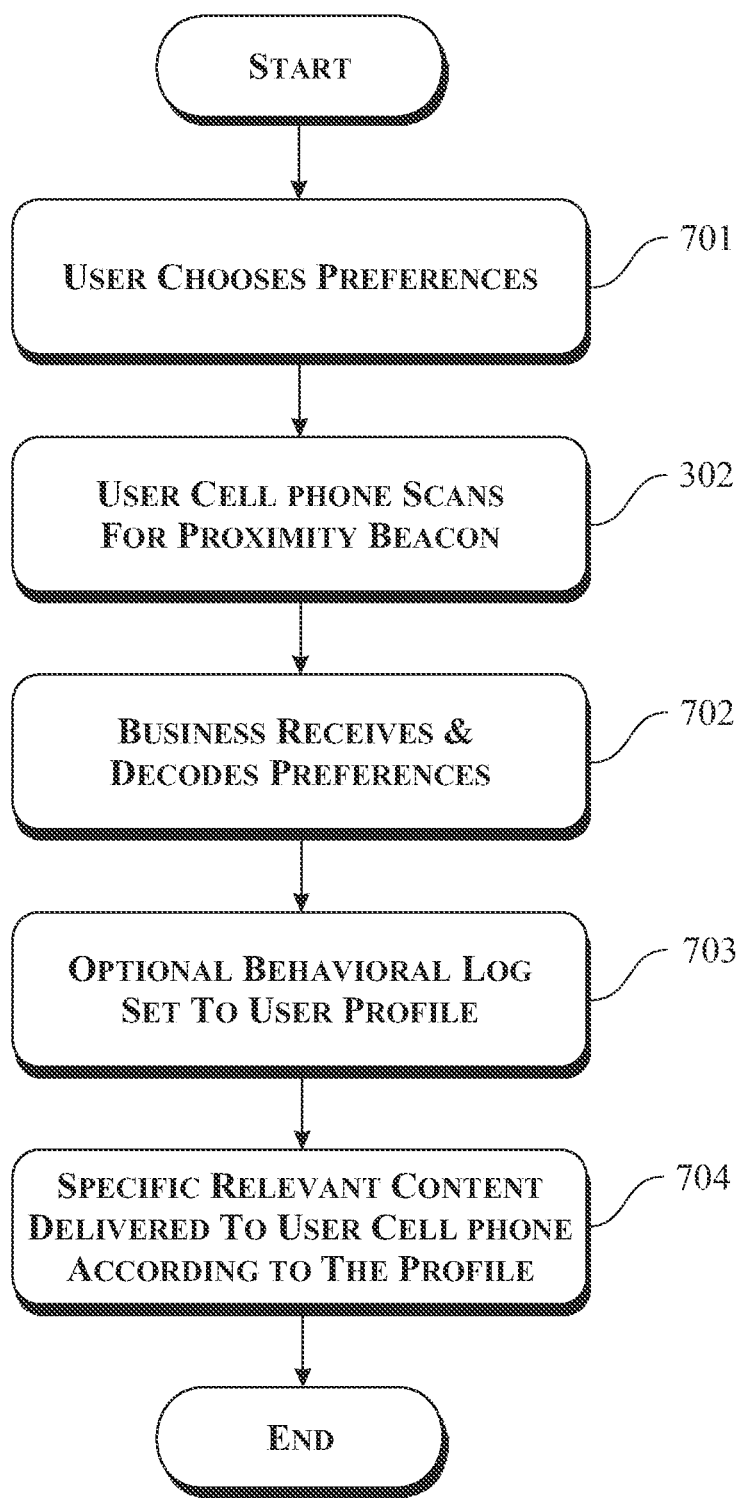
FIG. 7 presents an exemplary flow diagram representative of a marketing based application utilizing a series of deployed RF beacons, wherein the marketing based application utilizes a profile, preferences, and other information for sales and marketing purposes.

FIG. 7 presents a flow diagram illustrating an exemplary target marketing feature. The application uses a profile preference provided by the user's cellular phone (101) wherein the mobile device scans the local area and determines the location of the cellular phone (101) using information obtain from a beacon signal broadcasted by an RF beacon (102) and optionally utilizing a beacon identifier (302). The profile preference is associated with the user of the cellular phone (101). The profile preference is provided to the local business in conjunction with a notification that the cellular phone (101) is located in the proximity to the specific RF beacon (702). The process can filter information to determine local based services contents (704), wherein the local based services content (704) is based upon the profile preferences of the Local Based Services (LBS), and the user's behavior (703). The system can determine local based services content (704) such as deals, offers, coupons and specials, and the like, as well as store or business information, and provide the information accordingly to the user through the user's cellular phone (101).

Figure 8:
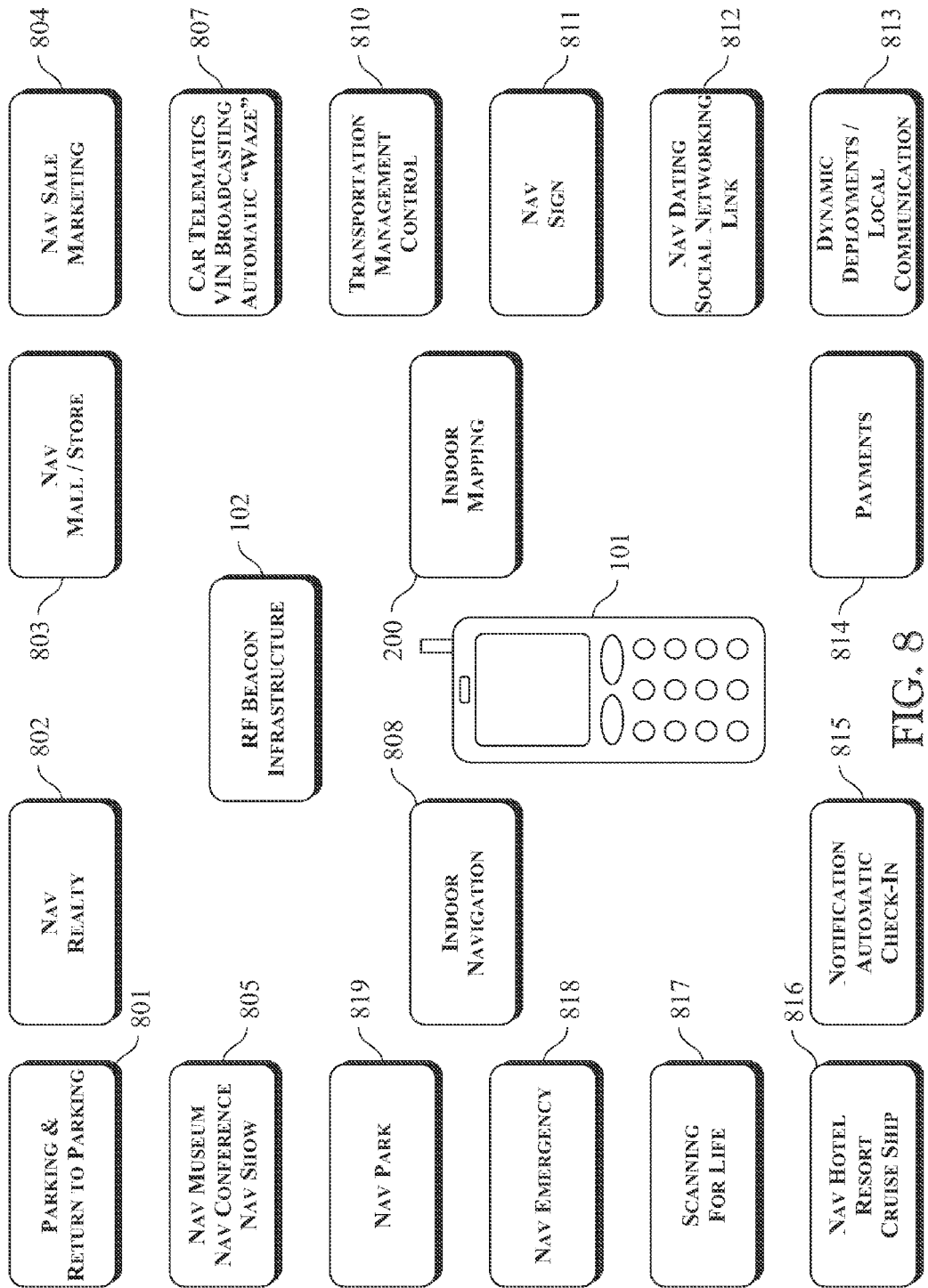
FIG. 8 presents an exemplary schematic diagram representative of a series of functions or applications associated with a series of deployed RF beacons, wherein the series of functions or applications are generally directed for use with an RF beacon infrastructure deployed within an indoor environment.

FIG. 8 presents a series of Local Based Service (LBS) applications that can be utilized in conjunction with infrastructure provided by the series of deployed RF beacons (102) and the methods describes according to various embodiments of the present invention. One application (Parking and Return to Parking (810)) provides a method for searching for available parking spaces and/or a process for assisting a user to return to the parking location of the user's car. The Parking and Return to Parking (810) application can provide parking information within a parking garage, in a mall parking area, for street parking, and the like, wherein the Parking and Return to Parking (810) provides the user with direct navigation to empty parking spots and/or to provide the user guidance to return to the location where the car was previously parked.

In another application (Nav realty (802)), information associated with real estate is provided to a user using RF beacons (102) installed at each real estate property. Each RF beacon (102) would provide local information about the associated real estate property and can include navigation information respective to the local area real estate directly to the user's cellular phone (101).

In yet another application Navmall/store (803), information can be provided to business operators and subsequently, business related information can be provided to the application user.

In yet another application, Navsale marketing (804), sales, specials, coupons and the like can be transmitted to the cellular phone (101) and/or the system can provide directions/navigation to the user to guide the user to areas displaying items associated with the sales, specials, coupons and the like.

In yet another application, Navmuseum, Navconference, Navshow 805, the RF beacons (102) would be installed in known locations within a museum, a conference center, and any other related location, whereby the RF beacons (102) directly or indirectly provide information and/or navigation associated with the location to the user of the application.

In yet another application, Navamusement (819), the RF beacons (102) would be installed in known locations about any amusement park, theme park, or other entertainment venue, whereby the RF beacons (102) directly or indirectly provide information and/or navigation associated with the venue to the user of the application. The application can be enhanced by including an optional feature to assist a user in reducing wait times for access to rides, events, shows, and the like.

In yet another application, Navemergency (818), the RF beacons (102) provide critical information and/or navigation to the user during an emergency event including instructions pertaining to an emergency procedure, an emergency evacuation map and directions for evacuating the facility to a safe location.

In yet another application, Transportation (810), the RF beacons (102) would be deployed in a subway, on a train, on a bus, and/or in any mass transit system. This infrastructure would provide the user with information directly to their cellular phone (101) from the deployed RF beacons (102) installed along the route. This gives the user a complete navigation on a map of the train/subway mass transit directly to the user's cellular phone (101). In an alternative mode of the Transportation Application (810), the RF beacons (102) can be deployed along a side of a road, a cellular phone (101) residing within a vehicle, integrated into a vehicle, and the like. When the cellular phone (101) is mobile, the cellular phone (101) provides wireless vehicle-to-vehicle communication. One optional feature of this application would be an inclusion of automatic traffic notifications, what can be referred to as automatic "waze", whereby the cellular phone (101) can provide automatic traffic and road notifications. In an alternate embodiment, a Bluetooth device can be located within a vehicle (106) (as either a fixed or a portable device), on a driver (105), on a pedestrian, and the like. The cellular phone (101) can be included as an integral element in gathering traffic information.

In yet another application, Navsign (811), the RF beacons (102) can be installed along a roadway at locations either proximate traffic signs or at locations exclusive of traffic signs, but would be appropriate for conveying traffic related information to a driver. Each RF beacon (102) would be installed at a location enabling passing vehicles to receive beacon signals from the deployed series of RF beacons (102). The related infrastructure would provide a telematics system to the driver's cellular phone (102), a system integrated into a vehicle, and the like.

In yet another application, Indoor Navigation (808), the RF beacons (102) can be employed to provide an infrastructure enabling the application to determine a precise location of the receiving device. The application would additionally include a capability of providing navigation between various deployed RF beacons (102). This application provides a solution in areas where the global positioning system (GPS) is ineffective, such as indoors. The system also eliminates a need for bidirectional communication.

In yet another application, Nav Hotel, Resort, Cruise Ship (816), the RF beacons (102) can be deployed within a hospitality environment to provide an infrastructure enabling the application to determine a precise location of the receiving device within the hospitality environment or venue. Since most of the environments of the hospitality venues are located indoors, this application provides a solution in areas where the global positioning system (GPS) is ineffective.

In yet another application, Notification/Automatic Check-In (815), the cellular phone (101) is directed to automatically transmit an arrival message, which notifies a recipient that the cellular phone (101) has received a beacon signal from an RF beacon (102) within the infrastructure of beacons and that the cellular phone (101) is in proximity of the RF beacon (102). The application can additionally consider elements of the user's profile when determining whether to send the arrival message and/or what is included in the arrival message.

In yet another application, Payments (814), a payment transaction method can utilize a location determined by the proximity of the cellular phone (101) to an RF beacon (102) of the series of RF beacons (102). The location, the identification of the RF beacon (102) and/or the user profile can be associated with the payment.

In yet another application, NAV Dating/Social Networking Link (812), a precise location of the cellular phone (101) is determined using information associated with the beacon signal. The location information is then utilized to assist the user in regards to social networking as well as indoor navigation.

In yet another application, Dynamic Deployment/Local Communication (813), the application establishes an ad hoc network between a series of mobile Bluetooth based RF beacons, such as Bluetooth transceivers of cellular phones (101) to provide local messaging between a message transmitting user and a message receiving user, wherein the message is conveyed through at least one intermediary Bluetooth RF beacon.

In yet another application, Nav Emergency (818) the RF beacons (102) provide navigation to the cellular phone (101) from the current location of the cellular phone (101) to an exit location using a predetermined optimal emergency exit route. The location and routing would be based upon the initial location, which is determined by a proximity to an RF beacon (102) of the localized RF beacon infrastructure. The application can additionally provide an emergency procedure and any other necessary notifications to the user through the user's cellular phone (101).

In yet another application, Scanning For Life (817), the cellular phone (101) converts into a beacon in a condition where two-direction communication networks are unavailable by either lack of installation or an outage. The beacon repetitiously transmits a beacon signal using at least one of cellular transmissions, Bluetooth transmissions, and Wi-Fi Transmissions. Search and rescue parties utilize a portable receiver to scan for and locate the Scanning for Life beacon signal. The beacon signal can optionally include embedded information associated with the cellular phone (101), which can include specific information associated with the user of the cellular phone (101).

It is noted that the RF beacon infrastructure enables execution of the above-described application exclusive of cellular communications and/or access to the Internet.

FIG. 9 presents an exemplary indoor infrastructure of RF beacons (102), wherein the RF beacons (102) are installed in known locations throughout a local area. Each RF beacon (102) broadcasts at least one of a Bluetooth signal and a Wi-Fi signal. The RF beacons (102) enable an application to determine a precise location of the cellular phone (101) on a local map (200). Once the application determines the location of the cellular phone (101) respective to a proximate RF beacon (102), the application can utilize a user profile or profile preferences to obtain marketing information. The user profile or profile preferences can be used to filter information provided to the cellular phone (101). The application can provide information to a remote recipient using Application Information (API 901) triggering or initiating content delivery (604). When triggering content delivery (604), a 3rd party application (903) would respond to the transmission directed by the application by conveying or pushing local content or other associated information to the cellular phone (902). The bi-directional communication can be accomplished using cellular communication, an ad hoc network, an Internet based communication, and the like. In another embodiment, the remote recipient can include a local business owner, thus notifying the business owner that the specific cellular phone (101) is in a vicinity of the business.

Figure 10:
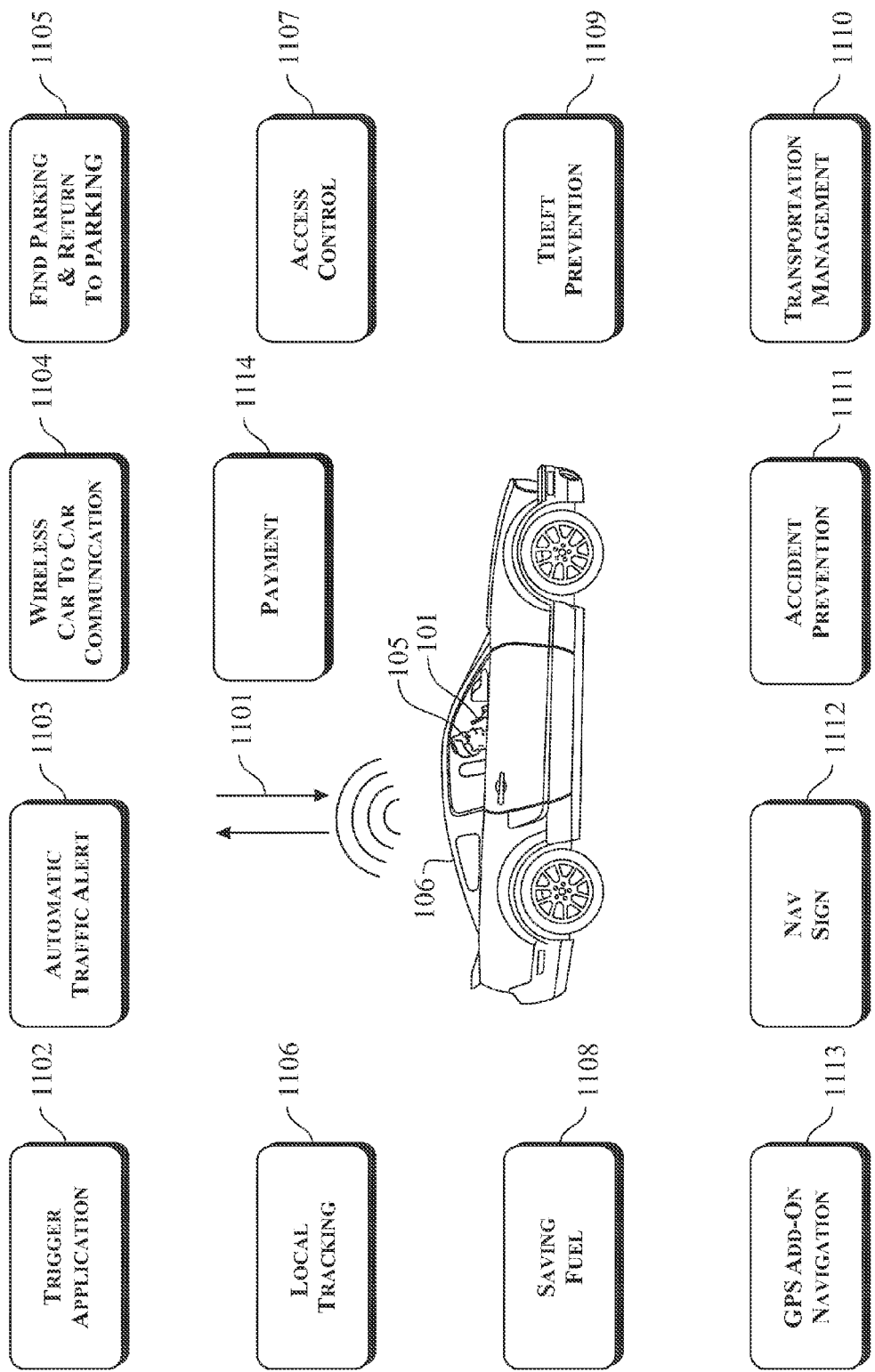
FIG. 10 presents an exemplary schematic diagram representative of a series of functions or applications associated with transportation and/or telematics applications, wherein the series of functions or applications are generally directed for use with a static and/or dynamic RF beacon infrastructure.

FIG. 10 presents a series of transportation based applications that can be utilized in conjunction with infrastructure provided by the series of fixed or dynamically deployed RF beacons (102) and the methods describes according to various embodiments of the present invention. A portion of the applications introduce telematics therewith.

One application (Automatic Traffic Alert (1103)) provides beacon signals comprising telematics including traffic alerts.

In a second application (Dynamic Deployment (1104)), an ad hoc network is created between vehicles providing vehicle to vehicle communication using an intermediary communication link. The vehicle to vehicle communication is preferably accomplished using a Bluetooth protocol.

In another application (Find Parking and Return to Parking (1105)), the RF beacon infrastructure is used to inform a user of available parking locations and/or provide navigation guiding the user to the location where the user parked their vehicle.

In yet another application (Automatic Traffic Alert (1103)), a driver (105) can employ their cellular phone (101) to deliver automatic traffic information (1103).

In yet another application (Trigger Application (1102)), the system identifies an RF beacon, which subsequently triggers or initiates an application.

In yet another application (Local Tracking (1106)), the system utilizes a Bluetooth beacon that can recognize the car/driver ID and subsequently track the car/driver.

In yet another application (Access Control (1107)), recognition of either a proximate RF beacon or an approaching cellular phone (102) causes activation of a device. This can be accomplished using any of many suitable processes. For example, when a vehicle is approaching a gate, the vehicle would receive a beacon signal from a local beacon. The signal would be deciphered to determine the identity of the beacon. Once known, the system would act according a directive that is associated with the proximate beacon identity. In one example, the system would transmit a signal to open a gate when the vehicle approaches the gate.

In yet another application (Theft Prevention (1109)), the RF beacon (102) would recognize the vehicle and prevent theft.

In yet another application (Automatic Payment (1114)), the cellular phone (101), an RF beacon device integrated into a vehicle, and the like, broadcasts a beacon signal comprising a beacon identifier, wherein the beacon identifier is used in conjunction with an automatic payment method.

In yet another application (Transportation Management (1110)), the RF beacons provide assistance for management of transportation systems.

In yet another application (Accident Prevention (1111)), the RF beacons provide assistance for prevention of accidents, such as by notification to a user when two RF beacons become too close to one another.

In yet another application (Saving Fuel (1114)), the application or series of applications can reduce fuel consumption by optimize navigation, reducing time finding parking spots, provide telematics associated with traffic, provide management support of transportation systems, and the like.

In yet another application (GPS Add-On Navigation (1113)), the series of RF beacons (102) can be used to determine a location of a receiving device and can additionally be used to obtain navigation. This is particularly beneficial in areas where the global positioning system (GPS) is ineffective (such as indoors).

In another application (Nav Sign (1112)), the RF beacons can convey information associated with road signs.

Figure 11:
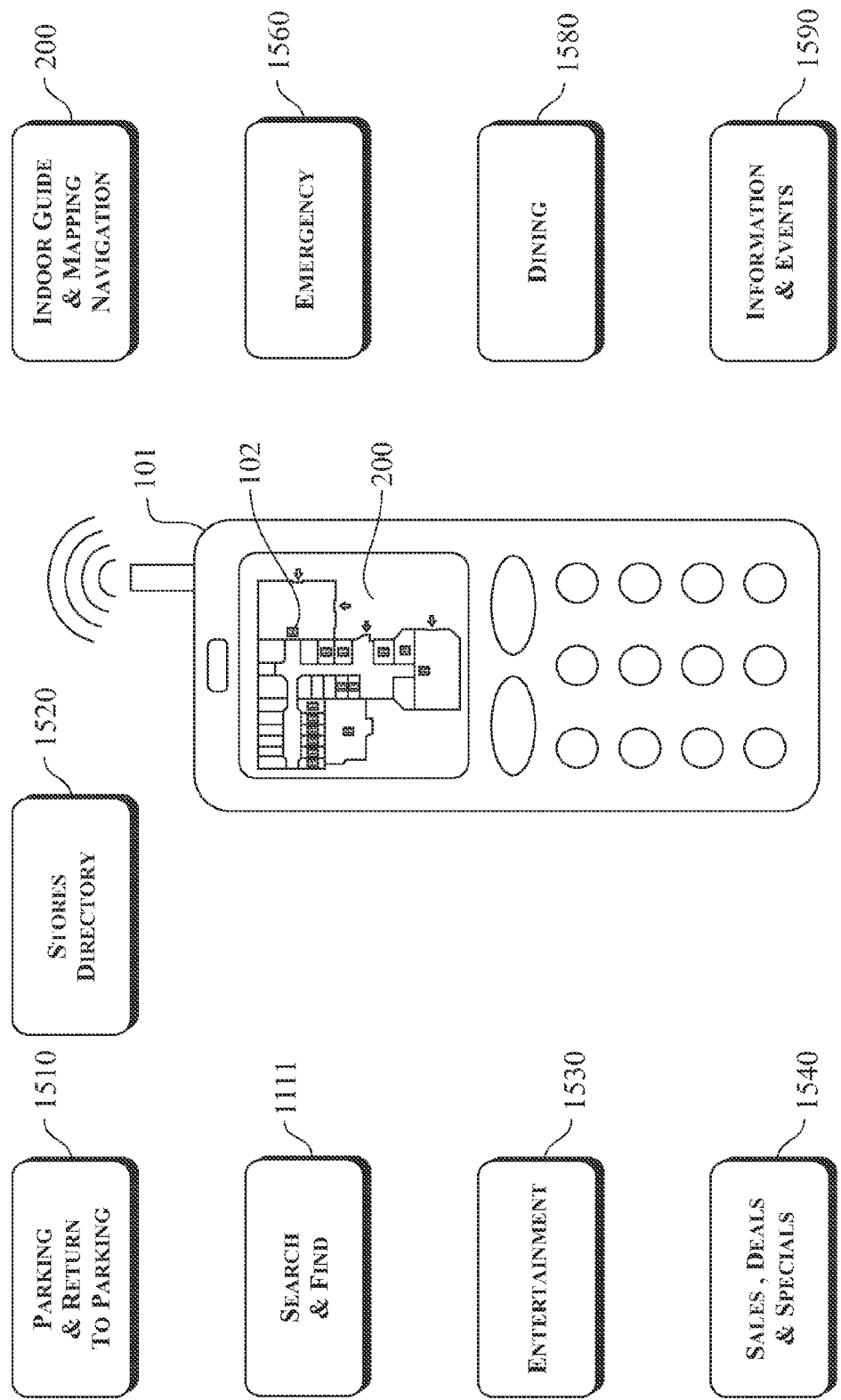
FIG. 11 presents an exemplary schematic diagram representative of a series of functions or applications associated with hospitality based applications, wherein the series of functions or applications are generally directed for use with hospitality related businesses and environments.

FIG. 11 presents a series of navigation based applications that can be utilized in conjunction with infrastructure provided by the series of deployed RF beacons (102) and the methods describes according to various embodiments of the present invention. Each RF beacon (102) contains and broadcasts a beacon signal comprising a beacon identifier to enable a receiving device to determine a precise location of the device within a facility, a mall, a show, a store, and the like. The RF beacons would broadcast a beacon signal using at least one of Bluetooth and Wi-Fi protocol. At least a portion of the RF beacons (102) can be associated with a Waypoint.

Each of the series of exemplary applications provides a location determining solution and navigation in an environment that is not conducive for the global positioning system (GPS), such as within a mall, a store, a parking garage, and any other indoor location.

One application (Parking and Return to Parking (1510)), the RF beacons (102) are deployed in a parking area. Each RF beacon (102) includes at least one sensor to determine a presence of a vehicle in the associated parking spot. The RF beacons (102) identify vacant parking spots and provide navigation to each vacant parking spot to a user. The application can additionally or alternatively provide navigation directing the user to the parking spot containing their vehicle.

In a second application (Stores Directory (1520)), a directory of merchants is provided to the cellular phone (101). The directory can include displaying locations of the merchants on a local map (200).

In another application (Search and Find (1111)), the RF beacon infrastructure is used to provide directions or navigation between known waypoints within an indoor facility, such as a mall. The known waypoints would be displayed upon the indoor map (200).

In yet another application (Sales, Deals, and Specials (1540)), the network provides information pertaining to sales, deals, specials, and the like to the receiving device. The sales, deals, specials, and the like can be associated with a location of the receiving device, wherein the location would be determined by a proximity to an RF beacon (102).

In yet another application (Entertainment (1530)), the network provides information pertaining to entertainment to the receiving device. The entertainment can be associated with a location of the receiving device, wherein the location would be determined by a proximity to an RF beacon (102). The application can additionally provide navigation to a location associated with the entertainment.

In yet another application (Information and Events (1590)), the network provides information pertaining to entertainment to the receiving device. The entertainment can be associated with a location of the receiving device, wherein the location would be determined by a proximity to an RF beacon (102). The application can additionally provide navigation to a location associated with the entertainment.

In yet another application (Dining (1580)), the network provides information pertaining to dining in the local area to the receiving device. The dining information can be associated with a location of the receiving device, wherein the location would be determined by a proximity to an RF beacon (102). The application can additionally provide navigation to a dining location.

In yet another application (Emergency (1560)), the network provides a notification of an emergency situation, emergency procedural information, and navigation from the current location, through the structure, and to a predetermined exit location. The information would be respective to the proximate RF beacon (102).

Figure 12:
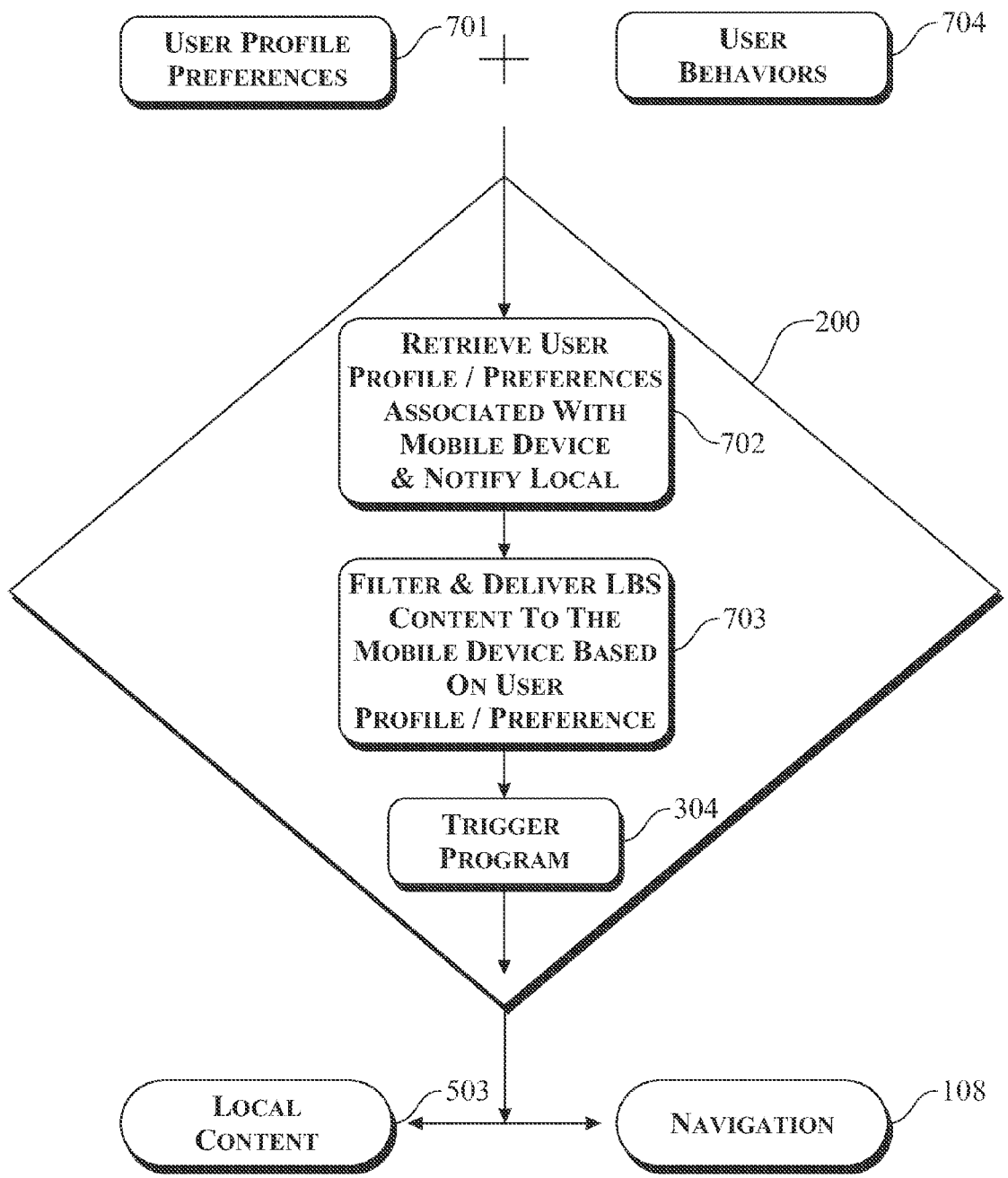
FIG. 12 presents an exemplary flow diagram representative of a next generation marketing tools employing RF beacon technology.

FIG. 12 presents an exemplary flow diagram illustrating a next generation of marketing tools utilizing the RF beacon (102) infrastructure deployed in a local area. The network obtains a user's profile or preferences (701) as well as a user's behavioral pattern (704) associated with the user's cellular phone (101). The information is conveyed to a business owner (702) for marketing purposes. The profile and/or preferences are filtered to determine applicable local based services (LBS) (703). The information can trigger or initiate an application (304), establish a link to an existing system and software, and the like to provide at least one of local content (503) and indoor navigation (108) to the cellular phone (101) or similar receiving device.

Figure 13:
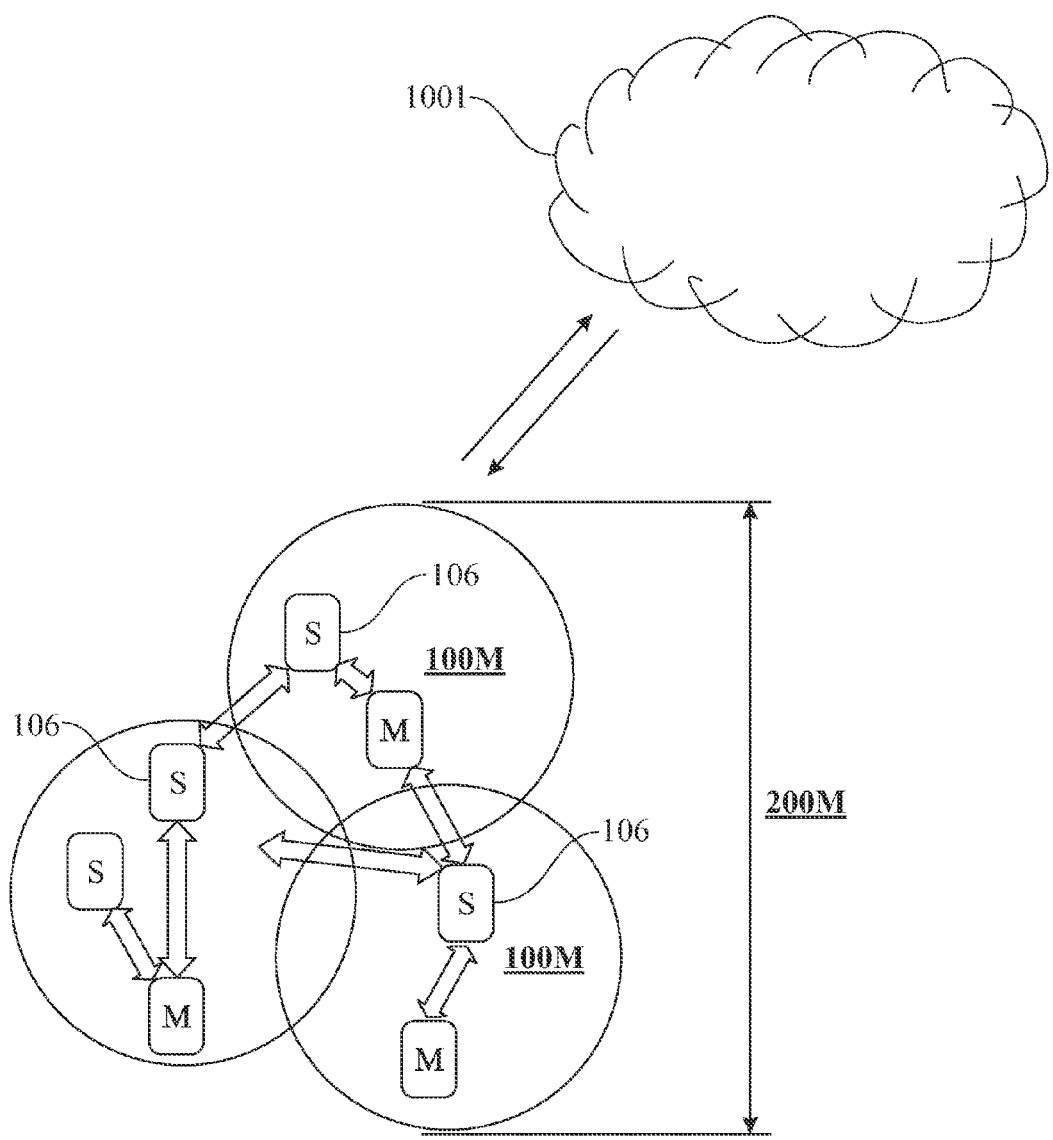
FIG. 13 presents a schematic diagram illustrating an exemplary dynamic deployment of an RF based network for use in a variety of applications, including mobile to mobile communications, car to car communications, and emergency or local communications.

FIG. 13 presents an exemplary schematic diagram illustrating a method of utilizing dynamic deployment to create an ad hoc network. Exemplary applications include vehicle-to-vehicle communication, emergency communication, local communication, and the like. The method establishes communication between a series of Bluetooth devices located proximate one another. One exemplary implementation employs cellular phones (101), utilizing the Bluetooth transceivers integrated therewith. The dynamic network is created by placing proximally located Bluetooth devices into an ad hoc or mesh network. The network is based upon overlapping signal transmission radii. The network can include installed and/or mobile Bluetooth devices, exclusive of cellular or other higher powered and costly communication interfaces. The method can be utilized in transportation creating a road size networking of vehicles and/or drivers for telematics or traffic information, a push alert providing road information, and creating a vehicle-to-vehicle communication capability. In another option, the network can be utilized in an emergency situation, more specifically, when and where the cellular network are unavailable, interrupted, down, or fail. The ad hoc network creates a longer range communication capability utilizing local low power Bluetooth and/or Wi-Fi devices to convey information to local emergency responders or other parties. Another optional feature of the dynamic deployment enables creation of an ad hoc network within a structure, a mall, a store, a building, an office, an entertainment complex, and the like, exclusive of cellular communication. The ad hoc network provides capability for local messaging between users in a proximity area. The network can be utilized to deliver local content to the cellular phone (101) exclusive of any broader and higher powered communication networks, such as cellular, and the like. The network would be applicable between cellular phones (101) vehicles comprising the appropriate transceiver technology (106), within a facility/building/area, and the like.

What is claimed is:

1. A method of utilizing a series of deployed beacons for conveying information, the method comprising steps of:
    deploying a series of beacons about a localized geographic area, wherein each beacon of the series of beacons is deployed at an associated known geographic location;
    encoding geographic location information associated with said known geographic location of said deployed beacon into an identification portion of a beacon signal, wherein each geographic location information is unique and identifies said known geographic location of each associated deployed beacon of said series of beacons;
    broadcasting said beacon signal from each beacon of said series of beacons;
    scanning for any of said beacon signals using a mobile device;
    detecting at least one of said broadcast beacon signals;
    receiving at least one of said beacon signal by said mobile device, wherein said beacon signal is broadcast from a beacon of said series of beacons located proximate said mobile device;
    decoding said geographic identification portion of said received beacon signal to obtain said geographic location information;
    determining a geographic location proximate said at least one beacon of said series of beacons associated with said received beacon signals by using said geographic location information; and
    activating local based services (LBS) associated with said geographic location of said beacon of said series of beacons.

2. The method as recited in claim 1, where said beacon signal is a short range radio frequency being at least one of a Bluetooth signal, a Wi-Fi signal, and a radio frequency identification (RFID) signal, the method further comprising a step of:
    transmitting said beacon signal as at least one of said Bluetooth signal, said Wi-Fi signal, and said RFID signal.

3. The method as recited in claim 1, wherein at least a portion of said beacons are deployed within a structure.

4. The method as recited in claim 1, wherein at least a portion of said beacons are deployed within a structure where global positioning satellite (GPS) is ineffective for determining a location of said mobile device.

5. The method as recited in claim 1, further comprising steps of:
    initiating communication between said mobile device and a server,
    obtaining local based services (LBS) information, wherein said LBS information is associated with a geographic location of said beacon of said series of beacons.

6. The method as recited in claim 1, where the step of determining a geographic location proximate said beacon of said series of beacons is accomplished using a signal strength of said beacon signal in conjunction with said decoded geographic location information acquired from said received beacon signal.

7. The method as recited in claim 1, further comprising a step of receiving at least two beacon signals,
    where the step of determining a geographic location proximate said beacon of said series of beacons is accomplished using triangulation in conjunction with said decoded geographic location information acquired from said received beacon signals.

8. The method as recited in claim 1, further comprising a step of deploying said series of beacons within at least one geographic location of a group of geographic locations, wherein said group of geographic locations comprises:
    obtaining local based services (LBS) information, wherein said LBS information is associated with a geographic location of said beacon of said series of beacons, said geographic location being at least one of:
    outdoors,
    indoors,
    a home,
    a mall,
    a department store,
    a specialty store,
    a conference,
    a trade show,
    an amusement park,
    a university,
    a hospital,
    a school, a university,
a municipal building,
a museum,
a subway,
a train station,
a train,
an airport,
a bus,
a bus route,
a car,
a hotel,
a resort,
a casino,
a cruise ship,
a down town center,
an amusement park,
a museum,
a sports stadium,
a financial institute, and
a parking facility.

9. The method as recited in claim 1, wherein at least one beacon of said series of beacons is integrated into a light.

10. The method as recited in claim 1, wherein said local based services (LBS) are obtained through a direct link to an Internet, wherein said link is initiated by said geographic location information obtained from said beacon of said series of beacons.

11. The method as recited in claim 1, wherein said local based services (LBS) includes emitting an emergency locating signal in an emergency condition, wherein said an emergency locating signal includes said location of said mobile device, wherein said location of said mobile device is determined using said geographic location information decoded from said received beacon signal.

12. The method as recited in claim 1, further comprising a step of providing local mapping to said user, wherein said local mapping is based upon said geographic location information decoded from said received beacon signal.

13. The method as recited in claim 1, further comprising a step of providing navigation to a user when the user is located within an indoor environment, wherein said indoor navigation is based upon said geographic location information decoded from said received beacon signal.

14. The method as recited in claim 1, wherein said local based services (LBS) includes at least one of:
marketing,
site information,
sales,
product,
events,
specials, and
coupons.

15. The method as recited in claim 1, wherein said local based services (LBS) uses the infrastructure deployment to locate the user in at least one of an emergency situation or during an E-911 call wherein said location of said mobile device is determined using said geographic location information decoded from said received beacon signal.

16. The method as recited in claim 1, further utilizing a user profile into said Bluetooth identifier signal as a secure key for use in conjunction with said local based services (LBS).

17. The method as recited in claim 1, further utilizing a user profile into said Bluetooth identifier signal as a secure key for use in conjunction with near field communications.

18. The method as recited in claim 1, further utilizing a user profile into said Bluetooth identifier signal as a secure key for use in conjunction with near field communications and payments.

19. The method as recited in claim 1, further comprising a step of employing said mobile device as a payment trigger mechanism.

20. The method as recited in claim 1, wherein local based services (LBS) includes at least a contribution to a payment process.

21. The method as recited in claim 1, wherein local based services (LBS) includes at least a contribution to a security portion of a secured payment process.

22. The method as recited in claim 1, further comprising a step of employing said mobile device as a digitally secure payment implement.

23. The method as recited in claim 1, further comprising a step of employing said mobile device as a digitally secure payment implement by including the identifier information of the mobile device.

24. The method as recited in claim 1, further comprising a step of employing said mobile device as a digitally secure payment implement by including the location information obtained from the proximate beacon of the series of beacons and subsequently provided from the mobile device.

25. The method as recited in claim 1, further comprising a step of interacting with a social networking environment.

26. The method as recited in claim 1, further comprising a step of sharing said mobile device with other mobile devices operating as a local social networking environment.

27. The method as recited in claim 1, further comprising a step of including said mobile device into an existing local social networking environment.

28. The method as recited in claim 1, further comprising a step of at least one of creating and sustaining a social networking environment based upon said location of each mobile device within proximity of other mobile devices and said beacon.

29. The method as recited in claim 1, further comprising a step of informing a second party of a presence of the user within a proximity of one another.

30. The method as recited in claim 1, further comprising a step of displaying a circle overlay onto a local map on a display of said mobile device, wherein said circle is associated with one of said location of said mobile device and said location of said proximate beacon of said series of beacons.

31. The method as recited in claim 1, further comprising a step of modifying said encoded information of at least one beacon of said series of beacons.

32. A method of transmitting information to a mobile device, the method comprising steps of:
deploying a series of beacons about a localized geographic area;
embedding geographic location information into an identification portion of a beacon signal emitted by each beacon of said series of beacons, wherein said beacon signal is at least one of Bluetooth signal, a Wi-Fi signal, and a radio frequency identification (RFID) signal and said geographic location identifies a location of said beacon within said localized geographical area;
broadcasting a beacon signal from each beacon of said series of beacons;
scanning for any of said beacon signals using a mobile device;
detecting at least one of said broadcast beacon signals;
receiving at least one of said beacon signal by said mobile device;

decoding said geographic identification portion of said received beacon signal to obtain said geographic location information;

determining a geographic location proximate said at least one beacon of said series of beacons associated with said received beacon signals by using said geographic location information; and activating local based services (LBS) associated with said local geographic area.

33. The method as recited in claim 32, wherein at least a portion of said beacons of said series of beacons are deployed within at least one of a structure, a building, along a roadway, and along a railway.

34. The method as recited in claim 32, wherein at least a portion of said beacons are deployed within a structure where global positioning satellite (GPS) is ineffective for determining a location of said mobile device.

35. The method as recited in claim 32, further comprising a step of:

determining a location of said mobile device within said structure associated with each received beacon identifier and a signal strength of each beacon signal received by each proximate beacon of said series of deployed beacons.

36. The method as recited in claim 32, further comprising a step of employing an existing Wi-Fi device as a beacon of said series of beacons.

37. The method as recited in claim 32, further comprising a step of employing a cellular based device as a beacon of said series of beacons.

38. The method as recited in claim 32, wherein said data source broadcasts said location ID information using Bluetooth.

39. The method as recited in claim 32, wherein at least a portion of said beacons of said series of beacons utilize a unidirectional beacon signal protocol.

40. The method as recited in claim 32, wherein at least a portion of said beacons of said series of beacons operating independent of other beacons of said series of beacons and independent of any network infrastructure.

41. The method as recited in claim 32, further comprising a step of utilizing a signal strength of said received beacon signal to determine a distance between said mobile device and a beacon associated with said received beacon signal.

42. The method as recited in claim 32, further comprising steps of:

embedding a signal strength contour within said beacon signal emitted by said beacon of said series of beacons;

utilizing a signal strength of said received beacon signal in combination with said signal strength contour to determine a distance between said mobile device and a beacon associated with said received beacon signal to determine a distance between said mobile device and a beacon associated with said received beacon signal.

43. The method as recited in claim 32, further comprising steps of:

collecting location data associated with a path of travel of said mobile device within said localized geographical area; and transmitting said collected location data to an external system for use in predictive analysis.

44. The method as recited in claim 32, further comprising steps of:

collecting location data associated with a path of travel of said mobile device within said localized geographical area, wherein said path of travel at least partially includes travel within an interior of a structure; and transmitting said collected location data to an external system for use in predictive analysis.

45. The method as recited in claim 32, further comprising a step of:

activating an application based upon receipt of said beacon signal.

46. The method as recited in claim 32, further comprising a step of:

linking said mobile device to at least one of an existing network, an existing system, an application associated with said series of deployed beacons.

47. The method as recited in claim 32, wherein at least one beacon of said series of beacons is integrated into a light.

48. The method as recited in claim 32, wherein said local based services (LBS) associated with said local geographic area is at least one of:

a link to a third party application,
a link to existing software,
a link to a website,
communication using a cloud,
presents location information,
presents marketing information,
presents sales information,
presents specials information,
presents coupon information, and
provides emergency based locating.

49. A method of utilizing a series of deployed beacons for conveying information, the method comprising steps of:

deploying a series of beacons about a localized geographical area;

encoding geographic location information into a beacon signal, wherein each geographic location information is unique and identifies a precise geographic location of each associated beacon of said series of beacons;

broadcasting said beacon signal from each beacon of said series of beacons;

scanning for any of said beacon signals using a mobile device;

detecting at least one of said broadcast beacon signals;

receiving at least one of said beacon signal by said mobile device, wherein said beacon signal is broadcast from a beacon of said series of beacons located proximate said mobile device;

decoding said geographic identification portion of said received beacon signal to obtain said geographic location information;

determining a geographic location proximate said at least one beacon of said series of beacons associated with said received beacon signals by using said geographic location information; and initiating a direct link to an Internet web site, wherein said link is established directly to the geographic location web site initiated as a result of receipt of the beacon identifier and based upon said geographic location information determined from the beacon identifier obtained from said proximate beacon of said series of beacons.

50. The method as recited in claim 49, wherein the step of encoding geographic location information into said beacon signal encodes said geographic location information into an identification portion of said beacon signal.

51. The method as recited in claim 49, further comprising a step of conveying information obtained from said beacon of said series of beacons to a provider; and receiving content associated with said information obtained from said beacon of said series of beacons from said provider.

52. The method as recited in claim 49, further comprising a step of conveying information obtained from said beacon of said series of beacons to a provider; and receiving local based services (LBS) related content associated with said location information obtained from said beacon of said series of beacons from said provider.

53. The method as recited in claim 49, further comprising a step of conveying information obtained from said beacon of said series of beacons to a provider over said Internet; and receiving content associated with said information obtained from said beacon of said series of beacons from said provider over said Internet.

54. The method as recited in claim 49, further comprising a step of tracking a location of said mobile device using said geographic location information obtained from said beacons signal.

55. The method as recited in claim 54, wherein the step of tracking a location of said mobile device using said geographic location information obtained from said beacons signal for at least one of an emergency and a disaster situation.

56. The method as recited in claim 49, further comprising a step of utilizing said mobile device to aid in locating a user in at least one of an emergency and a disaster situation.

57. The method as recited in claim 49, further comprising a step of utilizing said mobile device in conjunction with information obtained from at least one beacon of said series of beacons, wherein said at least one beacon is located proximate said user, to aid in locating a user in at least one of an emergency and a disaster situation.

* * * * *